US010065100B2

(12) United States Patent
Watanabe et al.

(10) Patent No.: US 10,065,100 B2
(45) Date of Patent: Sep. 4, 2018

(54) INFORMATION PROCESSING DEVICE, STORAGE MEDIUM, AND INFORMATION PROCESSING METHOD

(71) Applicant: SONY CORPORATION, Tokyo (JP)

(72) Inventors: Atsuo Watanabe, Tokyo (JP); Yoshihiro Nakanishi, Tokyo (JP); Takaomi Kimura, Tokyo (JP); D. Forrest Matthew, Kanagawa (JP); Kosei Yamashita, Kanagawa (JP); Munechika Maekawa, Kanagawa (JP); Chiya Watanabe, Tokyo (JP); Nobuhiro Jogano, Kanagawa (JP); Katsuji Miyazawa, Kanagawa (JP); Tatsuya Ohsaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 150 days.

(21) Appl. No.: 14/895,047

(22) PCT Filed: Apr. 22, 2014

(86) PCT No.: PCT/JP2014/002269
§ 371 (c)(1),
(2) Date: Dec. 1, 2015

(87) PCT Pub. No.: WO2014/199552
PCT Pub. Date: Dec. 18, 2014

(65) Prior Publication Data
US 2016/0107063 A1    Apr. 21, 2016

(30) Foreign Application Priority Data

Jun. 13, 2013  (JP) .................................. 2013-124299
Dec. 27, 2013  (JP) .................................. 2013-273488

(51) Int. Cl.
*H04N 9/80*     (2006.01)
*H04N 5/77*     (2006.01)
(Continued)

(52) U.S. Cl.
CPC ...... *A63B 71/0622* (2013.01); *G06K 9/00342* (2013.01); *G06Q 10/0639* (2013.01); *H04N 7/18* (2013.01); *A63B 2220/806* (2013.01)

(58) Field of Classification Search
USPC .................................................. 386/239–248
See application file for complete search history.

(56) References Cited

U.S. PATENT DOCUMENTS

2013/0271602 A1* 10/2013 Bentley .................... H04N 7/18
348/143

FOREIGN PATENT DOCUMENTS

JP      2009-297057 A      12/2009

OTHER PUBLICATIONS

Mike Housholder.: "Wearable sensor devices leverage MEMS motion tracking innovations", EE TIMES. Sep. 28, 2012, UBM ELECTRONICS, A UBM COMPANY.
(Continued)

*Primary Examiner* — Hung Dang
(74) *Attorney, Agent, or Firm* — Chip Law Group

(57) ABSTRACT

An information processing apparatus includes circuitry that analyzes a motion of a user by determining a start time and an end time of a motion session from characteristics of motion data regarding the motion of the user. The motion data is indicative of a type of sports-related motion performed by the user.

17 Claims, 39 Drawing Sheets

(51) Int. Cl.
*A63B 71/06* (2006.01)
*G06Q 10/06* (2012.01)
*G06K 9/00* (2006.01)
*H04N 7/18* (2006.01)

(56) References Cited

OTHER PUBLICATIONS

Mikka Ermes, et al.: "Detection of Daily Activities and Sports With Wearable Sensors in Controlled and Uncontrolled Conditions" IEEE Transations on Information Technology in Biomedicine, Jan. 2008, vol. 12, No. 1.
Chun Zhu, et al.: "Motion and Location Based Online Human Daily Activity Recognition", Pervasive and Mobile Computing, Nov. 15, 2009, 258-269, Elsevier, OK, USA.
Juha Parkka, et al.: Personalization Algorithm for Real-Time Activity Recognition Using PDA, Wireless Motion Bands, and Binary Decision Tree, IEEE Transactions on Information Technology in Biomedicine, vol. 14, No. 5, Sep. 2010.

\* cited by examiner

[Fig. 1]
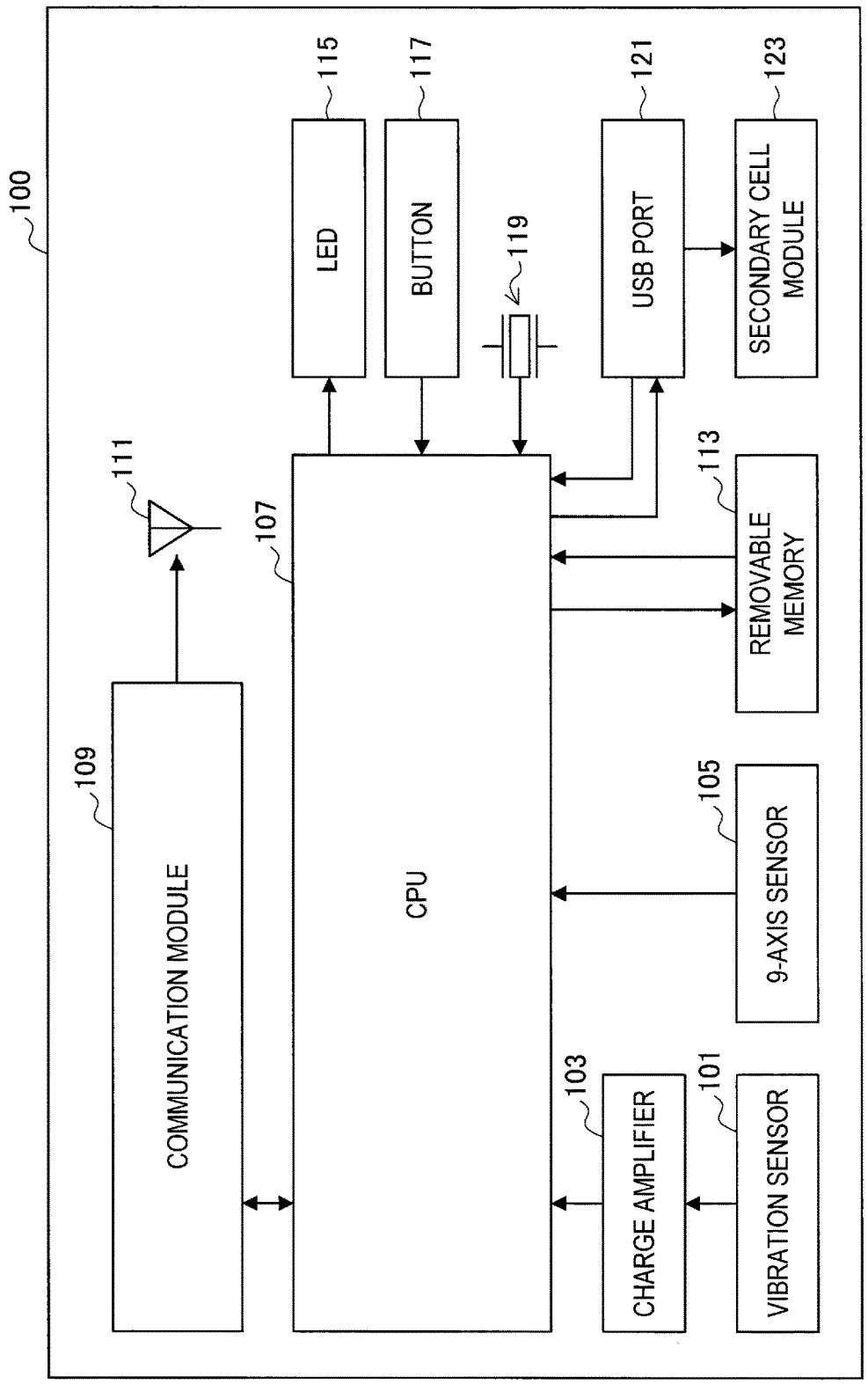

[Fig. 2]
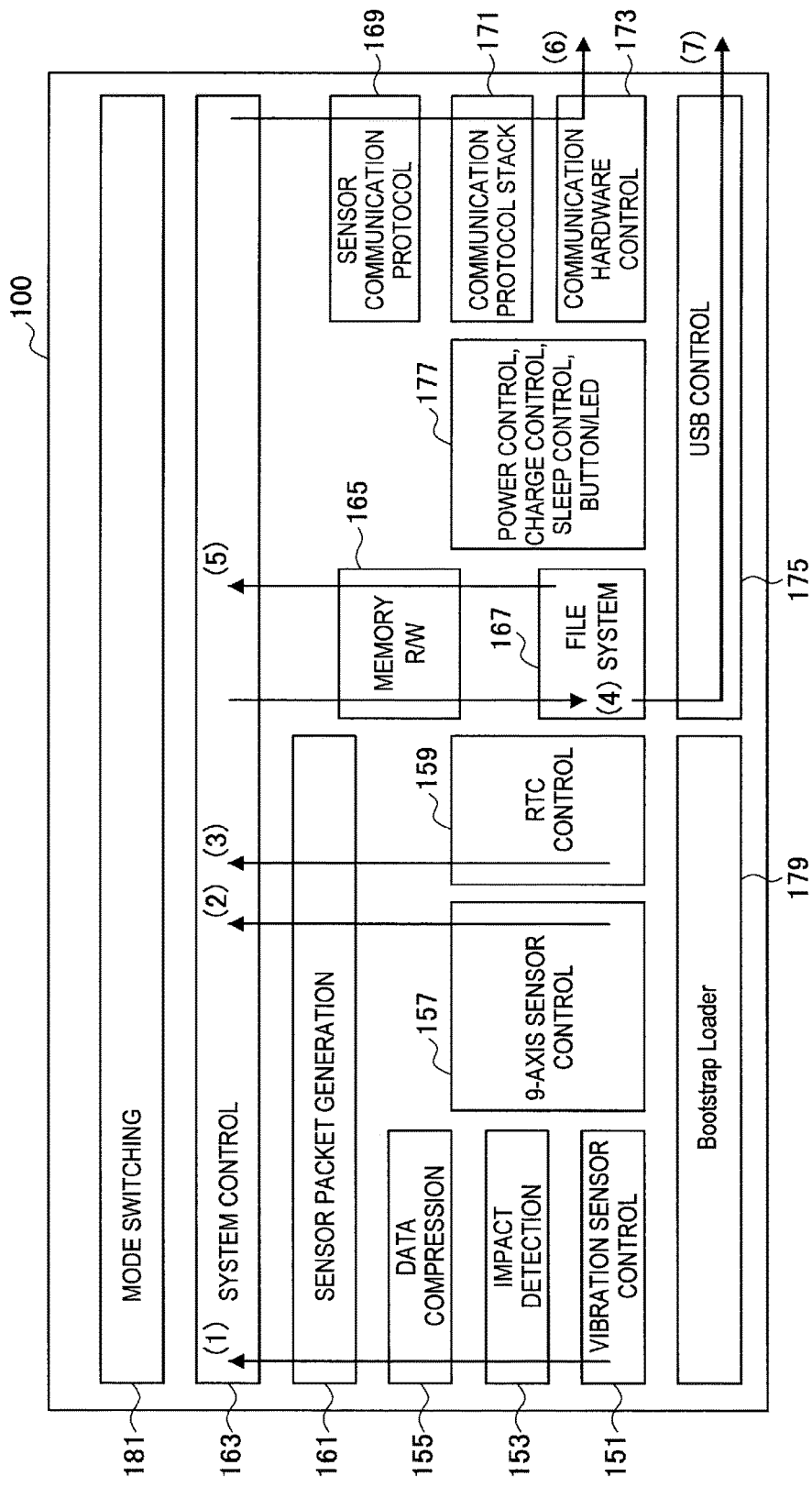

[Fig. 3]
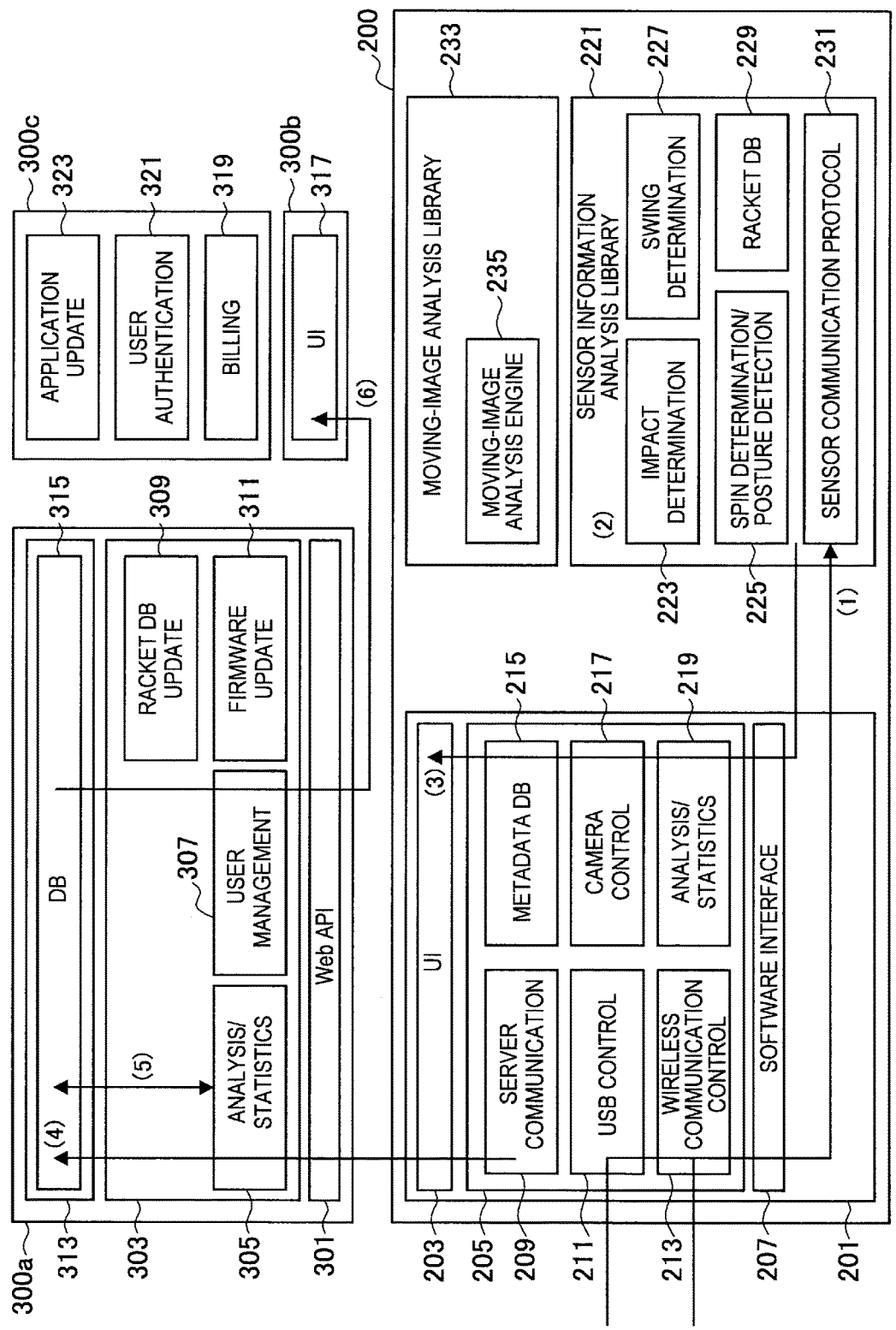

[Fig. 4]
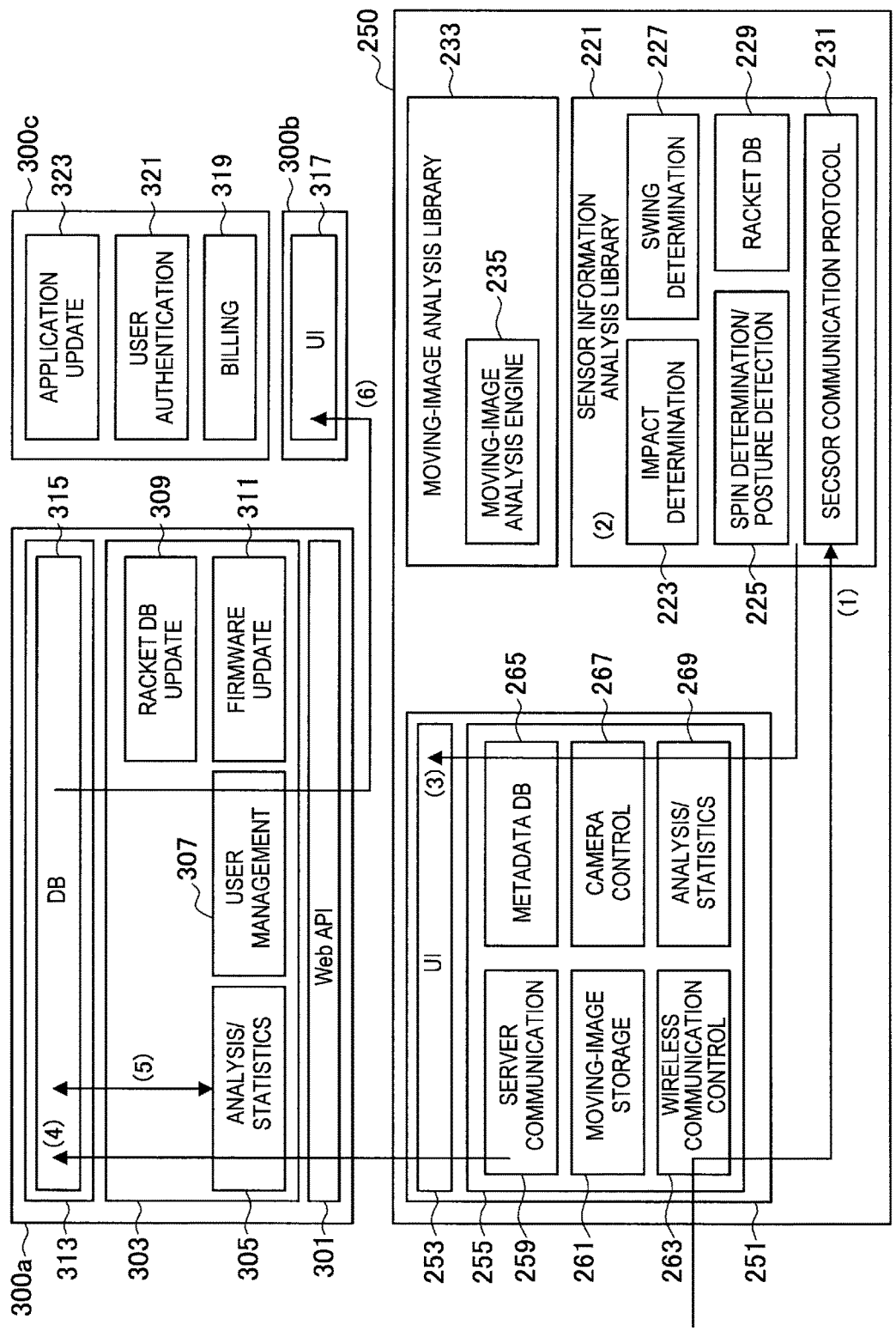

[Fig. 5]
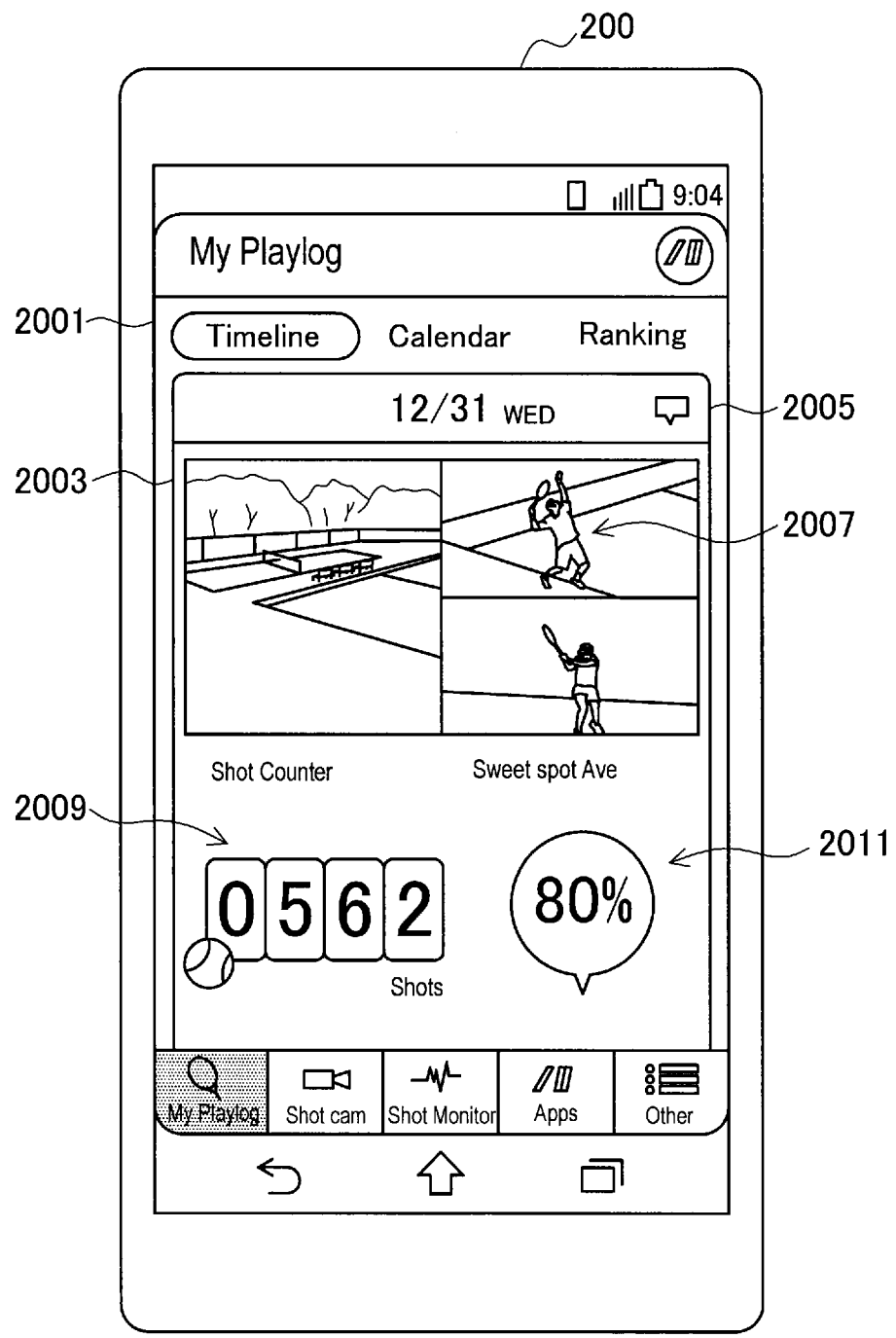

[Fig. 6]
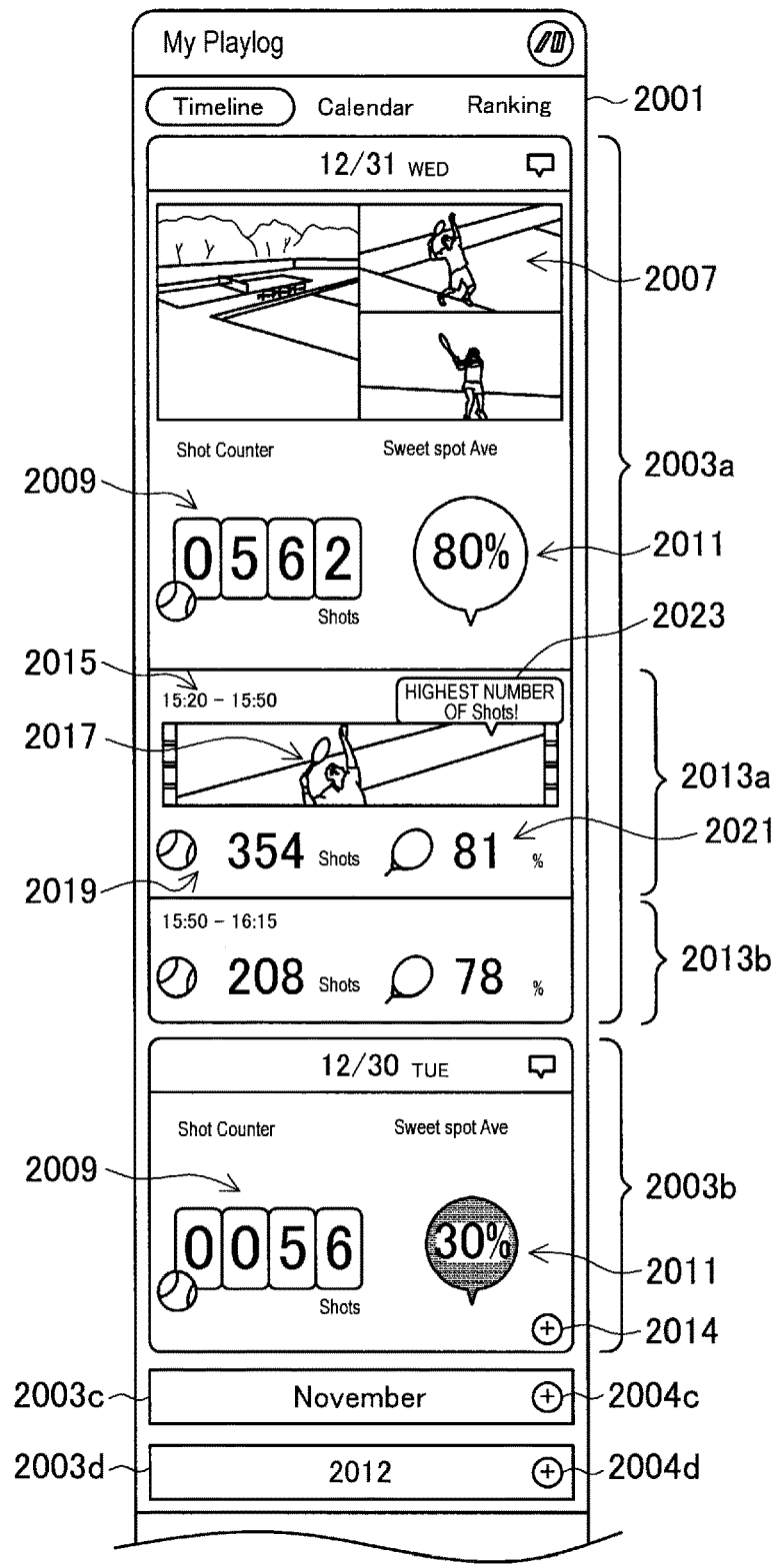

[Fig. 7]
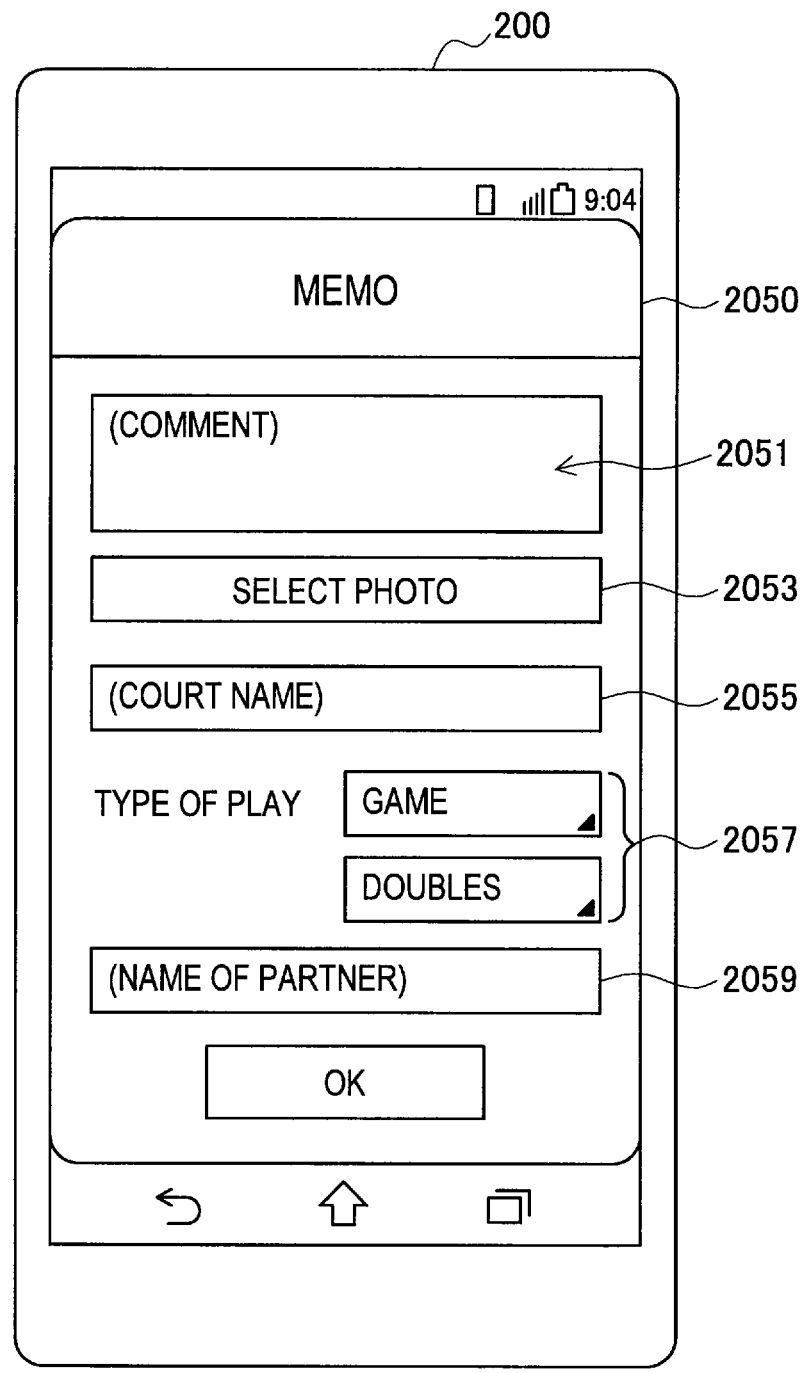

[Fig. 8]
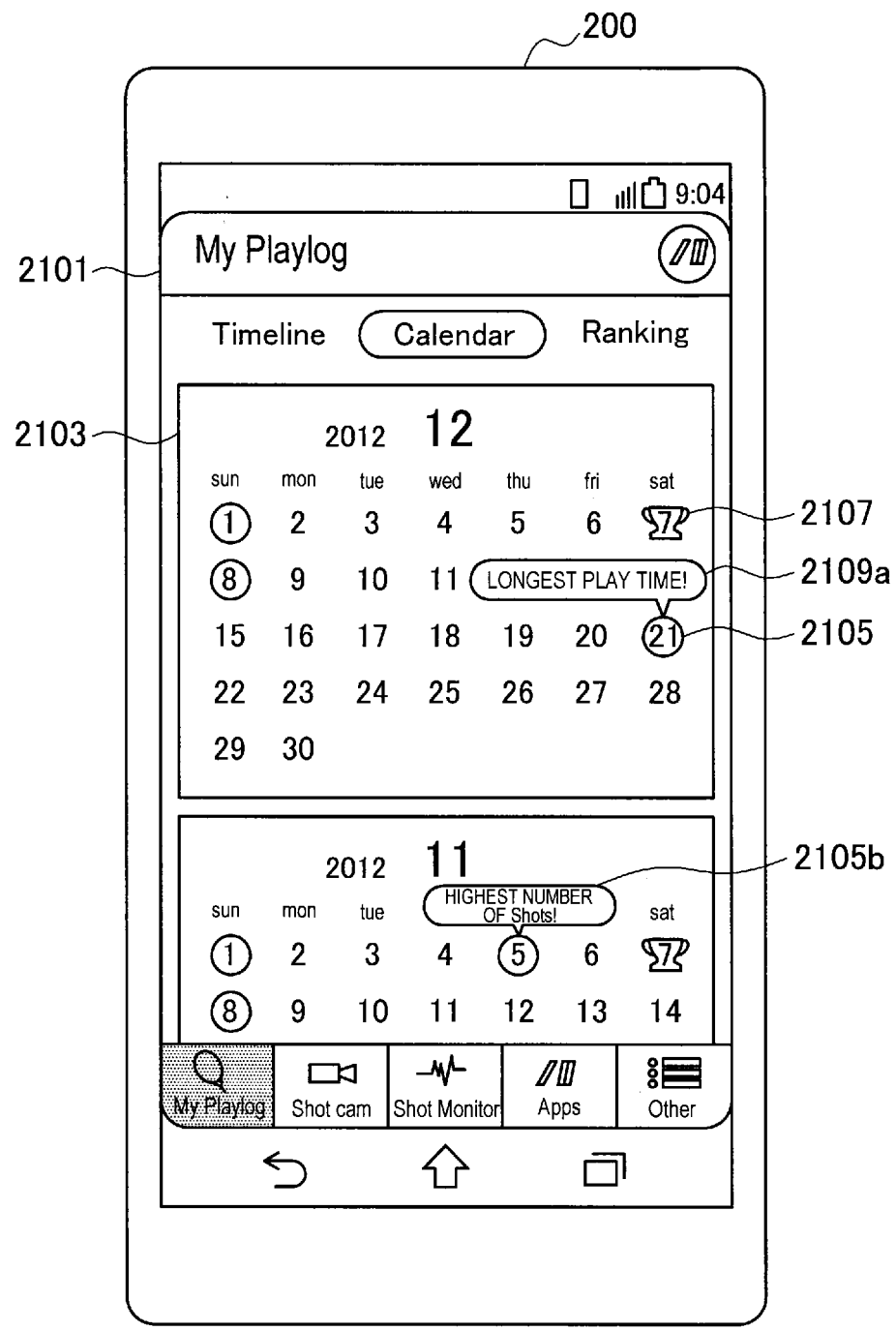

[Fig. 9]
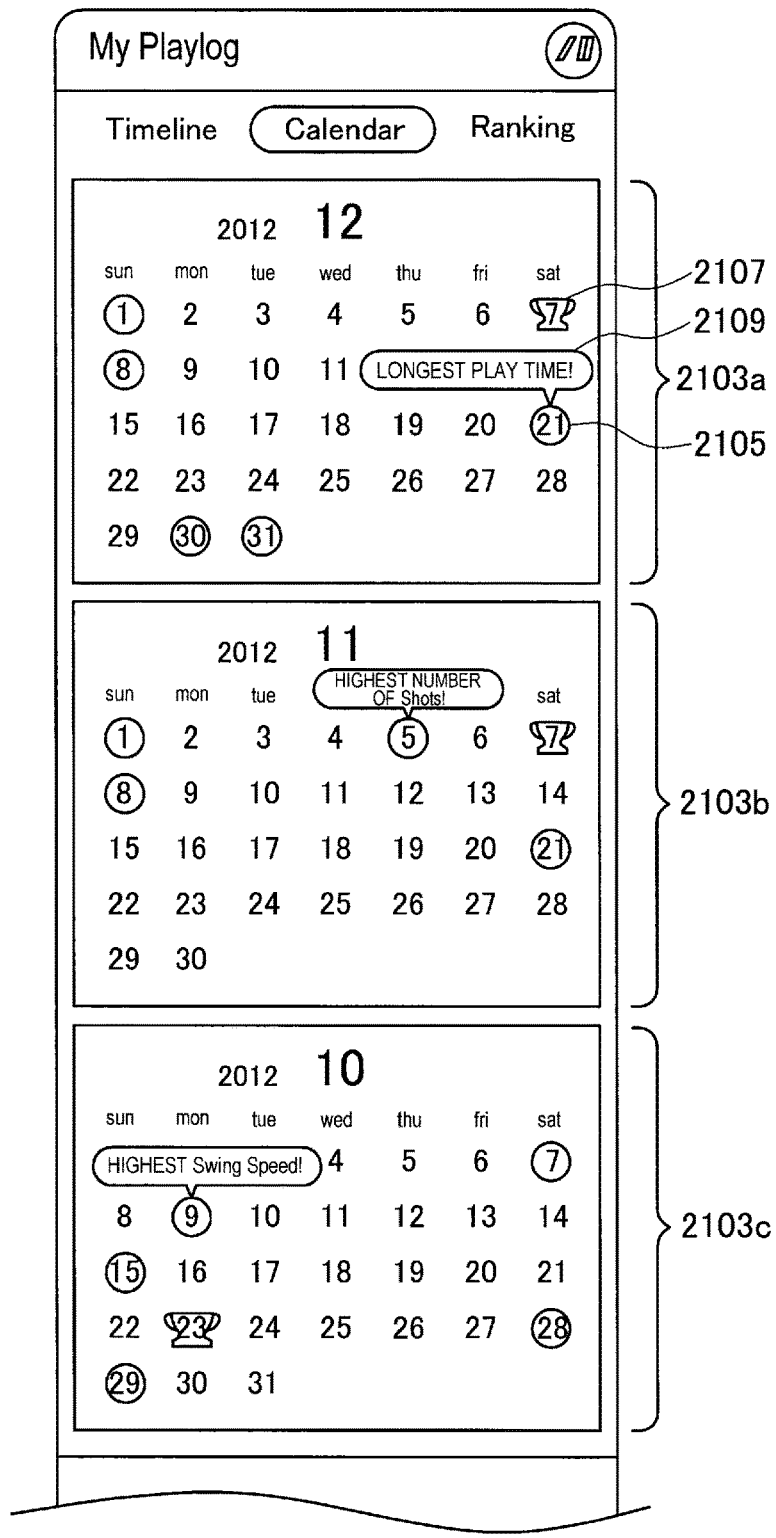

[Fig. 10]
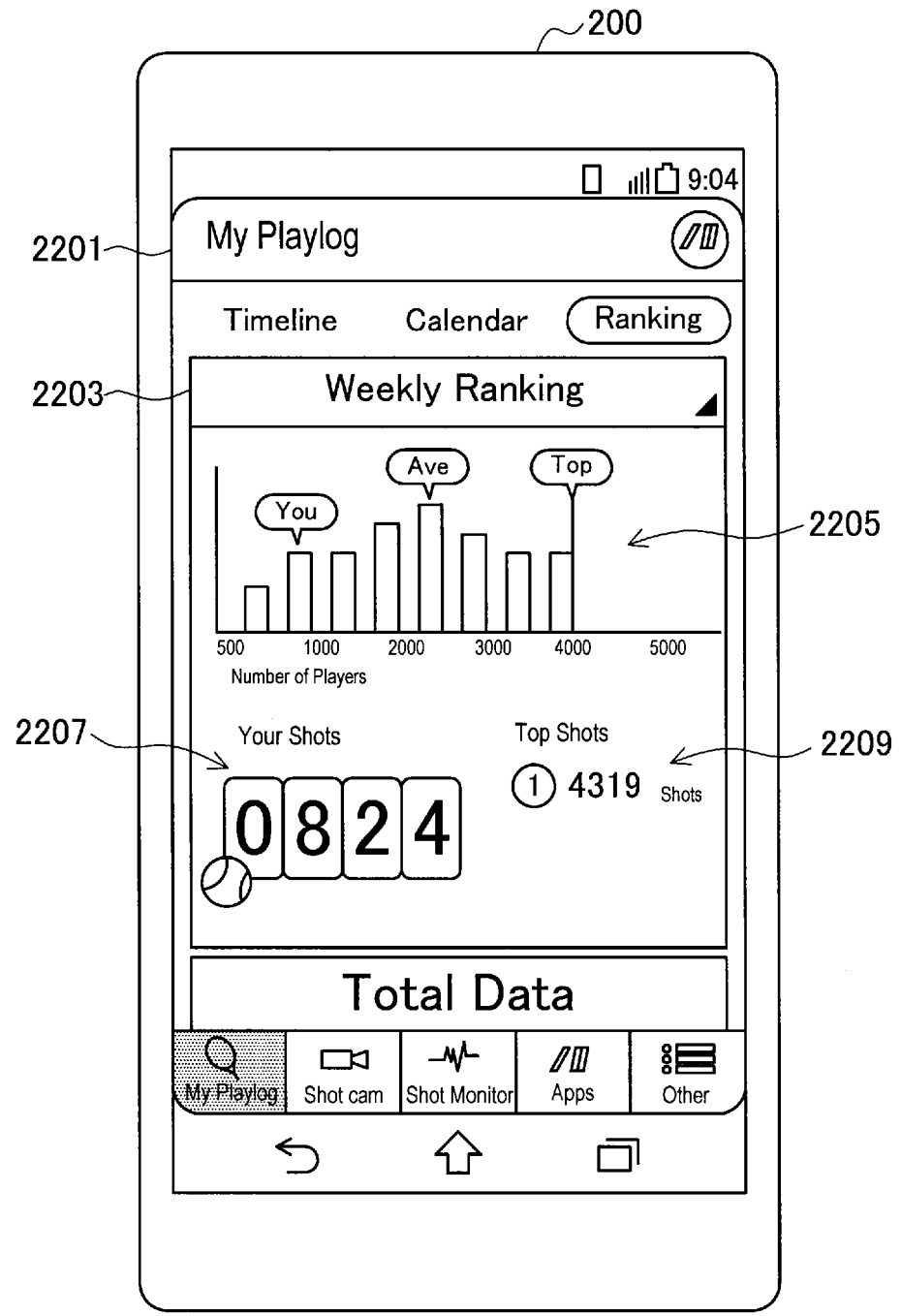

[Fig. 11]
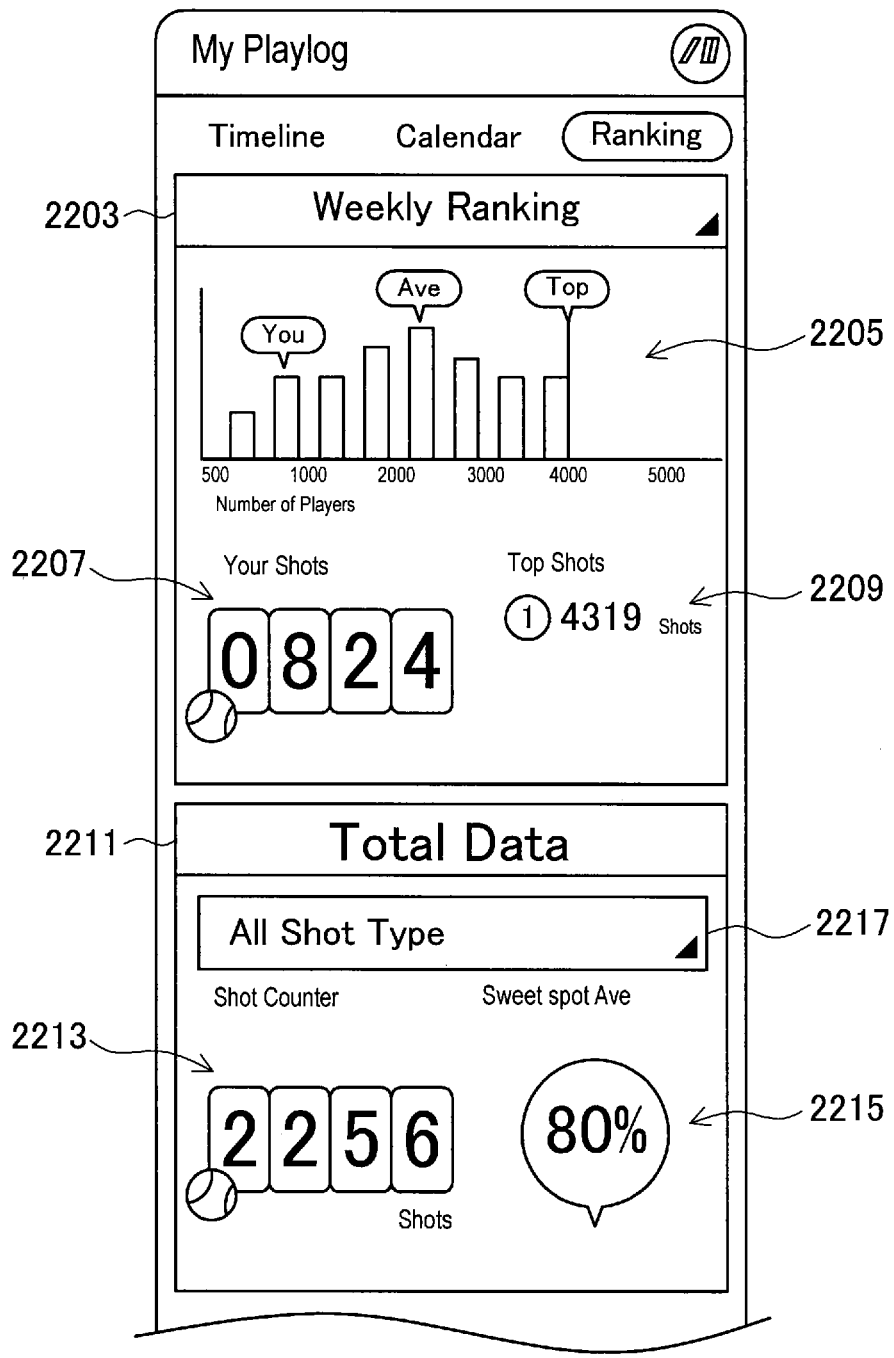

[Fig. 12]
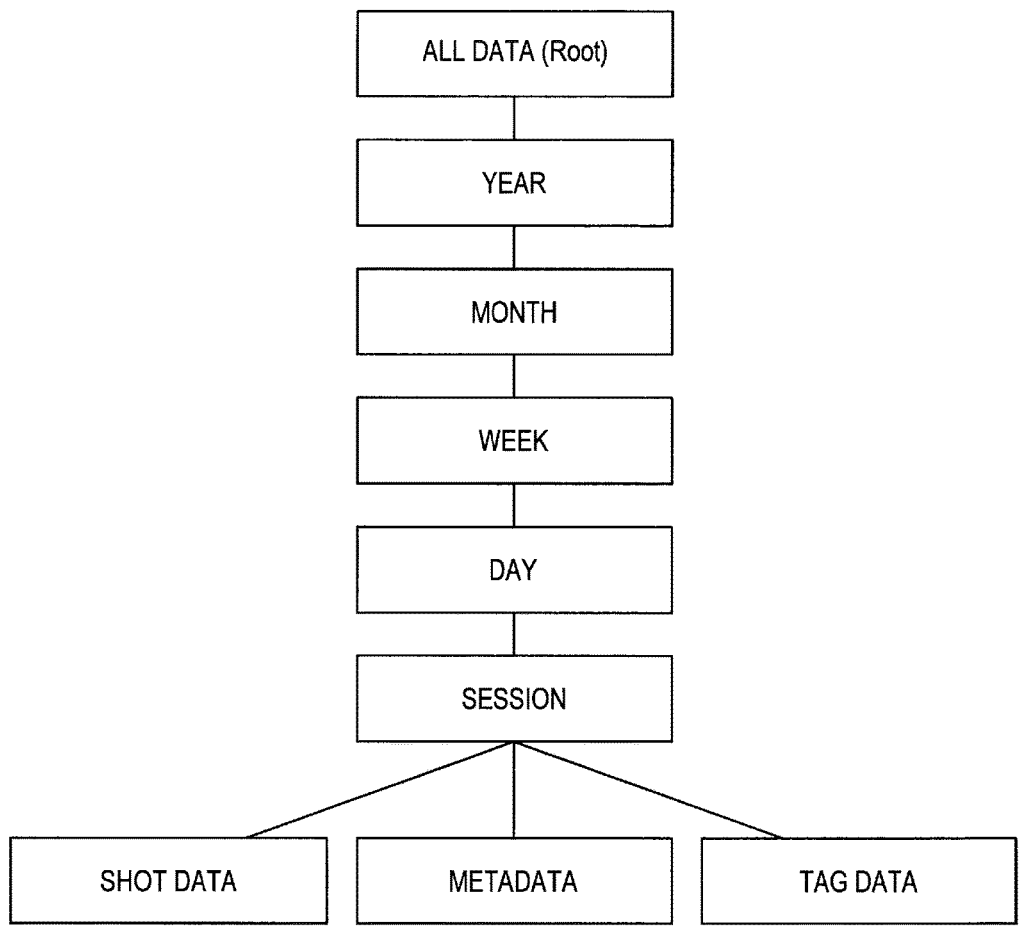

[Fig. 13]
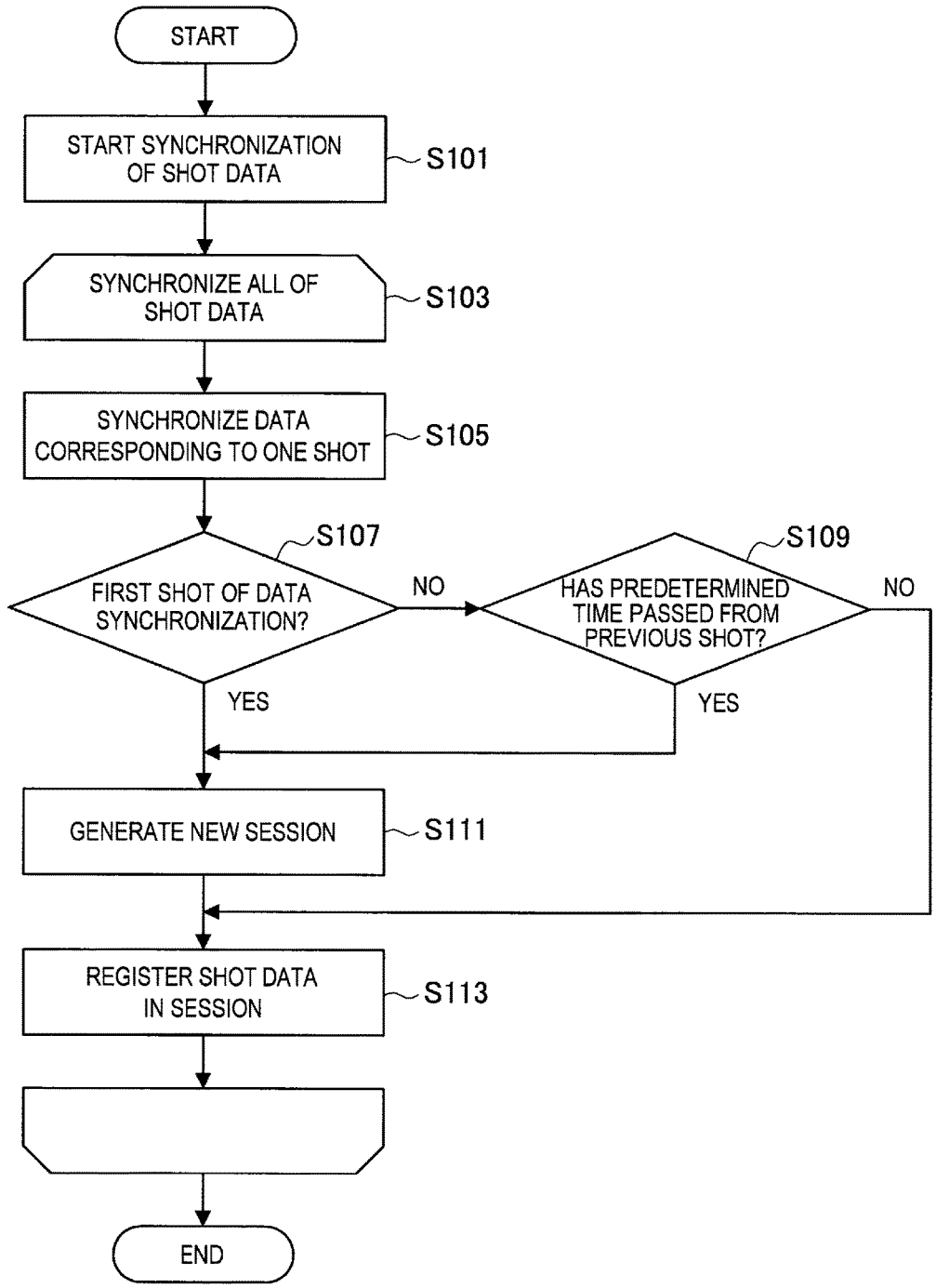

[Fig. 14]
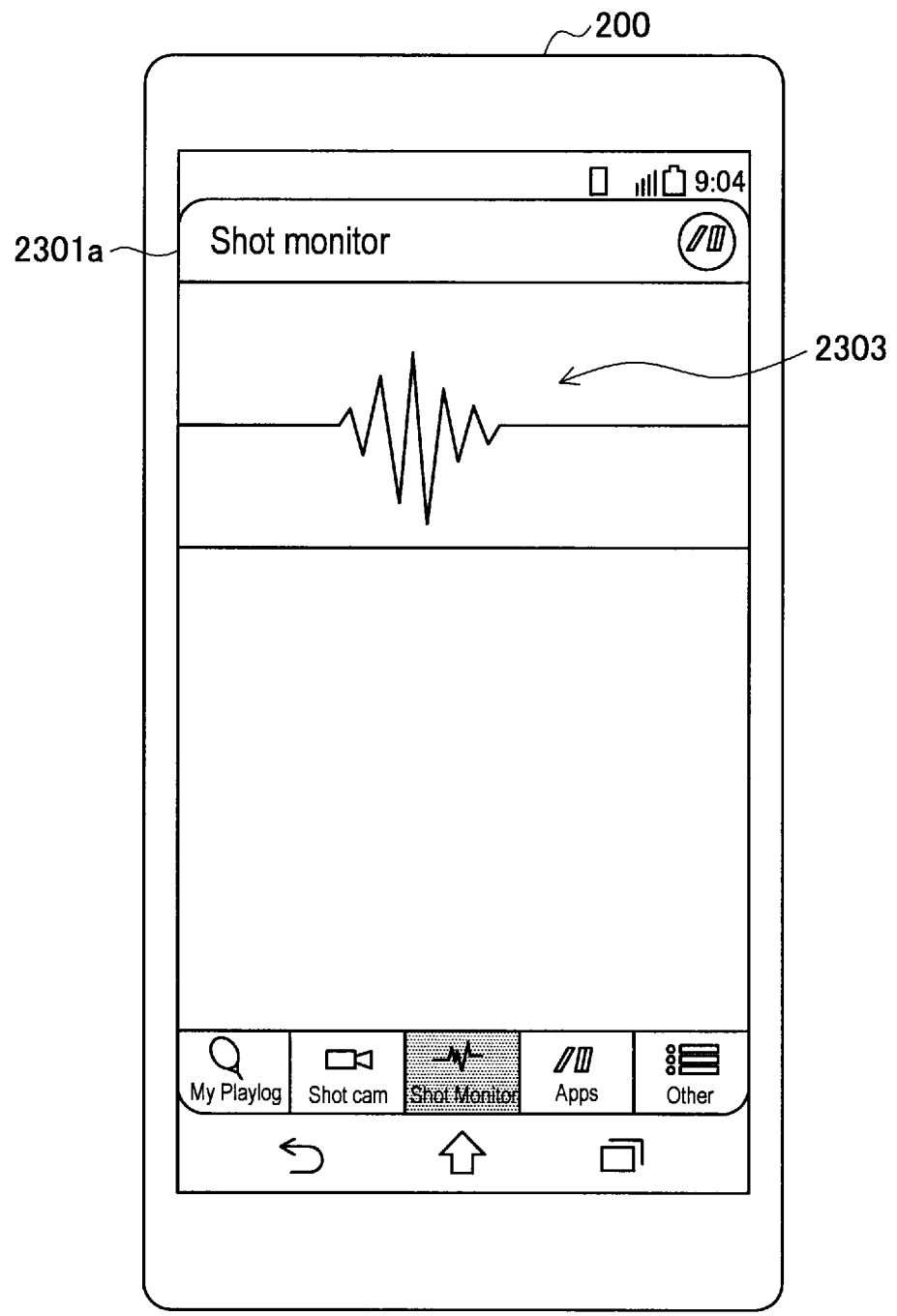

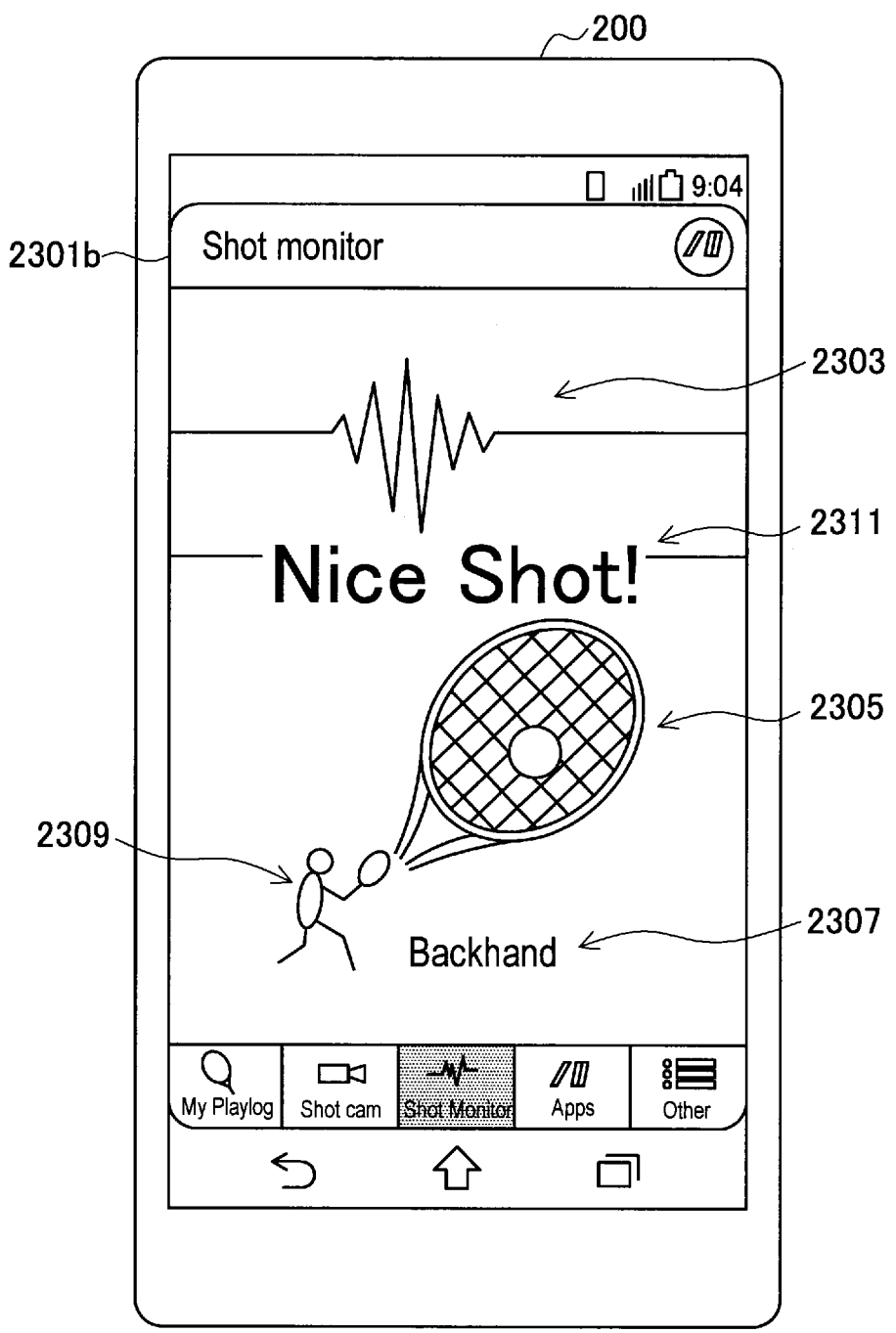
[Fig. 15]

[Fig. 16]
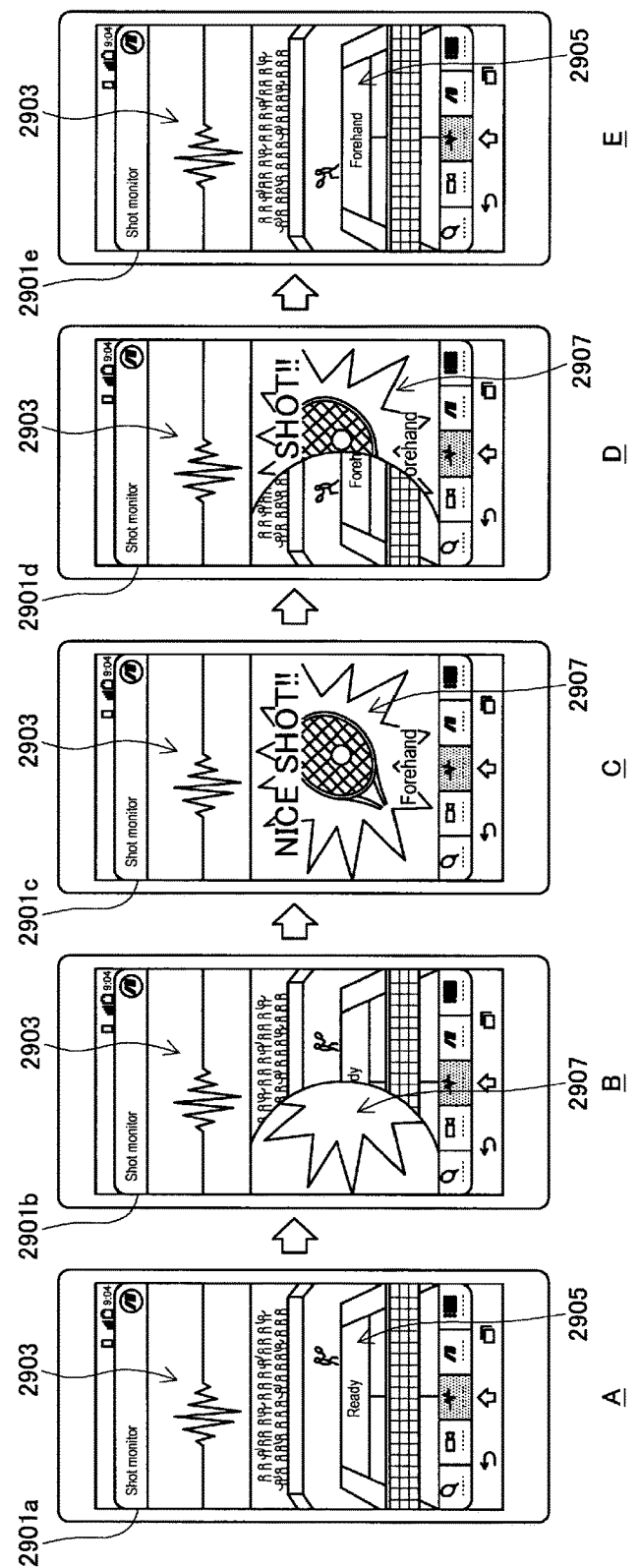

[Fig. 17]
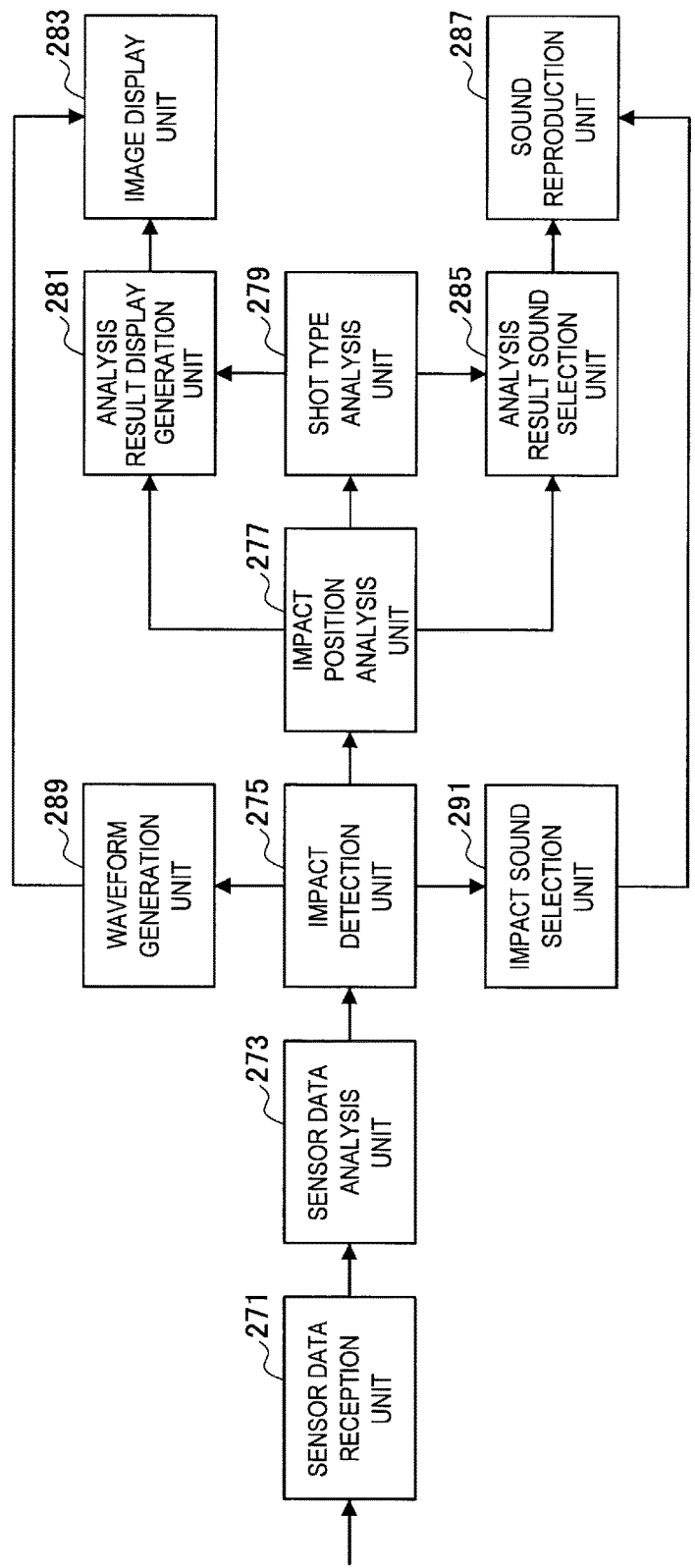

[Fig. 18]
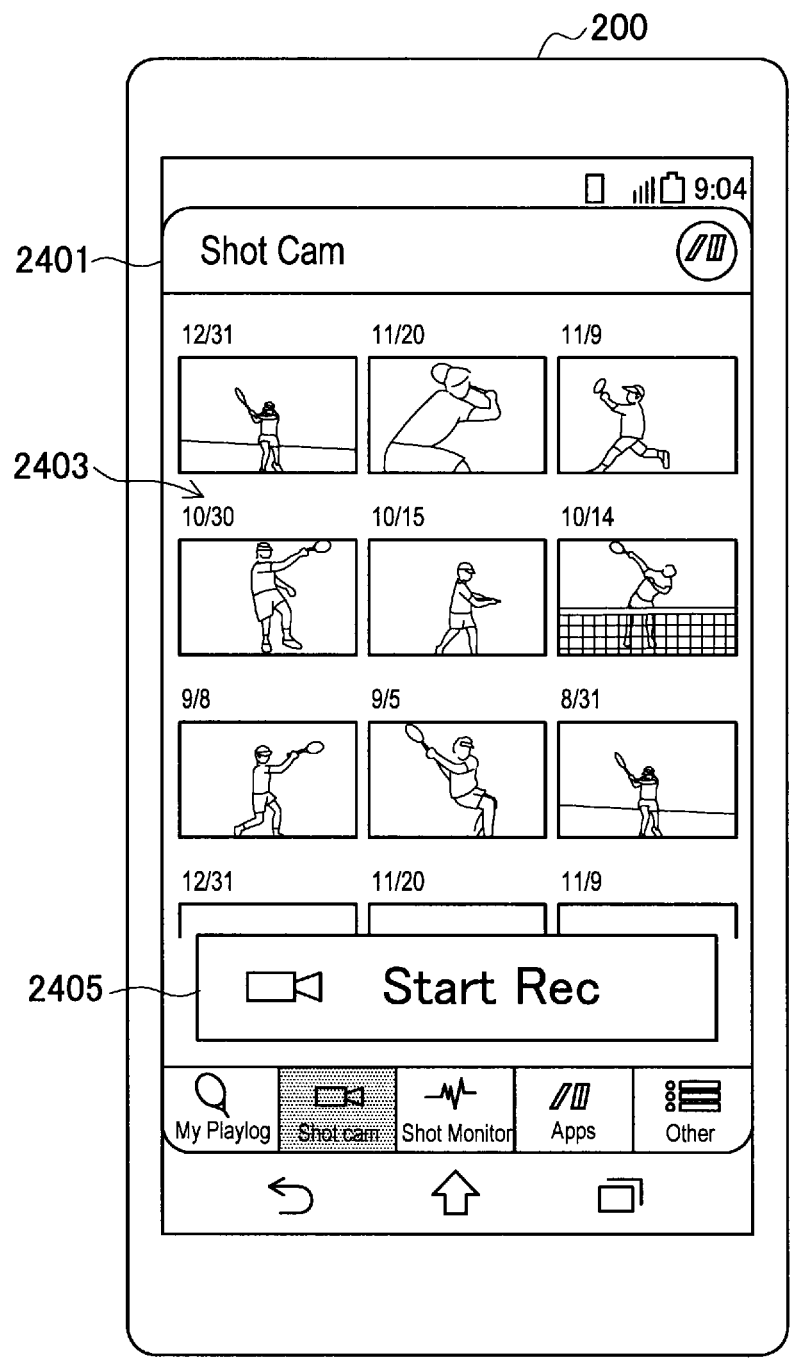

[Fig. 19]
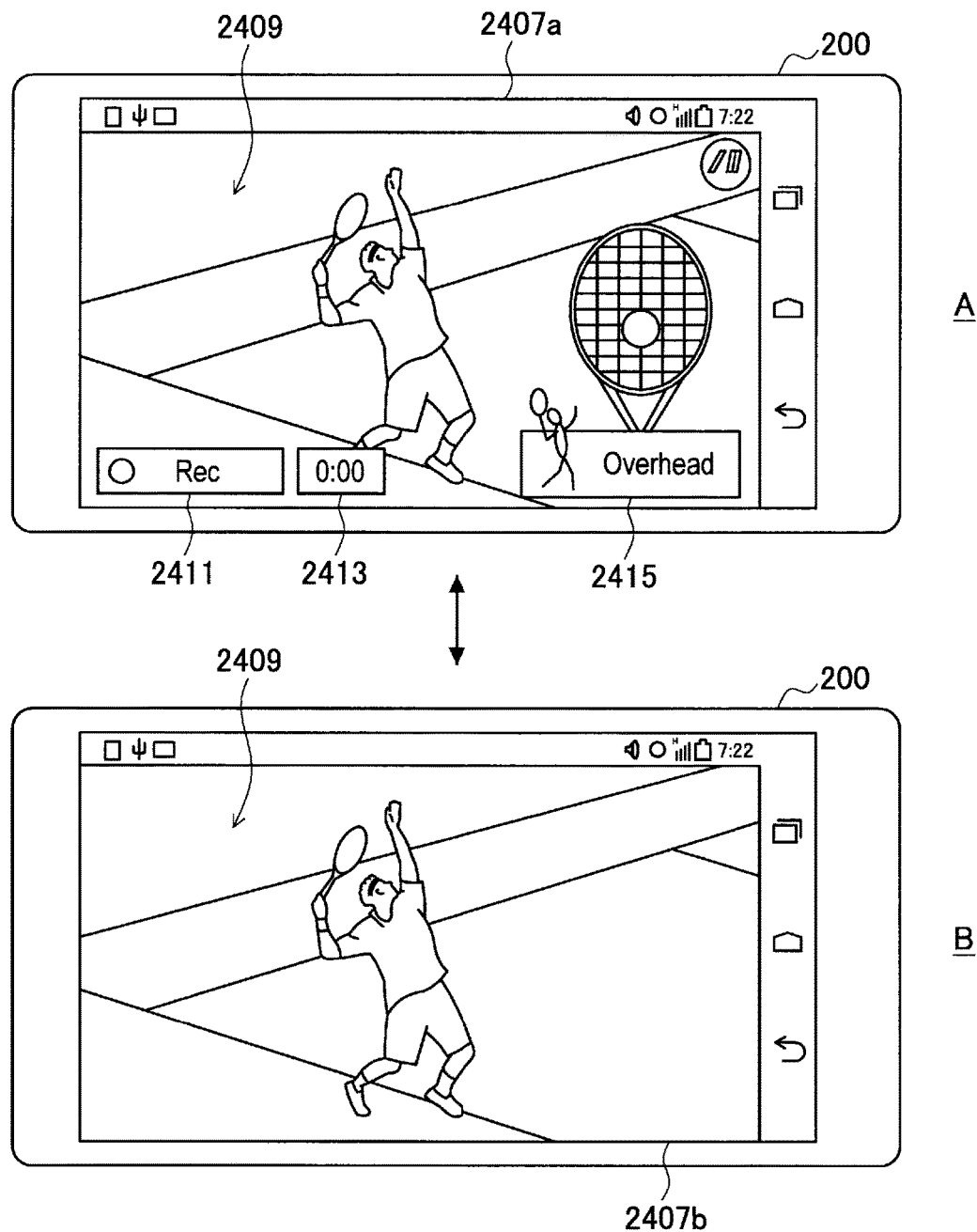

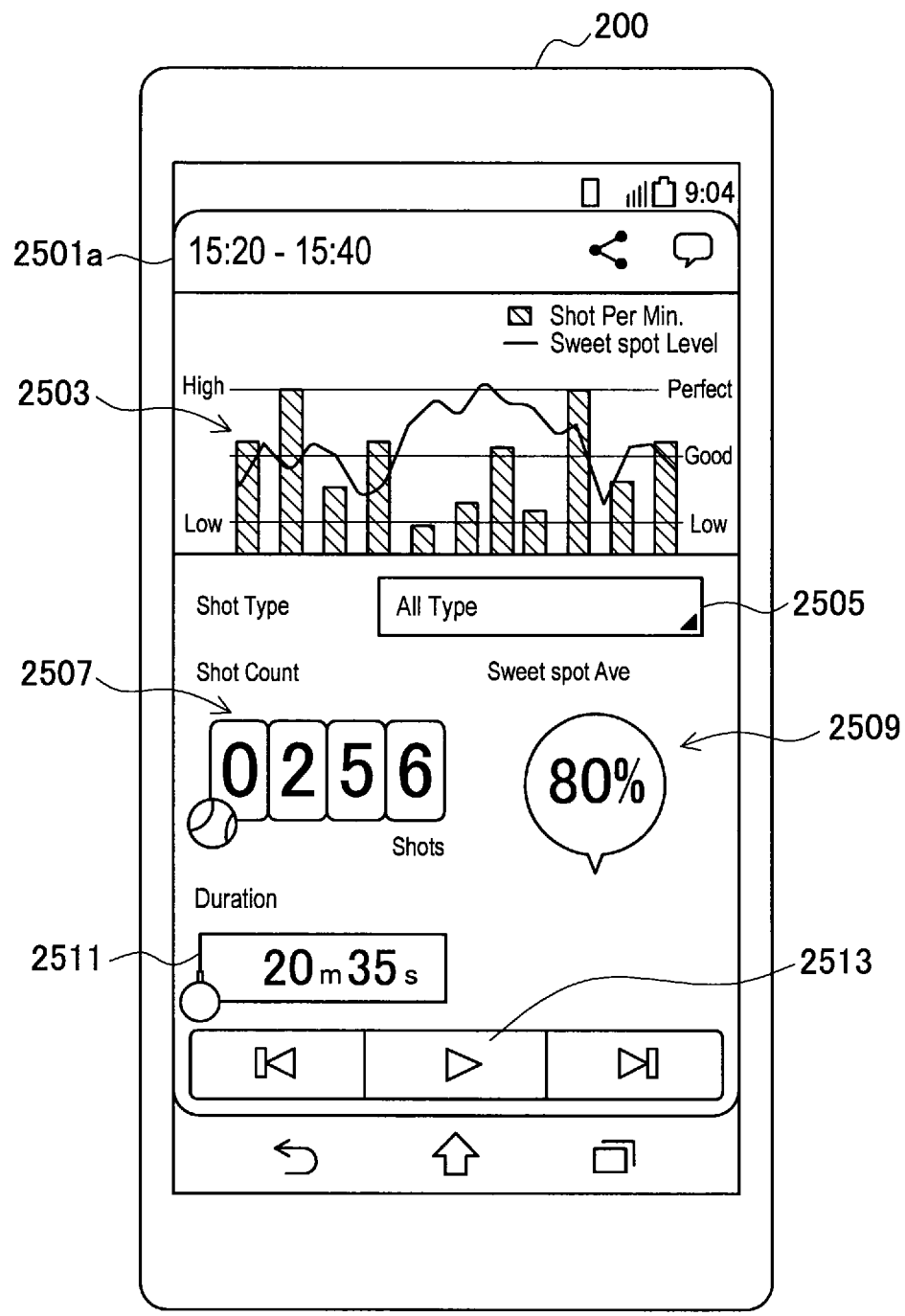
[Fig. 20]

[Fig. 21]
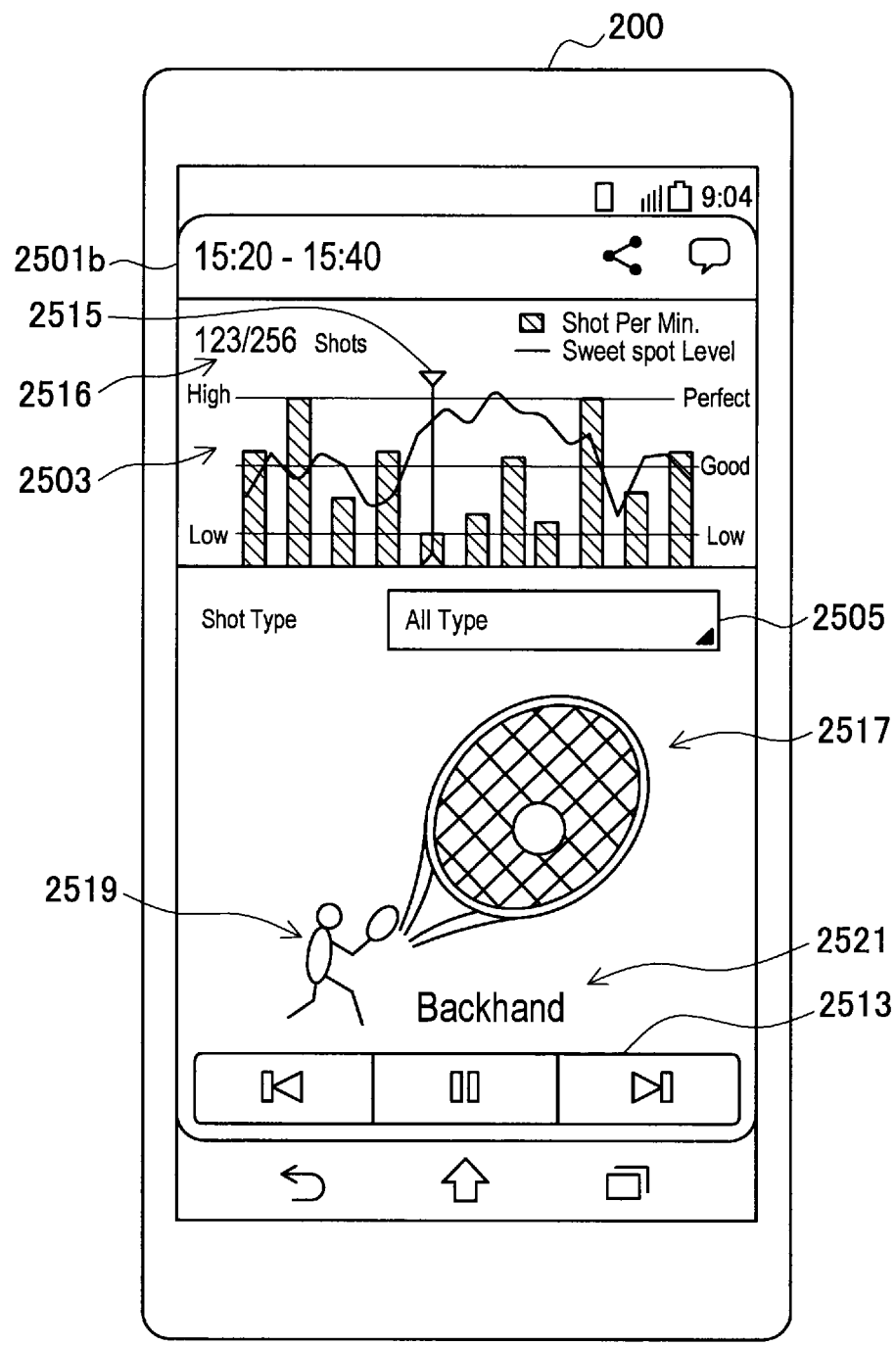

[Fig. 22]
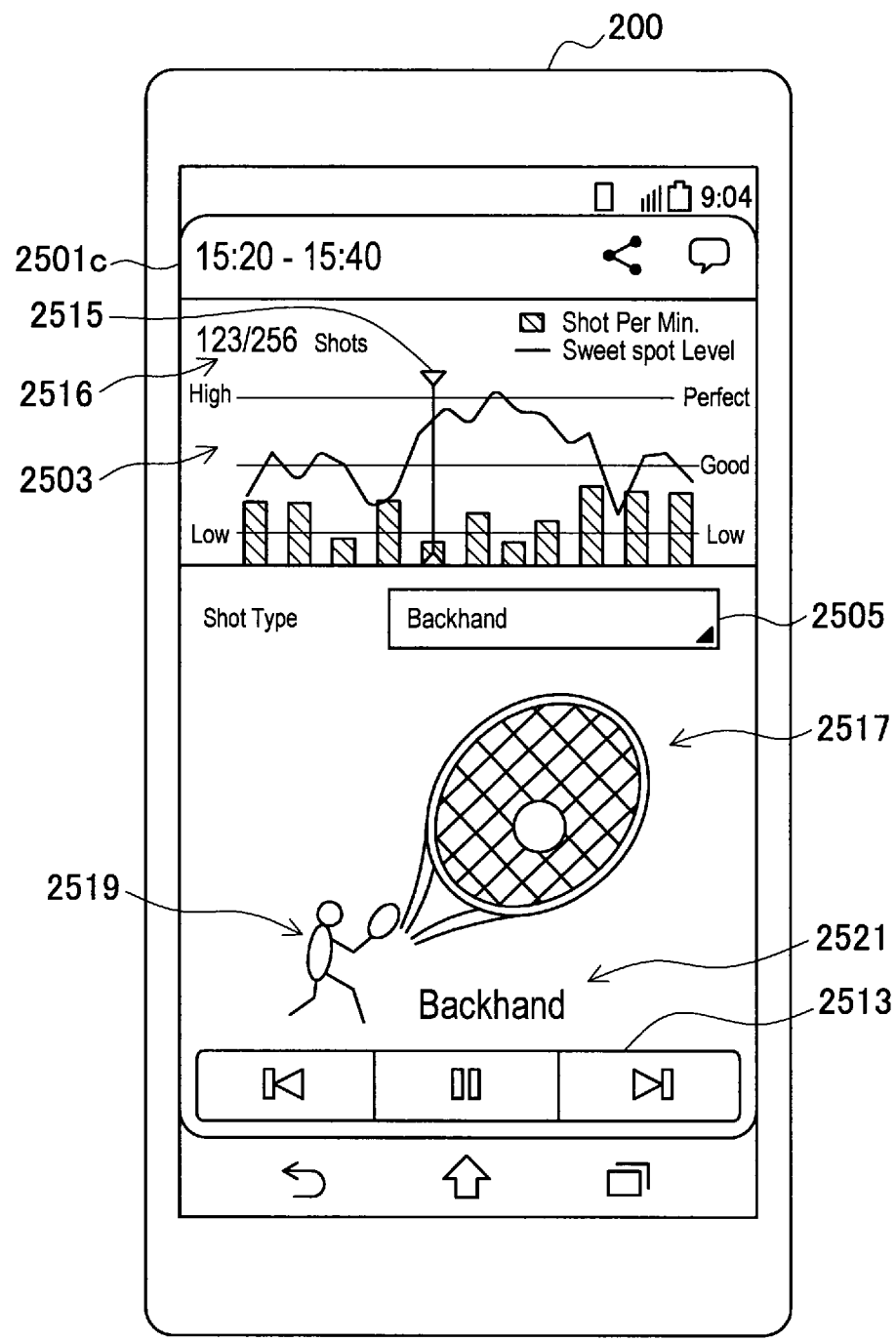

[Fig. 23]
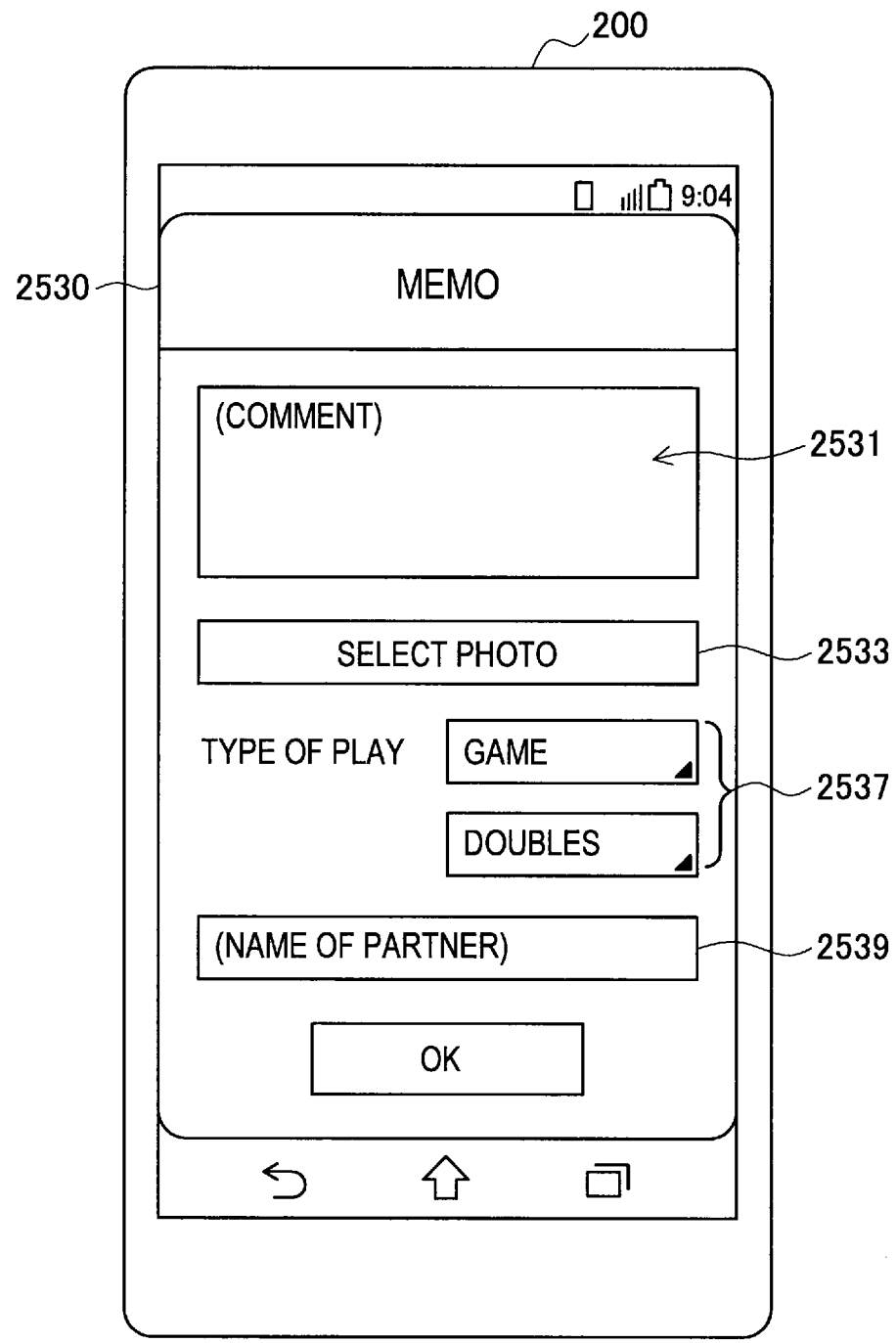

[Fig. 24]
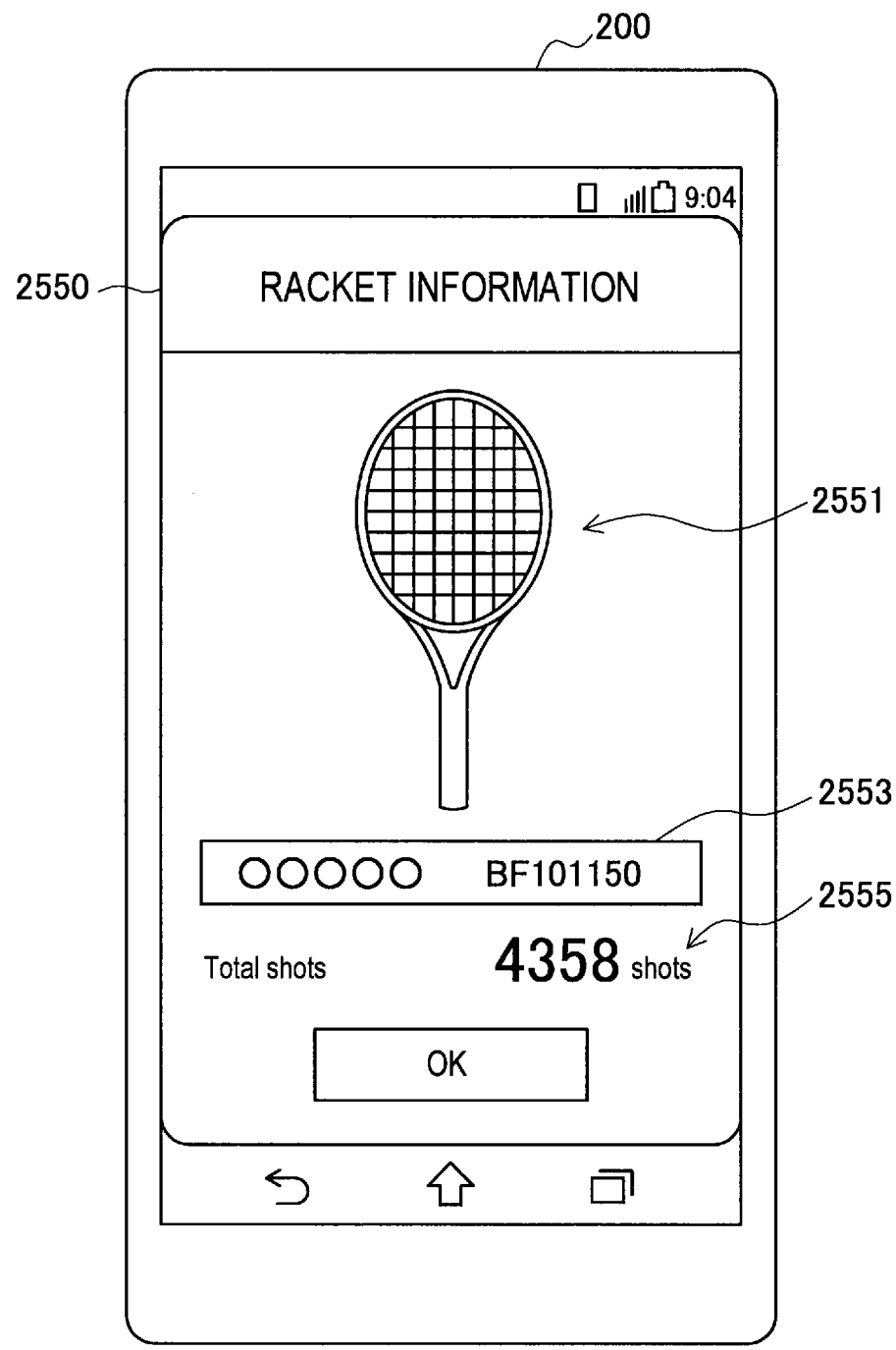

[Fig. 25]
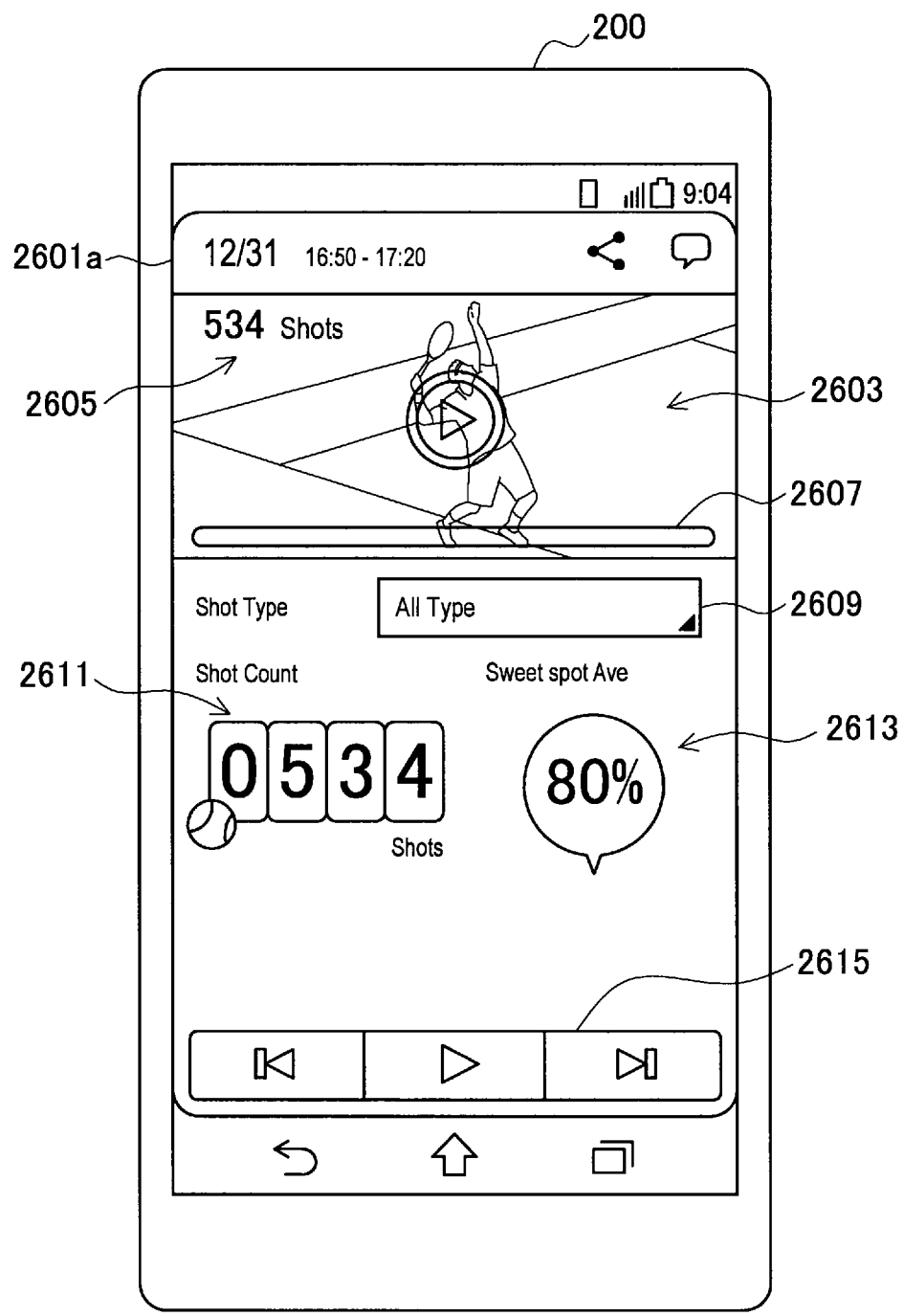

[Fig. 26]
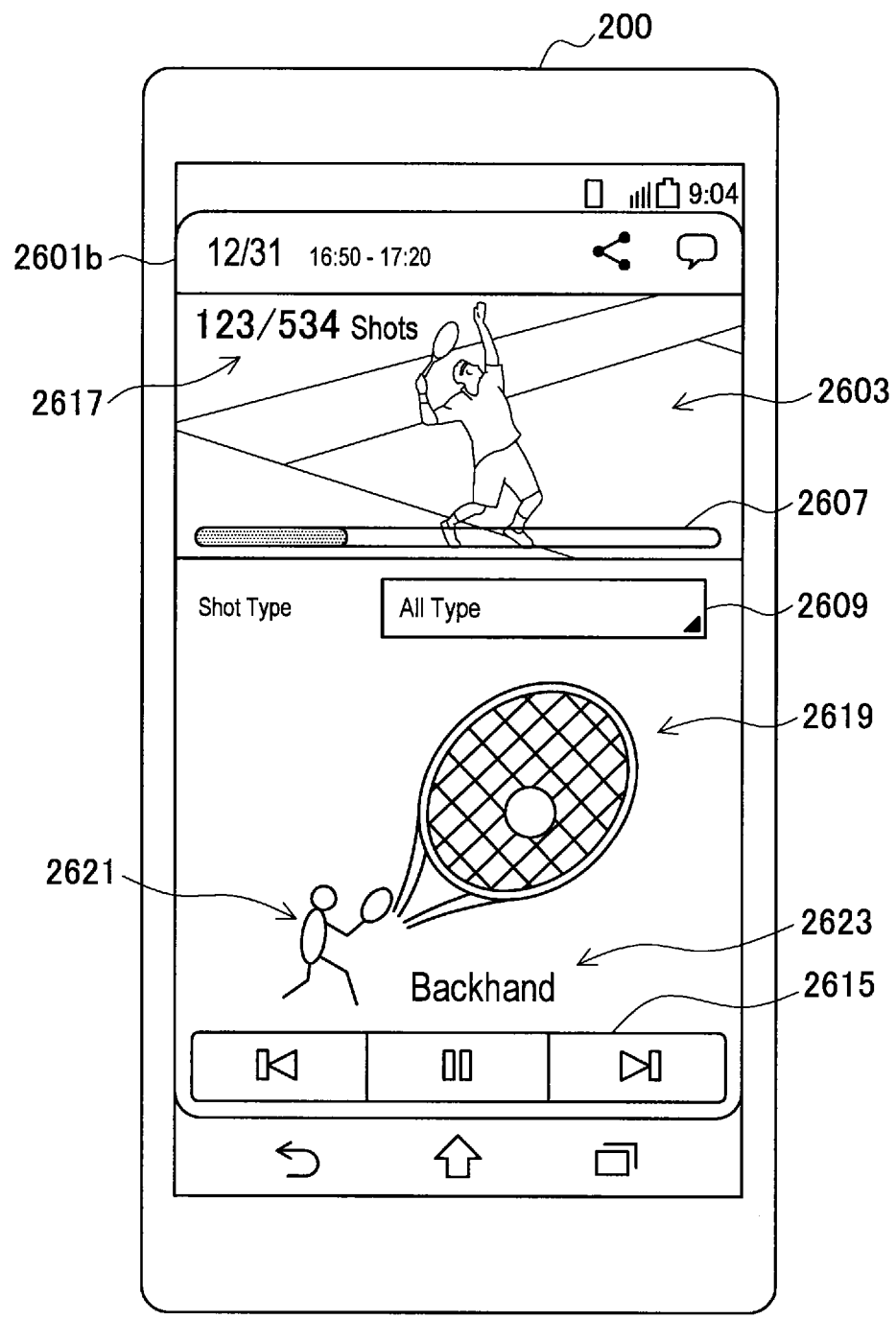

[Fig. 27]
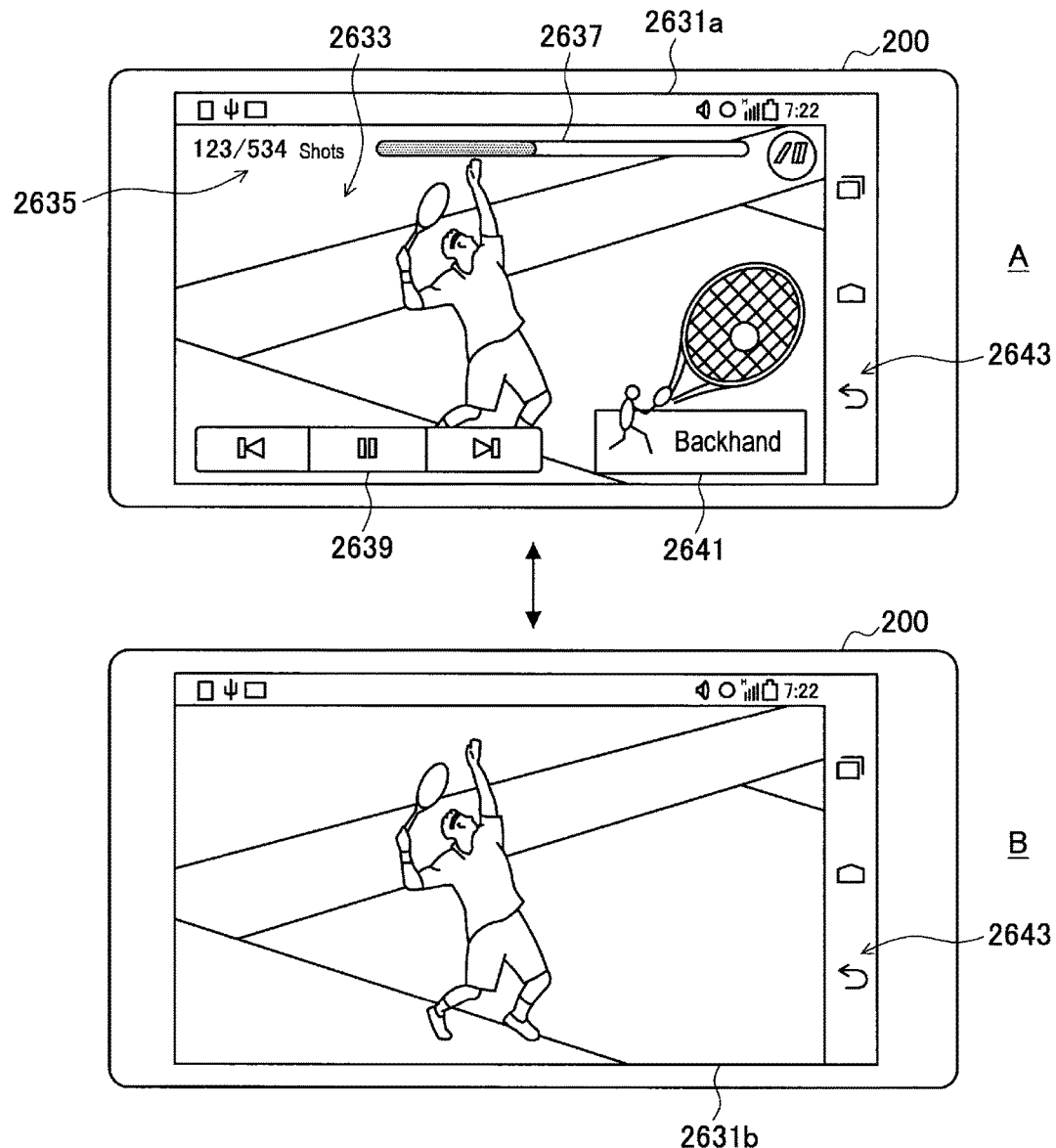

[Fig. 28]
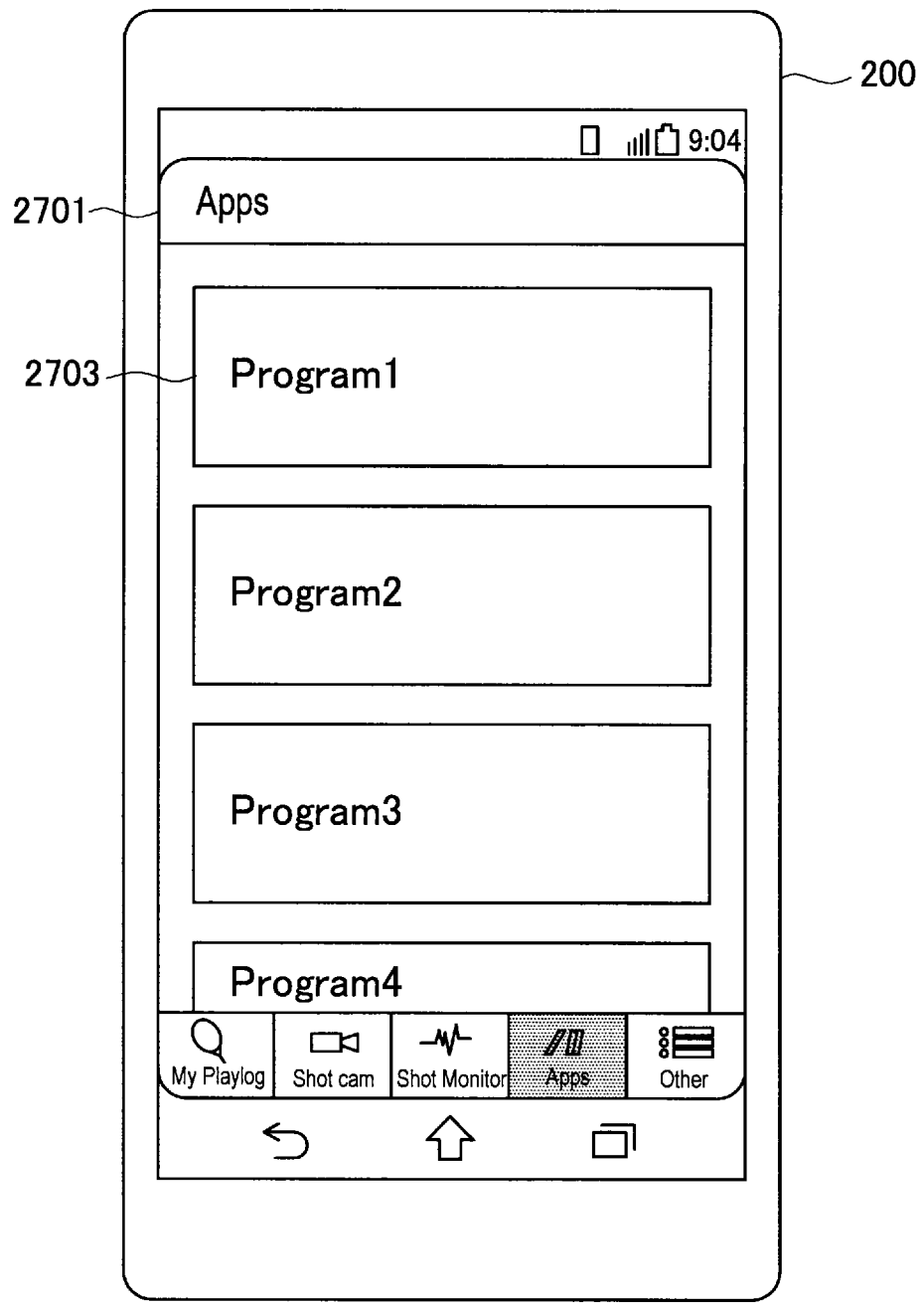

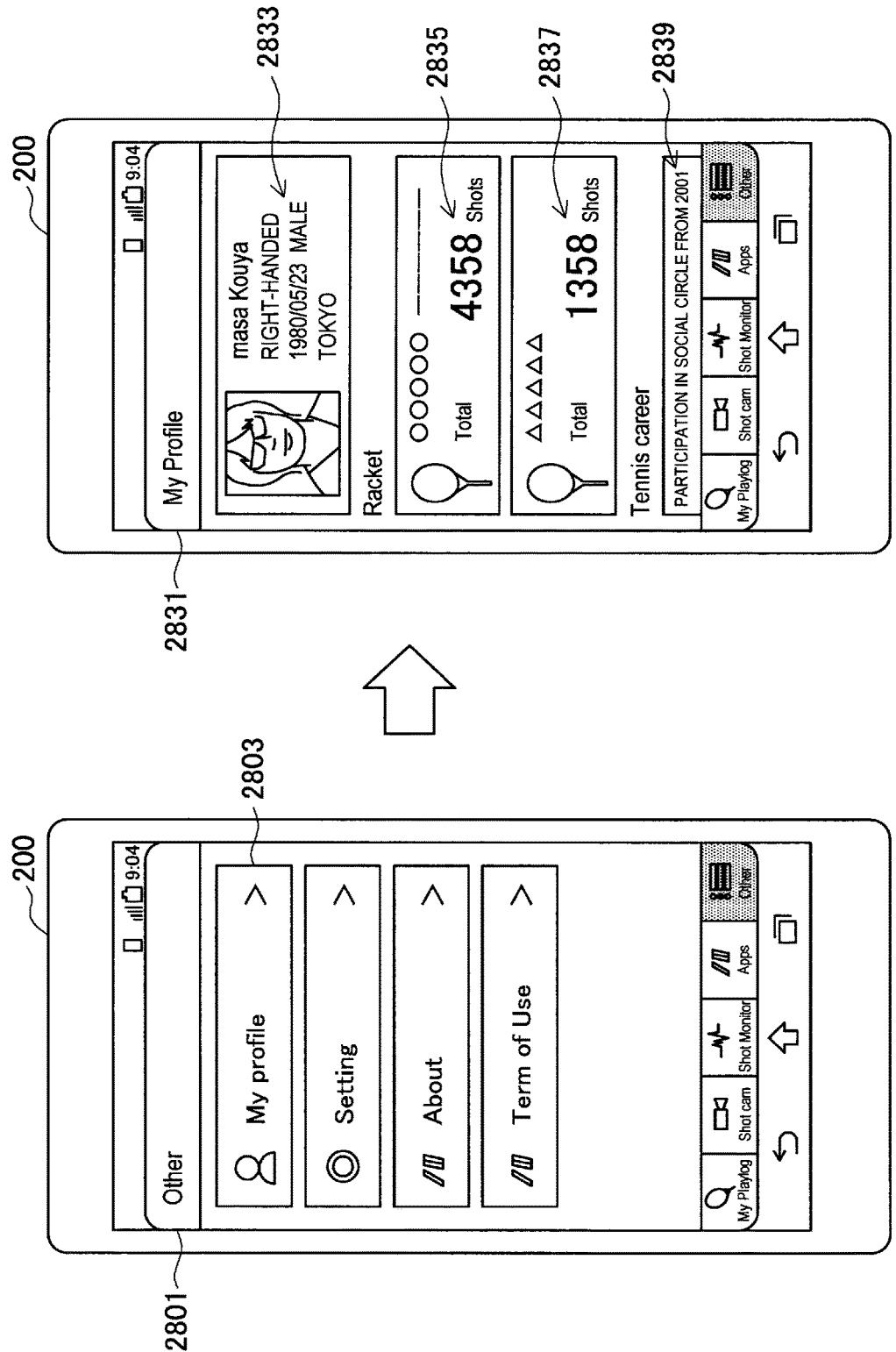
[Fig. 29]

[Fig. 30]
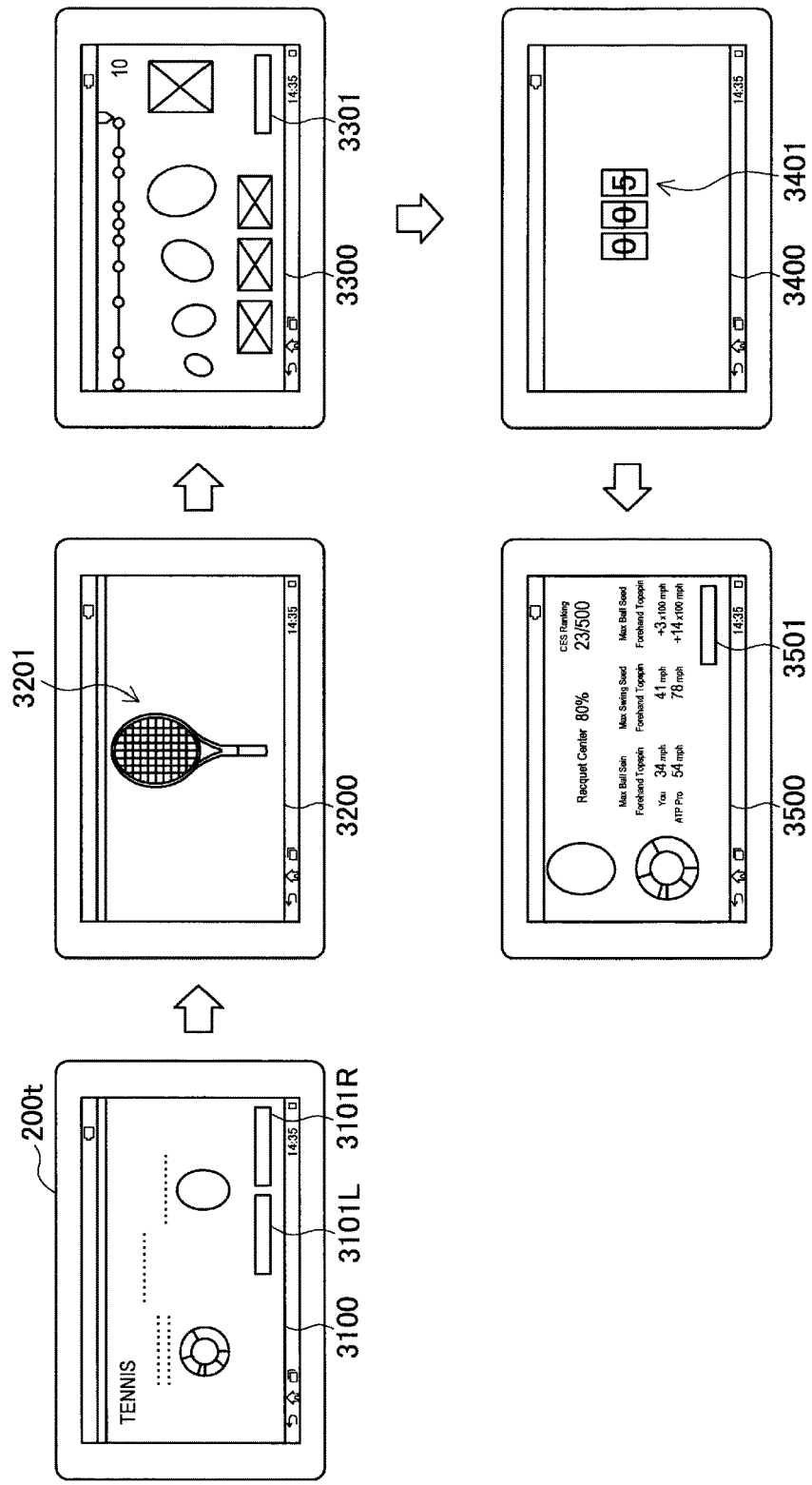

[Fig. 31]
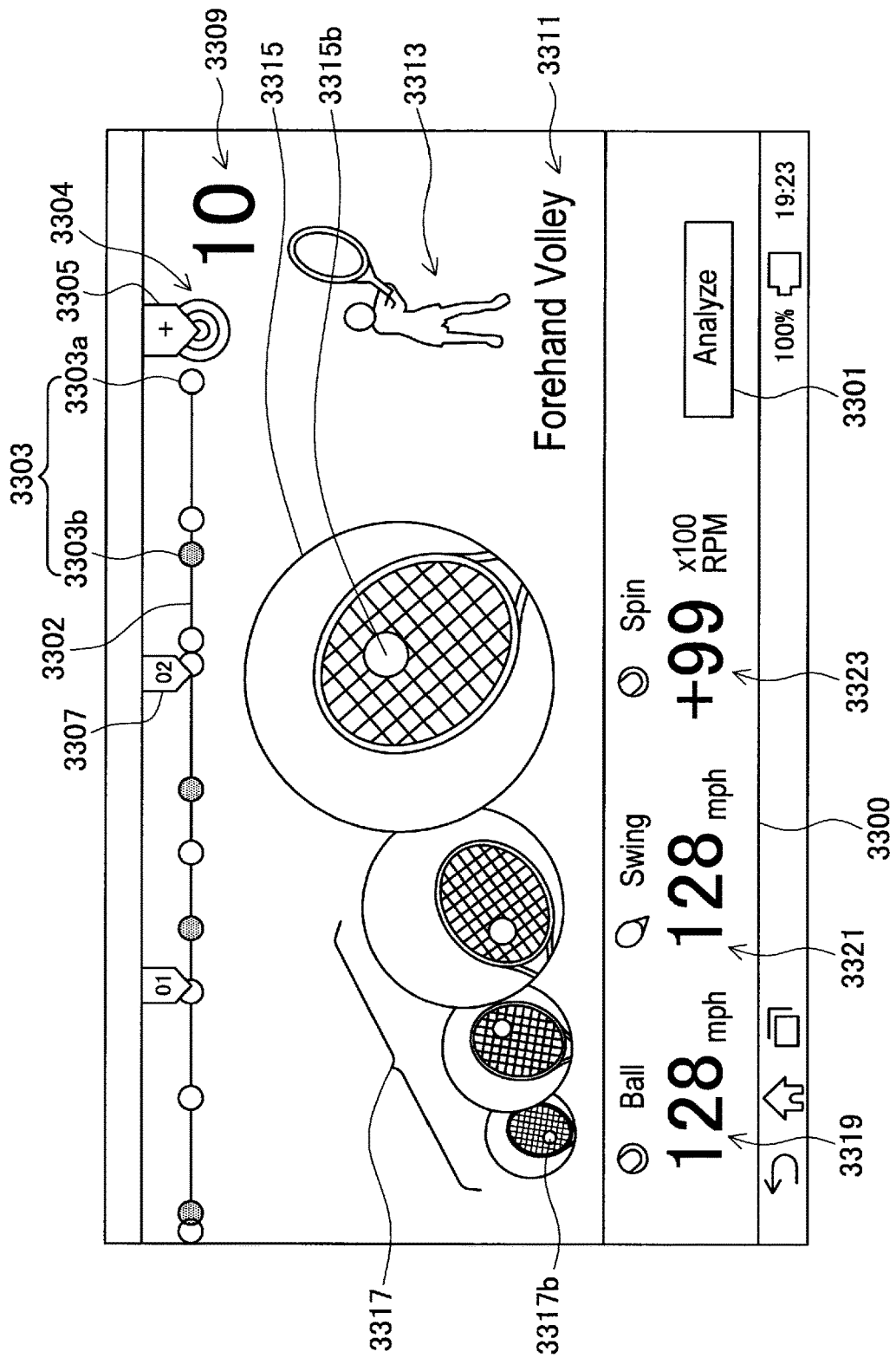

[Fig. 32A]
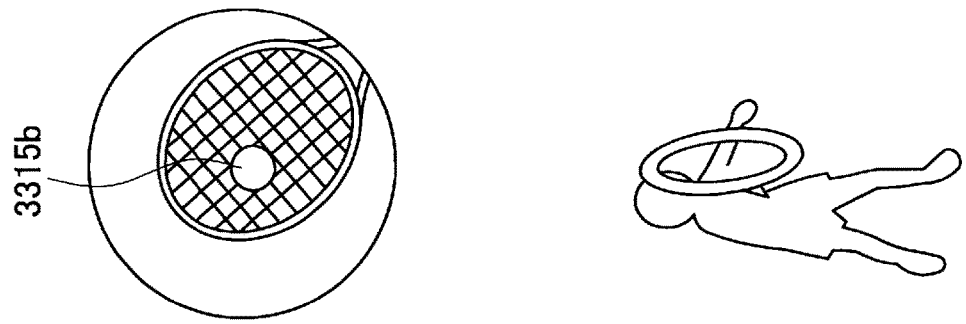
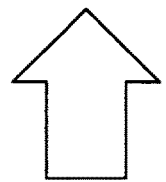
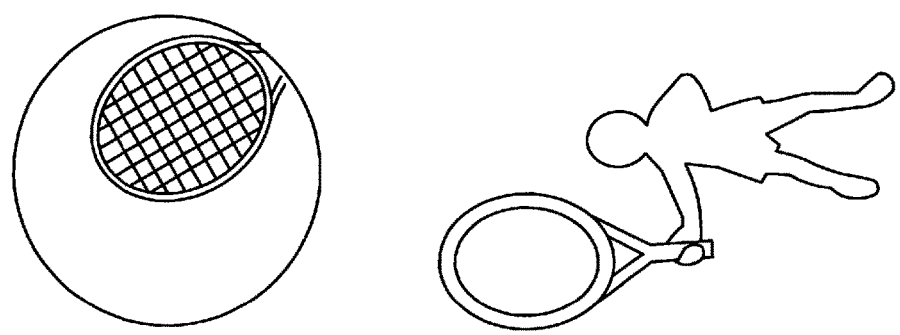
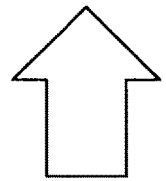
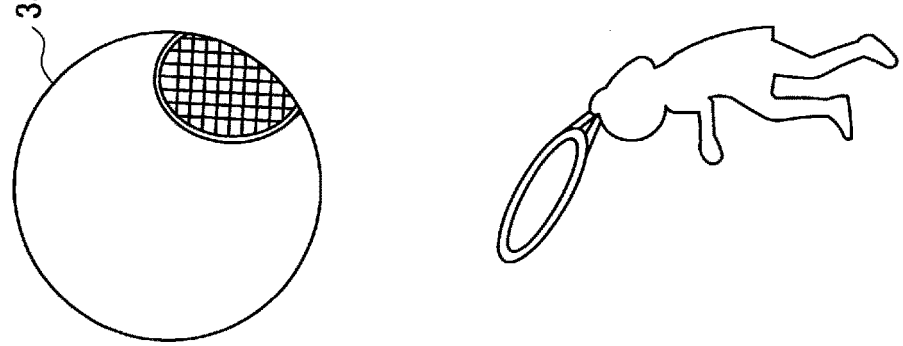

[Fig. 32B]
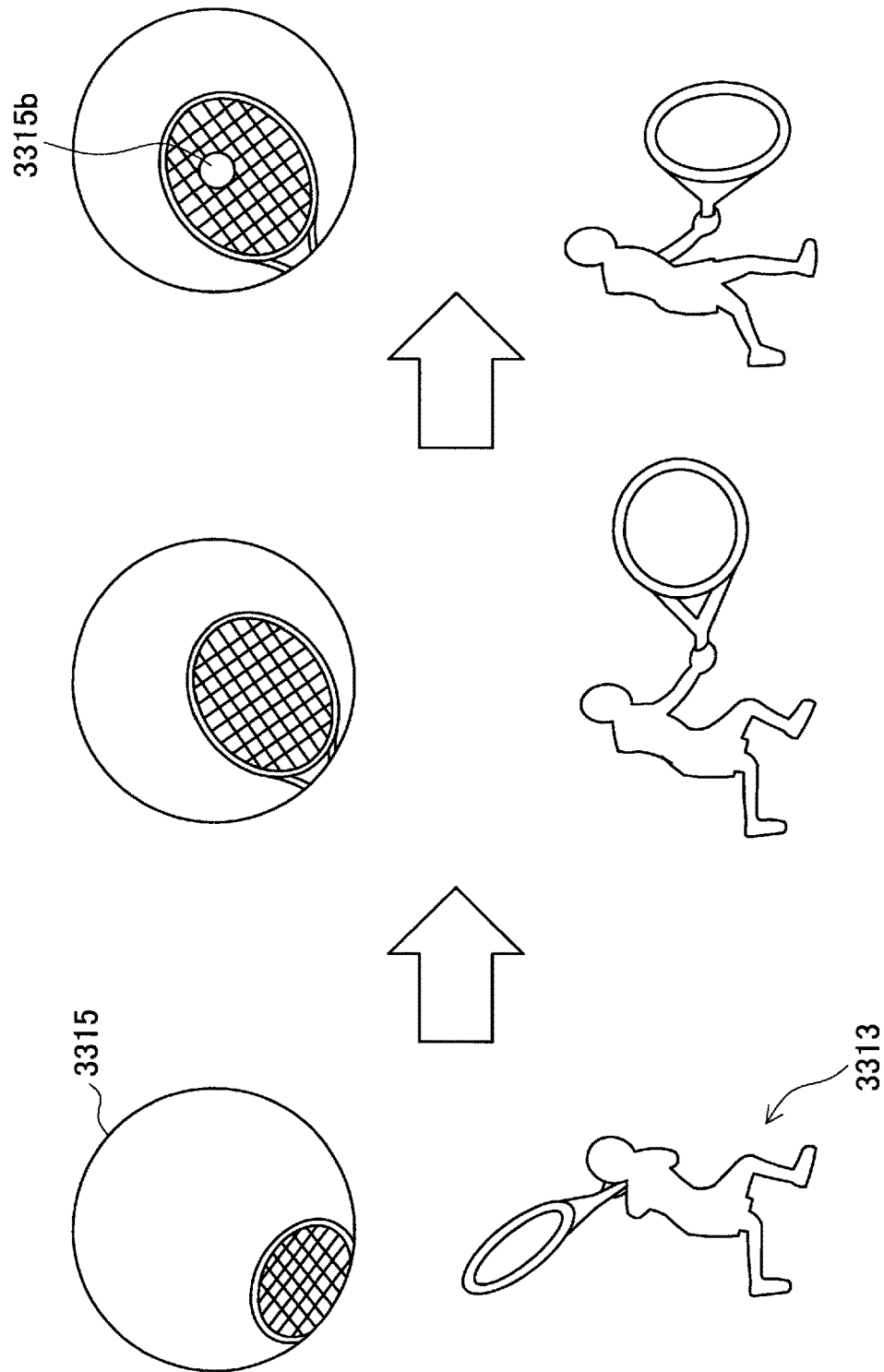

[Fig. 32C]
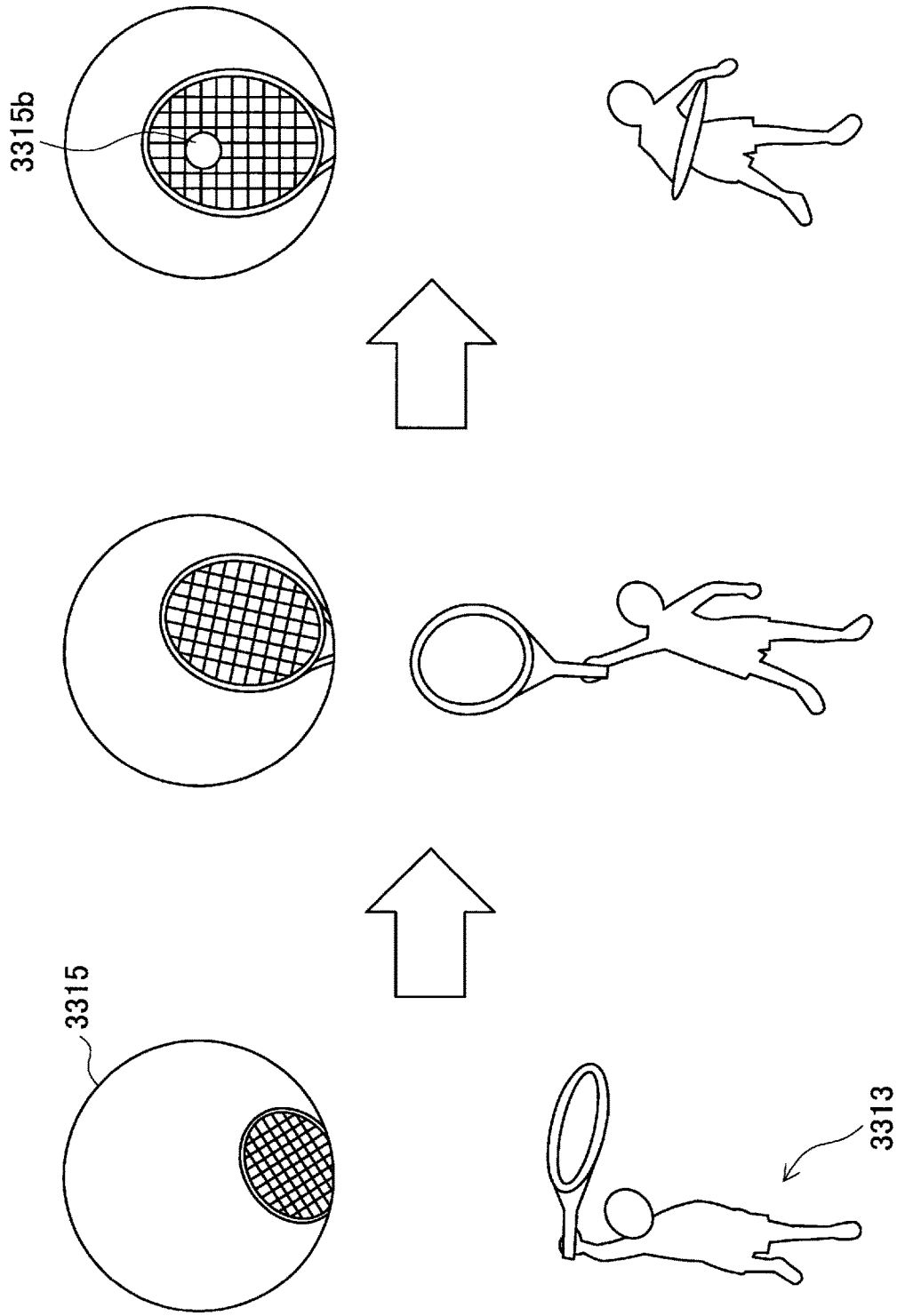

[Fig. 33]
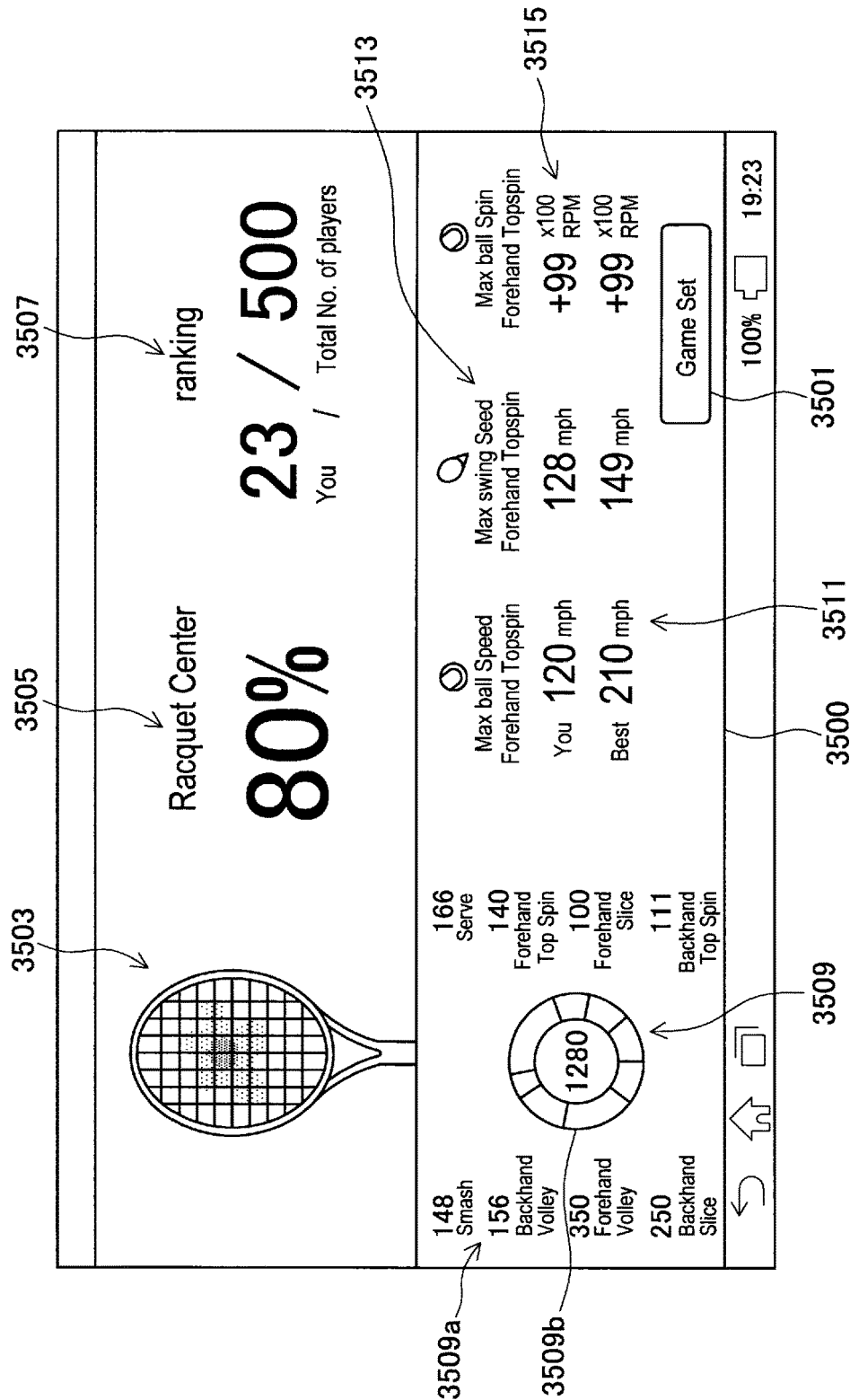

[Fig. 34]
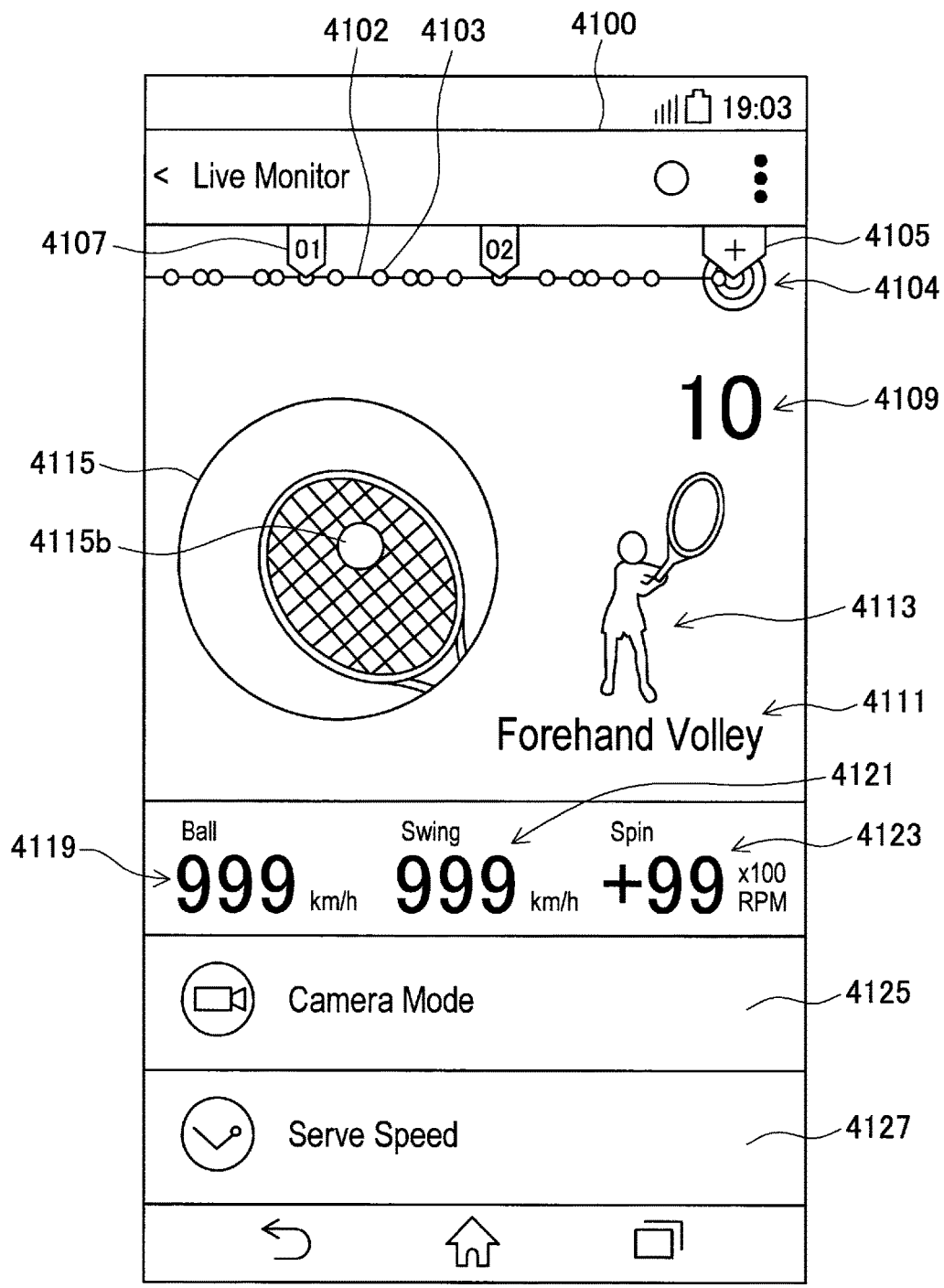

[Fig. 35]
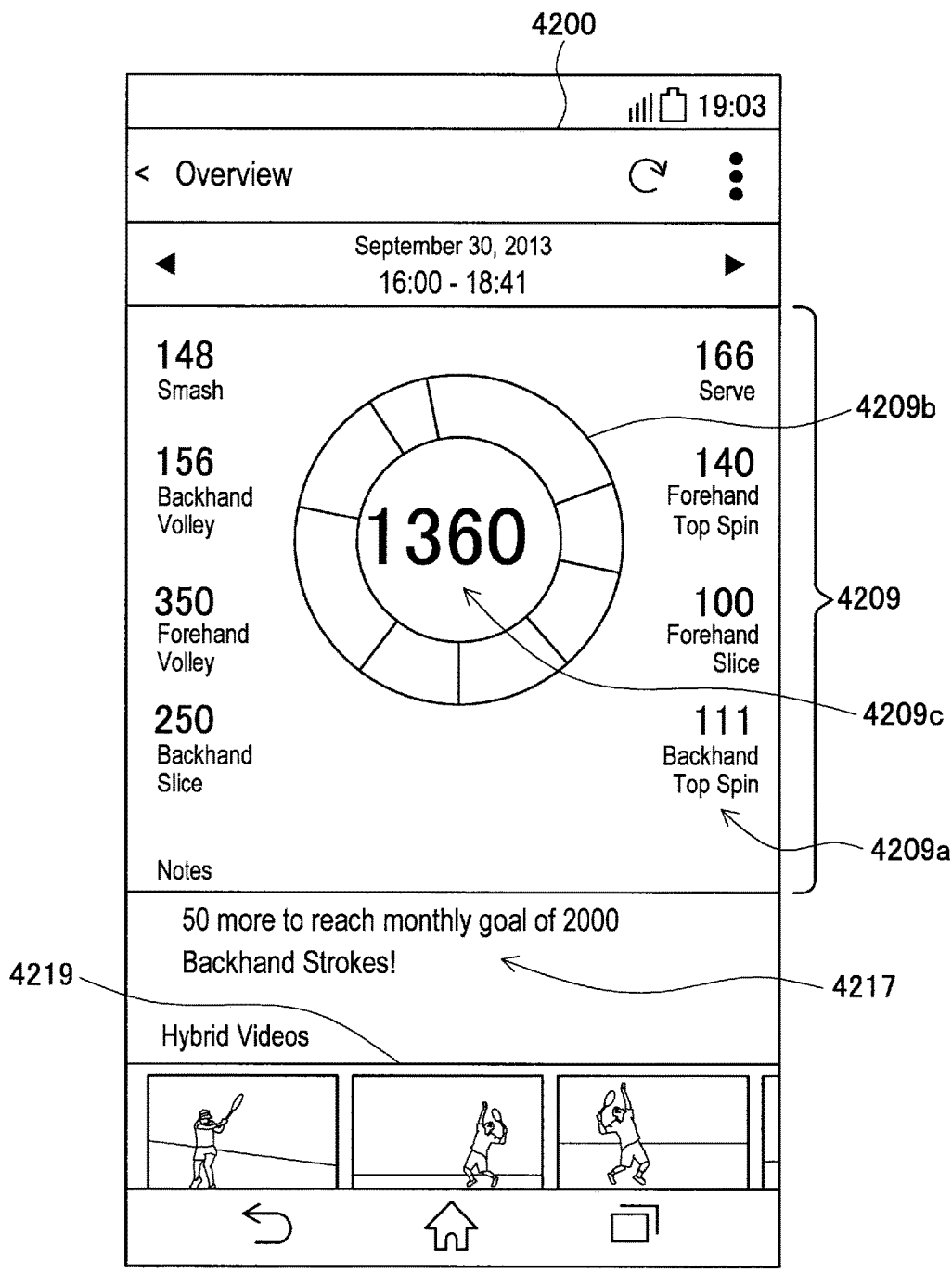

[Fig. 36]
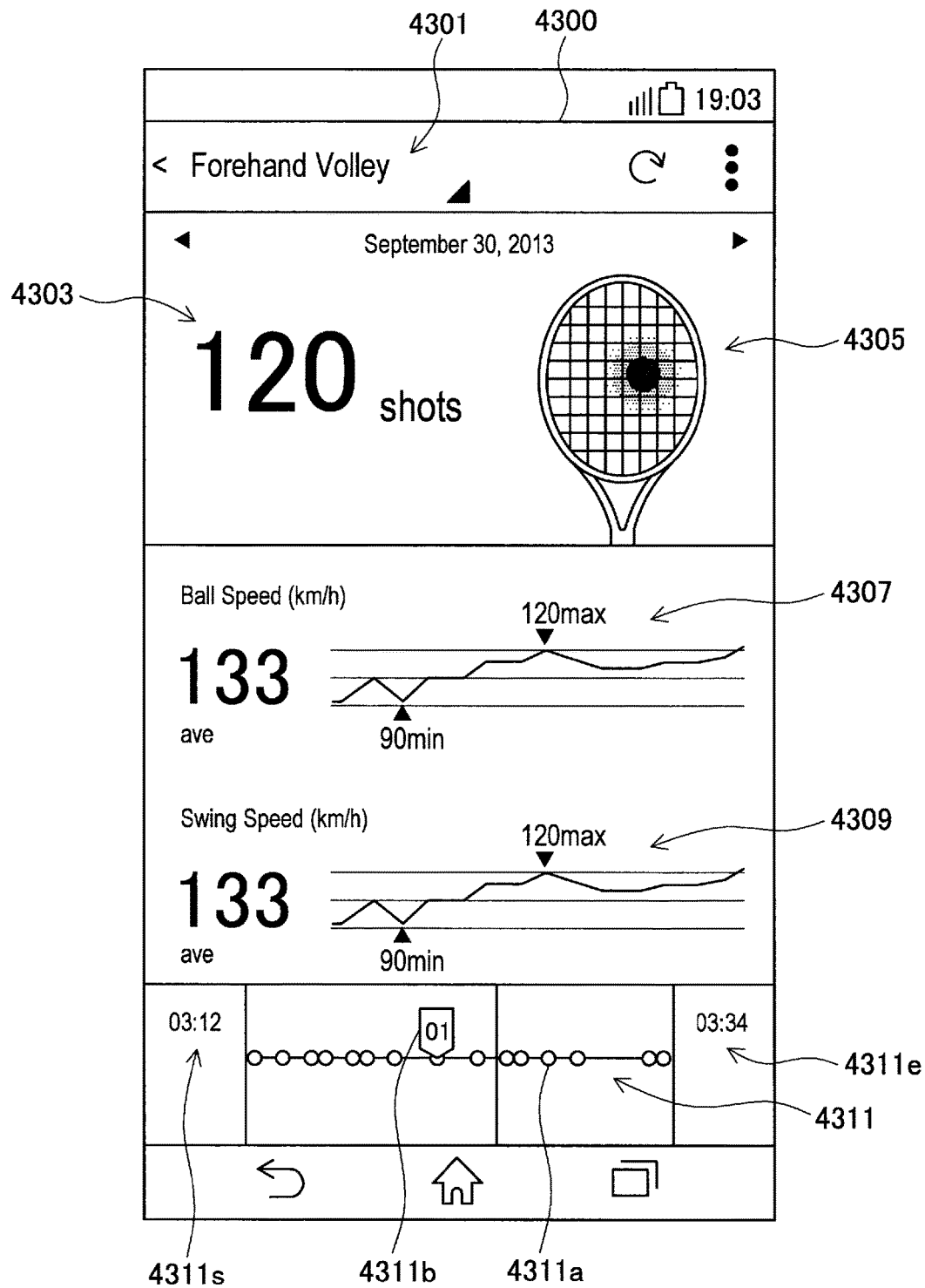

[Fig. 37]
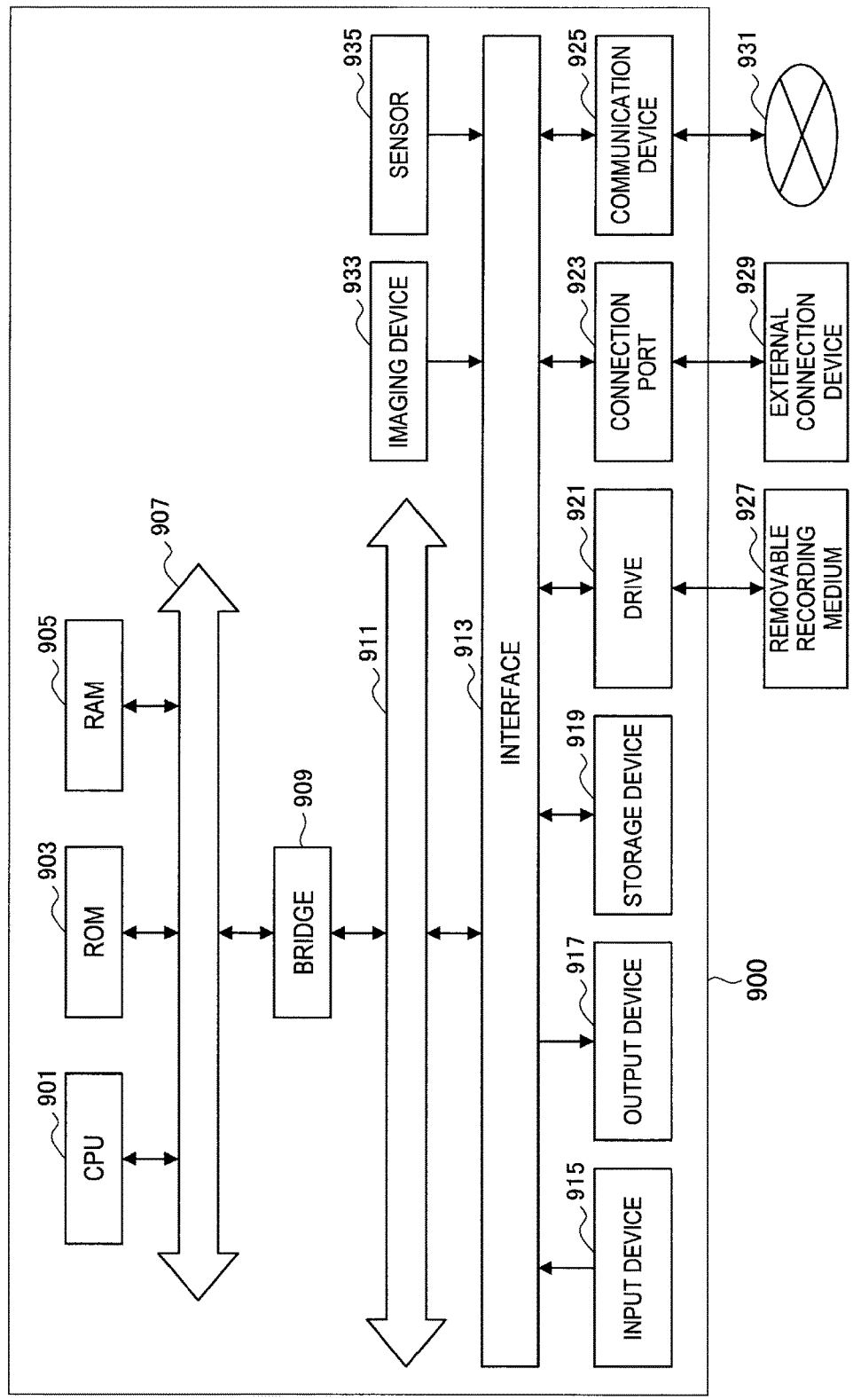

INFORMATION PROCESSING DEVICE, STORAGE MEDIUM, AND INFORMATION PROCESSING METHOD

CROSS REFERENCE TO RELATED APPLICATIONS

This application claims the benefit of Japanese Priority Patent Application JP 2013-124299 filed Jun. 13, 2013, and Japanese Priority Patent Application JP 2013-273488 filed Dec. 27, 2013, the entire contents of each of which are incorporated herein by reference.

TECHNICAL FIELD

The present disclosure relates to an information processing device, a storage medium, and an information processing method.

BACKGROUND ART

Recording plays of sports performed by users in diverse forms is already being performed widely. Recording forms of plays as images is one form of recording plays of sports. Also, for example, PTL 1 discloses a technology for generating diverse kinds of information indicating play states based on information detected by sensors mounted on players or tools.

CITATION LIST

Patent Literature

[PTL 1]
  JP 2009-297057A

SUMMARY

Technical Problem

In recent years, with miniaturization and enhancement of performance of information terminals, performing the foregoing recording of plays of sports is also becoming easier and more extensive. For example, since respective users carry terminal devices such as smartphones having information processing functions and various sensors such as acceleration sensors, cameras, and the like are mounted on such terminal devices, data regarding plays can be collected using the sensors, the cameras, or the like. Also, by transmitting information detected by separately prepared sensor devices to terminal devices, information regarding plays can also be analyzed at the hands of users.

On the other hand, it is hard to say that technologies for referring to recorded plays have been sufficiently developed. Plays of sports are perceived as a given collection such as a swing, a rally, a set, and a game by users. However, technologies for expressing plays recorded as sensor data or images on a basis corresponding to such a collection have not yet been suggested.

Accordingly, embodiments of the present disclosure suggest a novel and improved information processing device, a novel and improved storage medium, and a novel and improved information processing method capable of referring to recorded plays of sports as an appropriate collection.

Solution to Problem

According to one embodiment, an information processing apparatus includes circuitry that analyzes a motion of a user by determining a start time and an end time of a motion session from characteristics of motion data regarding the motion of the user. The motion data is indicative of a type of sports-related motion performed by the user.

According to another embodiment, an information processing method analyzes with circuitry a motion of a user by determining a start time and an end time of a motion session from characteristics of motion data regarding the motion of the user, wherein the motion data is indicative of a type of sports-related motion performed by the user.

According to another embodiment, a non-transitory computer readable storage device has instructions stored therein that when executed by circuitry cause the circuitry to perform a method that includes analyzing with the circuitry a motion of a user by determining a start time and an end time of a motion session from characteristics of motion data regarding the motion of the user, wherein the motion data is indicative of a type of sports-related motion performed by the user.

The type of sports-related motion may be a motion involving the swinging of an object such as a tennis racket, golf club or baseball bat. However, the motion need not involve an object, and could involve the movement of the user's hand, arm and/or foot to propel an object. Examples include a throwing of the object, a rolling of the object (e.g., bowling, or curling), a striking of the object (e.g., volleyball), and a kicking of the object (e.g., soccer).

The circuitry may, but need not, all be contained in a same device that determines the start time and end time of the motion session. For example, the circuitry may be hosted in a smart device, such as a smartphone, or a wearable computer (e.g., smartwatch) that optionally may be programmed via a downloadable app. The results of the analyses may be viewed on the smart device, or conveyed (wirelessly or via a physical wired connection) to another device such as a computer to TV to view the results. Likewise, the circuitry for performing the analysis need not all be located in the smart device, but may be shared with a remote device such as a cloud computing resource. Likewise, the sensors may, but need not, be located on the smart device. Moreover, the sensor may be attached to the object (e.g., tennis racket) and the motion data is subsequently conveyed to the circuitry in the smart device (or computer) to perform the downstream analysis.

Advantageous Effects of Invention

According to an embodiment of the present disclosure described above, recorded plays of sports can be referred to as an appropriate collection.

BRIEF DESCRIPTION OF DRAWINGS

FIG. 1 is a block diagram illustrating a hardware configuration of a sensor device according to an embodiment of the present disclosure.

FIG. 2 is a block diagram illustrating a functional configuration of the sensor device according to the embodiment of the present disclosure.

FIG. 3 is a block diagram illustrating functional configurations of an analysis terminal and a server according to the embodiment of the present disclosure.

FIG. 4 is a block diagram illustrating a modification example of the functional configurations of the analysis terminal and the server according to the embodiment of the present disclosure.

FIG. 5 is a diagram illustrating an example of a timeline screen according to the embodiment of the present disclosure.

FIG. 6 is a diagram for describing indications when the timeline screen illustrated in FIG. 5 is scrolled.

FIG. 7 is a diagram illustrating an example of a related information setting screen according to the embodiment of the present disclosure.

FIG. 8 is a diagram illustrating an example of a calendar screen according to the embodiment of the present disclosure.

FIG. 9 is a diagram for describing indications when the calendar screen illustrated in FIG. 8 is scrolled.

FIG. 10 is a diagram illustrating an example of a ranking screen according to the embodiment of the present disclosure.

FIG. 11 is a diagram for describing indications when the ranking screen illustrated in FIG. 10 is scrolled.

FIG. 12 is a diagram for describing a session defined in the embodiment of the present disclosure.

FIG. 13 is a flowchart illustrating an example of a session generation process according to the embodiment of the present disclosure.

FIG. 14 is a diagram illustrating an example of a state of a shot monitor screen immediately after a shot according to the embodiment of the present disclosure.

FIG. 15 is a diagram illustrating a state of the shot monitor screen after end of analysis according to the embodiment of the present disclosure.

FIG. 16 is a diagram illustrating a modification example of the shot monitor screen according to the embodiment of the present disclosure.

FIG. 17 is a diagram for describing a functional configuration for displaying an analysis result in real time according to the embodiment of the present disclosure.

FIG. 18 is a diagram illustrating an example of an initial screen of a shot cam screen according to the embodiment of the present disclosure.

FIG. 19 is a diagram illustrating an example of an imaging screen of the shot cam screen according to the embodiment of the present disclosure.

FIG. 20 is a diagram illustrating an example of an initial screen of a shotlog screen according to the embodiment of the present disclosure.

FIG. 21 is a diagram illustrating an example in which display of the shotlog screen progresses according to the embodiment of the present disclosure.

FIG. 22 is a diagram illustrating an example of a screen displayed when a type of swing is selected during progress of a shotlog screen according to the embodiment of the present disclosure.

FIG. 23 is a diagram illustrating an example of a related information setting screen which can be transitioned from the shotlog screen according to the embodiment of the present disclosure.

FIG. 24 is a diagram illustrating an example of a racket information screen which can be transitioned from the shotlog screen according to the embodiment of the present disclosure.

FIG. 25 is a diagram illustrating an example of an initial screen of a videolog screen according to the embodiment of the present disclosure.

FIG. 26 is a diagram illustrating an example in which display of a videolog screen progresses according to the embodiment of the present disclosure.

FIG. 27 is a diagram illustrating an example of expanded display of the videolog screen according to the embodiment of the present disclosure.

FIG. 28 is a diagram illustrating an example of an application list screen according to the embodiment of the present disclosure.

FIG. 29 is a diagram illustrating an example of another setting screen and profile screen according to the embodiment of the present disclosure.

FIG. 30 is a diagram for describing screen transition in a second example of another screen according to the embodiment of the present disclosure.

FIG. 31 is a diagram for further describing a third screen illustrated in FIG. 30.

FIG. 32A is a diagram for describing examples of animations of a player icon and a shot position indication illustrated in FIG. 31.

FIG. 32B is a diagram for describing examples of the animations of the player icon and the shot position indication illustrated in FIG. 31.

FIG. 32C is a diagram for describing examples of the animations of the player icon and the shot position indication illustrated in FIG. 31.

FIG. 33 is a diagram for further describing a fifth screen illustrated in FIG. 30.

FIG. 34 is a diagram for describing a third example of another screen according to the embodiment of the present disclosure.

FIG. 35 is a diagram for describing the third example of the other screen according to the embodiment of the present disclosure.

FIG. 36 is a diagram for describing the third example of the other screen according to the embodiment of the present disclosure.

FIG. 37 is block diagram for describing a hardware configuration of an information processing device.

DESCRIPTION OF EMBODIMENTS

Hereinafter, preferred embodiments of the present disclosure will be described in detail with reference to the appended drawings. Through the present description and the drawings, the same reference numerals are given to constituent elements having substantially the same functional configurations and the repeated description will be omitted.

Also, the description will be made in the following order.
1. System configuration
1-1. Configuration of sensor device
1-2. Configuration of analysis terminal
2. Playlog screen
2-1. Timeline screen
2-2. Session
3. Shot monitor screen
4. Shot cam screen
5. Shotlog screen
6. Videolog screen
7. Another screen example 1
8. Another screen example 2
9. Another screen example 3
10. Hardware configuration
11. Supplement (1. System Configuration)

An embodiment of the present disclosure to be described below relates to a sensor device 100 mounted on a racket gripped by a user playing tennis, an analysis terminal 200 receiving sensor data from the sensor device 100, analyzing the sensor data, and generating analysis information indicating a play state of the user, and a server 300 providing a service to the analysis terminal 200. Examples of the analysis terminal 200 can include various terminal devices such as smartphones or tablets and personal computers (PC). The server 300 is a collective of functions realized by one information processing device or a plurality of information processing devices on a network. Also, in other embodiments, sensor data may be transmitted directly from the sensor device 100 to the server 300 without intervention of the analysis terminal 200, and the sensor data may be analyzed on the server 300.

Also, a sport played by the user can be, for example, tennis, or may be any sport. For example, the sport may be table tennis, baseball, golf, or the like in which a ball is hit using a hitting tool as in tennis, may be badminton or the like in which an object other than a ball is hit using a hitting tool, or may be football, volleyball, or the like in which a ball or the like is hit directly by a body part of a user. Alternatively, the sport may be a sport in which no ball is hit or no ball is used.

The sensor device 100 can be mounted indirectly on a user using, for example, a racket, by mounting the sensor device 100 on a tool such as the racket gripped by the user, or can be mounted directly or indirectly on the user in various other ways. For example, the sensor device may be mounted directly on the user, for example, by winding the sensor device around a body part of the user. Also, an embodiment of the present disclosure is not limited to a tool gripped by the user, but the sensor device may be mounted indirectly on the user by mounting the sensor device on a tool, such as clothing or shoes, which the user wears. Also, as will be described below, when the analysis terminal 200 is a wearable terminal, the sensor device 100 and the analysis terminal 200 may be integrated.

As will be described in the present embodiment, the analysis terminal 200 can be, for example, a portable information terminal such as a smartphone or a tablet terminal, but any terminal may be used as long as the terminal has an analysis function. For example, the analysis terminal 200 may be a wearable terminal mountable on a user playing a sport. When the analysis terminal 200 is a wearable terminal, it is easy to provide analysis information directly to a user playing a sport during the play of the sport. Also, in this case, for example, the sensor device 100 and the analysis terminal 200 may be separated, as in a case in which the sensor device 100 is mounted on a racket or the analysis terminal 200 is mounted on a head part of the user, or the function of the sensor device 100 and the function of the analysis terminal 200 may be integrally aggregated in a device mounted on a racket.

Here, the analysis information generated by the analysis terminal 200 is output to the user or the like in various forms. For example, the analysis information may be generated in real time when the user plays a sport. In this case, for example, the analysis information may be output to another user playing the role of a coach or the like watching the plays using a display or the like included in the analysis terminal 200. Also, data may be transmitted from the analysis terminal 200 to the sensor device 100 using a speaker of the analysis terminal 200, or the analysis information may be output directly to the user who is playing using a speaker, a lamp, or the like of the sensor device 100. As described above, when the analysis terminal 200 is a wearable terminal, it is easy to provide the analysis information regarding the user who is playing directly to the user by outputting an audio or outputting an image using a transmission-type display.

(1-1. Configuration of Sensor Device)

FIG. 1 is a block diagram illustrating a hardware configuration of the sensor device according to an embodiment of the present disclosure. Referring to FIG. 1, the sensor device 100 includes a vibration sensor 101, a charge amplifier 103, a 9-axis sensor 105, a CPU 107, a communication module 109, an antenna 111, a removable memory 113, an LED 115, a button 117, a crystal oscillator 119, a USB port 121, and a secondary cell module 123.

The vibration sensor 101 is a sensor or the like that uses, for example, a piezoelectric element or an electrostatic capacitance and detects vibration of the racket on which the sensor device 100 is mounted. The vibration of the racket is generated, for example, at the time of a shot (impact of a ball). A vibration waveform detected by the vibration sensor 101 is converted into a voltage signal by the charge amplifier 103, and then is input to the CPU 107.

The 9-axis sensor 105 is a sensor in which a triaxial acceleration sensor, a triaxial gyro sensor, and a triaxial geomagnetic sensor are combined and detects a motion (for example, acceleration, inclination, and an azimuth direction) of the racket on which the sensor device 100 is mounted. Data detected by the 9-axis sensor 105 is also input to the CPU 107.

The central processing unit (CPU) 107 controls all of the operations of the sensor device 100. For example, the CPU 107 at least temporarily stores the vibration waveform input from the vibration sensor 101 via the charge amplifier 103 or the data input from the 9-axis sensor 105 in the removable memory 113 in association with a time of a real time clock (RTC) defined by the crystal oscillator 119. For example, the data can be recorded for each shot. When a process mode is an on-line mode (real time mode), the CPU 107 transmits the data to the analysis terminal 200 via the communication module 109 and the antenna 111 in real time. Also, when the process mode is an off-line mode, the CPU 107 reads data stored in the removable memory 113 and transmits the data to the analysis terminal 200 via the USB port 121 in a wired communication manner. An example of the removable memory 113 includes an SD card.

Further, the CPU 107 may display information indicating a state of the sensor device 100, e.g., information indicating the process mode, a communication state, a cell state, or the like, by emitting light from the light emitting diode (LED) 115. When the analysis information is received from the analysis terminal 200 via the antenna 111 and the communication module 109, the CPU 107 may display the analysis information by emitting light from the LED 115. Also, the CPU 107 may switch the process mode or the like of the sensor device 100 in response to a user's operation input acquired by the button 117. The CPU 107 operates according to firmware written on a built-in memory, but the firmware can be rewritten by an input from the USB port 121.

The communication module 109 transmits data acquired by the sensor device 100 to the analysis terminal 200 by wireless communication via the antenna 111. The communication module 109 transmits data to the analysis terminal 200 by, for example, wireless communication which conforms to a communication standard such as Bluetooth (registered trademark). As described above, the analysis information may be received from the analysis terminal 200 by the communication module 109 and the antenna 111, and the received analysis information may be output from the sensor device 100 to the user who is playing a sport using the LED 115 or a speaker (not illustrated).

The USB port 121 is used for communication with the analysis terminal 200 or the like via a Universal Serial Bus (USB). The sensor device 100 is preferably small-sized so as to be mounted on a racket, and thus the USB port 121 may be a micro USB port. Data stored in the removable memory 113 can be transmitted to the analysis terminal 200 by wired communication via the USB port 121. Also, the USB port 121 can also be used for communication when the firmware of the CPU 107 is rewritten. Also, the USB port 121 can also be used to charge the secondary cell module 123 in addition to data communication.

FIG. 2 is a block diagram illustrating a functional configuration of the sensor device according to the embodiment of the present disclosure. In FIG. 2, functions realized by the CPU 107 or the like of the sensor device 100 described with reference to FIG. 1 are shown by functional blocks. Hereinafter, the functional configuration will be described according to a flow of data indicated by (1) to (7) in the drawing.

(1) The CPU 107 performs vibration sensor control 151. According to this control, the vibration waveform is input from the vibration sensor 101 to the CPU 107 via the charge amplifier 103. The CPU 107 performs impact detection 153 and data compression 155 based on the vibration waveform. (2) On the other hand, the CPU 107 performs 9-axis sensor control 157 and data indicating a motion of the racket is detected by the 9-axis sensor 105 according to this control. (3) The CPU 107 then performs RTC control 159 using the crystal oscillator 119 and acquires accurate time information. For example, in sensor packet generation 161, when an impact of a ball is detected in the impact detection 153, data obtained by associating shot data including the data acquired by the vibration sensor 101 and the 9-axis sensor 105 before and after the detection of the impact with time information acquired by the RTC control 159 is generated as a data packet. Accordingly, the shot data has the time information (time stamp), for example, when the impact corresponds to an impact occurrence time point.

(4) In system control 163, data is recorded on a file system 167 of the removable memory 113 via a memory reader/writer (R/W) 165. (5) Also, in the system control 163, data stored in the file system 167 is read via the memory R/W 165. (6) In the system control 163, the data packet generated in the sensor packet generation 161 is wirelessly transmitted to the analysis terminal 200 via a sensor communication protocol 169 and a communication protocol stack 171. The wireless communication is performed by controlling the communication module 109 and the antenna 111 through communication hardware control 173. Alternatively, the data stored in the file system 167 may be transmitted to the analysis terminal 200 via the USB port 121 in a wired manner by the function of the USB control 175.

In addition, the CPU 107 can further realize, for example, various functions 177 such as power control, charge control, sleep control, and button/LED control and functions such as bootstrap loader 179 and mode switching 181. Also, examples of a process mode in which switching is performed by the mode switching 181 include on-line (real time), off-line, data sink, sleep, Bluetooth pairing, and firmware rewriting.

(1-2. Configuration of Analysis Terminal)

FIG. 3 is a block diagram illustrating functional configurations of the analysis terminal and the server according to the embodiment of the present disclosure. The analysis terminal 200 and the server 300 can be realized using, for example, a hardware configuration of an information processing device to be described below. In FIG. 3, functions of the analysis terminal 200 and the server 300 realized by a processor such as a CPU included in the information processing device are indicated by functional blocks. Hereinafter, the functional configuration will be described according to a flow of data indicated by (1) to (6) in the drawing.

Also, in the illustrated example, the server 300 is mounted as three servers 300a to 300c, but this mounting is merely an example. The functions of the server 300 to be described below may be realized by aggregation to a single sever or may be realized by separation into more numerous servers.

(1) Data (sensor data) transmitted from the sensor device 100 using wireless communication such as Bluetooth (registered trademark), USB connection, or the like is received according to a function of USB control 211 or wireless communication control 213 realized by an application 205 of the analysis terminal 200. The sensor data can include motion data indicating a motion of a user who is playing a sport, e.g., data detected by the vibration sensor 101 or the 9-axis sensor 105 in the sensor device 100. Also, in addition to this function, the application 205 can realize functions of server communication 209, a metadata DB 215, camera control 217, analysis/statistics 219, and the like. Also, only representative modules of the application 205 are illustrated in the drawing, and other diverse modules can be included in the application 205.

Here, a user interface (UI) 203 and a software interface 207 are mounted on an operating system (OS) 201 of the analysis terminal 200 in addition to the application 205. The UI 203 functions to output information to the user by displaying an image on a display included in the analysis terminal 200 and acquire an operation input of the user via a pointing device such as a touch panel installed in the display. The software interface 207 is an interface that has an order of interlocking with, for example, an analysis library 221, a moving-image analysis library 233, and the like to be described below.

(2) The sensor data received by the application 205 is input to the analysis library 221 via the software interface 207. In the analysis library 221, the sensor data is received via a sensor communication protocol 231, the received sensor data is analyzed by analysis functions such as impact determination 223, spin determination/posture detection 225, swing determination 227, and the like, and analysis information is generated as the analysis result. That is, in the analysis library 221, the sensor data (primary data) is converted into the analysis information (secondary data). The foregoing analysis functions appropriately refer to a database prepared in the analysis library 221 such as a racket DB 229.

As described above, when an impact of the ball is detected based on the detection result of the vibration sensor 101, shot data including data detected by the vibration sensor 101 and the 9-axis sensor 105 before and after the detection of the impact is transmitted as sensor data from the sensor device 100. In the impact determination 223, for example, data detected by the vibration sensor 101 is further analyzed to determine a position (impact position) at which the impact occurs on the racket. Information regarding the determined impact position may be output as analysis information, or may be provided to the swing determination 227 to be used for new analysis.

On the other hand, in the spin determination/posture detection 225, a posture of the racket is detected based on the sensor data and a direction of spin of a hit ball is determined from an angle of the ball with respect to the racket or a movement direction of the racket at the time of the impact. In the swing determination 227, types (a forehand, a backhand, a serve, and the like) or quality (for example, whether the impact position is included in a sweet spot) of swings of the user at the time of the impact are determined based on, for example, the data included in the sensor data and provided from the 9-axis sensor 105. Also, in other embodiments, some other types of motions may be determined along with or instead of the swing determination 227.

In the racket DB 229, information such as the shapes, materials, vibration transfer characteristics, and the like of diverse rackets used by the user is recorded. For example, in the impact determination 223, the swing determination 227, or the like, data regarding the racket gripped by the user is acquired with reference to the racket DB 229, and then a determination process can be performed.

(3) The analysis information generated by the analysis library 221 is provided to the application 205 via the software interface 207. At this time, the sensor data may be provided along with the analysis information.

In the application 205, a new analysis process can be performed by the function of the analysis/statistics 219. For example, the analysis process herein can be performed using an interval between a starting time and an ending time determined based on characteristics of data (data which is detected by the vibration sensor 101 or the 9-axis sensor 105 in the sensor device 100 and indicates a motion of the user) included in the sensor data, as a basis. As will be described below, in the present description, this interval is referred to as a session. The application 205 can further have a function of recording the analysis information acquired by the function of the analysis/statistics 219 at least temporarily in a memory or a storage in association with a session.

Also, in the function of the analysis/statistics 219, new analysis information may be acquired, for example, by further processing the analysis information generated by the analysis library 221 statistically (even in this case, the function of the analysis/statistics 219 can be said to indirectly analyze the sensor data and acquire the analysis information), and the analysis information may be acquired by newly analyzing the sensor data.

Also, in the application 205, camera control based on the analysis information acquired by the function of the analysis library 221 or the analysis/statistics 219 can be performed by the function of the camera control 217. For example, in the function of the camera control 217, a captured image may be recorded only in intervals before and after an impact or a swing. Also, in the function of the camera control 217, a captured image may be recorded in association with an interval of a session.

Further, the analysis information acquired by the function of the analysis library 221 or the analysis/statistics 219 can be used as metadata recorded in the metadata DB 215 and associated with a captured image or the like. Also, the analysis information acquired by the function of the analysis library 221 or the analysis/statistics 219 can be output, for example, as an image or an audio to the user via the UI 203. At this time, the analysis information may be output to the user on a session basis by the UI 203. More specifically, an image representing the analysis information can be displayed on the display of the analysis terminal 200 or an audio corresponding to the analysis information can be output from the speaker of the analysis terminal 200. Also, more specific examples of screens which can be displayed on the display unit of the analysis terminal 200 will be described later.

Further, not only the foregoing analysis library 221 but also the moving-image analysis library 233 may be installed in the analysis terminal 200, and an image of the user who is playing a sport may be analyzed by a moving-image analysis engine 235. The analysis result of the image may be used in combination or composition of the analysis result of the sensor data in, for example, the analysis library 221, or may be presented individually to the user via the UI 203.

(4) Further, the analysis information acquired by the function of the analysis library 221 or the analysis/statistics 219 can be uploaded to the server 300a via a network by the function of the server communication 209. The server 300a is, for example, a server configured to provide a service related to the present embodiment and receives the analysis information from the analysis terminal 200 via a web application program interface (API) 301. The received analysis information can be recorded on a DB 313 of the server 300a. (5) The analysis result recorded on the DB 313 may be further processed by a function of analysis/statistics 305 provided in a server application 303, as necessary. In the function of the analysis/statistics 305, for example, new statistics data (third data) can be generated by further processing the analysis information (secondary data) of each user statistically. (6) The analysis information of each user is managed by a function of user management 307 and is provided to the web server 300b as necessary. Further, the server application 303 may have a function of racket DB update 309 to update the data of the racket DB 229 present in the analysis terminal 200. Also, the server application 303 may have a function of firmware update 311 to update firmware of the sensor device 100 via the analysis terminal 200 or by direct communication with the sensor device 100.

The web server 300b includes a UI 317 and enables a plurality of users to mutually share the analysis information, for example, via a web. For example, not only the analysis information of a user carrying the analysis terminal 200 illustrated in the drawing but also the analysis information of another user can be referred to by the UI 317. At this time, the referable analysis information may be, for example, information acquired by the function of the analysis library 221 or the analysis/statistics 219 of the analysis terminal 200 of each user or may be information acquired by the function of the analysis/statistics 305 provided by the server application 303 of the server 300a. Further, the system may include an external server 300c that realizes functions of billing 319, user authentication 321, application update 323, and the like.

FIG. 4 is a block diagram illustrating a modification example of the functional configurations of the analysis terminal and the server according to the embodiment of the present disclosure. In the present modification example, the configuration of a UI 253 and an application 255 mounted on an OS 251 of an analysis terminal 250 (for example, various terminal devices such as a smartphone, a tablet or a PC) is different from the example of FIG. 3 described above. Also, only representative modules of the application 255 are illustrated in the drawing, and other diverse modules can be included in the application 255. As will be described in the present modification example, in an embodiment of the present disclosure, functions to be described here can be realized as applications corresponding to any OS using any program language.

In the present modification example, data (sensor data) transmitted from the sensor device 100 using wireless communication such as Bluetooth (registered trademark) is received by a function of wireless communication control 263 of the application 255 and is input to the analysis library 221. In the application 255, the analysis can be further performed by analysis/statistics 269 based on the analysis information or the sensor data acquired by the analysis library 221. The analysis information acquired by the function of the analysis library 221 or the analysis/statistics 269 can be used by a function of, for example, camera control 267 or metadata DB 265 and can also be output to the user via the UI 253. Also, in the application 255, recording of a captured image acquired by a camera can be controlled by a function of moving-image storage 261.

Also, the foregoing analysis/statistics 269 can realize the same function as the analysis/statistics 219 in the example of FIG. 3. That is, the analysis process in the analysis/statistics 269 can be performed, for example, using an interval between a starting time and an ending time determined based on characteristics of data (data which is detected by the vibration sensor 101 or the 9-axis sensor 105 in the sensor device 100 and indicates a motion of a user) included in the sensor data as a basis. The application 255 may further include a function of recording the analysis information acquired by the function of the analysis/statistics 269 in a memory or storage at least temporarily in association with a session.

(2. Playlog Screen) In the present embodiment, the analysis information of the user can be displayed in various forms, for example, on the display of the analysis terminal 200 or a display of another terminal device referring to information uploaded from the analysis terminal 200 to the server 300. Hereinafter, several specific examples of a screen on which the analysis information is displayed will be shown and described. Images exemplified below can be displayed, for example, on the display by the UI 203 of the analysis terminal 200.

First, several examples of a playlog screen will be described. Referring to the playlog screen, various kinds of analysis information of the user can be reviewed as logs. The user can review his or her plays, referring to the analysis information on the playlog screen chiefly after the plays or during the play, and thus can make use of the plays for proficiency in a sport.

(2-1. Timeline Screen)

FIG. 5 is a diagram illustrating an example of a timeline screen according to the embodiment of the present disclosure. FIG. 6 is a diagram for describing indications when the timeline screen illustrated in FIG. 5 is scrolled. Referring to FIG. 5, a timeline screen 2001 is displayed on the display of the analysis terminal 200.

(Daily Basis Indication)

The timeline screen 2001 includes a daily basis indication 2003. In FIG. 6, a daily basis indication 2003*a* on 31 December and a daily basis indication 2003*b* on 30 December are illustrated. The user can sequentially display such daily basis indications 2003 on the display, for example, by scrolling the timeline screen 2001. In the illustrated example, a month indication 2003*c* or a year indication 2003*d* is, for example, an indication in which the previous daily basis indication 2003 is folded. The daily basis indication 2003 can be spread, for example, from a year to a month or from a month to a day to be displayed using spreading buttons 2004*c* and 2004*d* shown in the indication.

In the illustrated example, the daily basis indication 2003 includes a date indication 2005, thumbnail images 2007, a number-of-shots indication 2009, and a hit ratio indication 2011.

The thumbnail images 2007 are images automatically extracted or selected by the user among captured images (hereinafter also referred to as play images) captured on that day (in the example of FIG. 5, on 31 December) during a play. The thumbnail images 2007 may be automatically trimmed using the user who is playing or the like as a criterion according to, for example, a result of the image analysis. As the thumbnail images 2007, a plurality of images may be selected and allocated as in the example illustrated in FIG. 5 or a single image may be selected. Also, the thumbnail images 2007 may be linked to a moving image.

The number-of-shots indication 2009 is an indication for the number of shots (impact of a ball) detected on that day based on the sensor data from the sensor device 100 mounted on a racket.

The hit ratio indication 2011 displays a ratio of shots satisfying a predetermined condition to shots detected on that day, e.g., a ratio of shots in which a ball is hit at a sweet spot (for example, which is defined as a position or the like at which vibration of a racket is the minimum when the ball is hit). As in the hit ratio indication 2011 shown in each of the daily basis indication 2003*a* and the daily basis indication 2003*b* in FIG. 6, the color or size of the hit ratio indication 2011 may be changed and displayed according to a magnitude of a hit ratio (in the illustrated example, 80% is determined to be large and 30% is determined to be small) so that the magnitude of the hit ratio can be conveyed intuitively to the user.

(Session Basis Indication)

The daily basis indication 2003 can include session basis indications 2013. In FIG. 6, two session basis indications 2013*a* and 2013*b* included in the daily basis indication 2003*a* are illustrated. The session basis indications 2013 are indications used to divide the daily basis indication 2003 more finely and suggest information in each section. As described above, in the present description, the session means an interval between a starting time and an ending time determined based on the characteristics of the data included in the sensor data indicating a motion of a user. For example, the session can correspond to a collection of plays that have a given meaning, such as a swing, a rally, a set, and a game.

Also, in the example of FIG. 6, the daily basis indication 2003*a* includes only the two session basis indications 2013*a* and 2013*b*, and the number of sessions set for one day may be one or may be three or more. When several sessions are set for one day, the user can sequentially display each session basis indication 2013 on the display, for example, by scrolling the timeline screen 2001.

Also, a spreading button 2014 included in the daily basis indication 2003*b* means that the session basis indication 2013 is folded. By selecting the spreading button 2014, the session basis indication 2013 of the session set on the day (that is, 30 December) of the daily basis indication 2003*b* can be spread to be displayed.

In the illustrated example, the session basis indication 2013 includes an interval indication 2015, a thumbnail image 2017, a number-of-shots indication 2019, a hit ratio indication 2021, and a comment 2023.

The interval indication 2015 indicates a starting time and an ending time of a session. An indication form is not limited to the illustrated 24-hour system, but may be a 12-hour system. Also, for example, the basis of the indication of a time such as seconds, minutes, or hours can be appropriately set according to, for example, a property of the session (whether plays having a given meaning are collected).

The thumbnail image 2017 is an image that is automatically extracted from play images captured during the session or is selected by the user, as in the thumbnail image 2007. The thumbnail image 2017 may be a single image or may be linked to a moving image, as in the illustrated example. Alternatively, the thumbnail image 2017 may be a plurality of images or an unlinked image, or the like.

Here, for example, the thumbnail images 2007 on the session basis may be set to be selected among images displayed as the thumbnail images 2017 on the session basis, the images displayed as the thumbnail images 2017 on the session basis may be set not to be included in the thumbnail images 2007 on the daily basis, or the thumbnail images 2017 on the session basis and the thumbnail images 2007 on the daily basis may be mutually independently extracted or selected without the above-mentioned setting.

The number-of-shots indication 2019 is an indication for the number of shots (impact of a ball) detected during the session based on the sensor data from the sensor device 100 mounted on a racket, as in the number-of-shots indication 2009. When all of the plays are classified into one session or a plurality of sessions each day and all of the number-of-shots indications 2019 included in the session basis indications 2013 on the same day are summed, the sum value is identical to a number displayed by the number-of-shots indication 2009 on the daily basis.

The hit ratio indication 2021 displays a ratio of shots satisfying a predetermined condition to shots detected during the session, e.g., a ratio of shots in which a ball is hit at a sweet spot, as in the hit ratio indication 2011. When all of the plays are classified into one session or a plurality of sessions each day and a weighted average of the numbers of shots in the sessions in the hit ratio indications 2021 included in the session basis indications 2013 on the same day is calculated, the weighted average is almost the same as the ratio displayed in the hit ratio indication 2011 on the daily basis.

The comment 2023 is a comment set for the session. For example, the comment 2023 may be automatically set based on statistics data calculated in the analysis terminal 200 or the server 300 or may be input by the user, as in the illustrated example (the previous largest number of shots during the session is shown). Also, although not illustrated, the same comment may also be displayed in the daily basis indication 2003.

(Related Information Setting Screen)

FIG. 7 is a diagram illustrating an example of a related information setting screen according to the embodiment of the present disclosure. Referring to FIG. 7, a related information setting screen 2050 is also displayed on the display of the analysis terminal 200. Also, the illustrated example is the related information setting screen on the session basis, but a related information setting screen on the daily basis may be displayed similarly.

The related information setting screen 2050 includes a comment entry field 2051, an image selection button 2053, a court name entry field 2055, a play type entry field 2057, and a play partner name entry field 2059.

In the comment entry field 2051, contents of a play in the session or a comment of a feedback or the like of the play can be input. For example, the input comment can be displayed as the comment 2023 on the timeline screen 2001.

When the image selection button 2053 is pressed down, an image displayed, for example, as the thumbnail image 2017 on the timeline screen 2001 can be selected among images in a play stored in the analysis terminal 200 or the like. The illustrated related information setting screen 2050 is a related information setting screen on the session basis. Therefore, when the image selection button 2053 is pressed down, an image captured during this session can be extracted and displayed as a candidate, for example, based on a time stamp of the captured image.

In the court name entry field 2055, the name of a court in which the play is performed can be input. In the play type entry field 2057, for example, types of opportunities of plays such as "game" or "training" can be set, or items such as "singles" or "doubles" or the like can be set when the plays are games. Also, in the play partner name entry field 2059, the name of a partner of the play can be input when the play is a game. When the user inputs such information complementarily, for example, the analysis information can be classified into conditions of a court where the play is performed, a game or training, and a partner of the game such that analysis information can be referred to.

Also, the name of a play pair or the name of an opponent may be directly input as characters or may be selected and input by searching for information registered in a service. Also, the name of a court may be directly input as characters, or names acquired automatically based on the sensor information from the GPS or the like may be displayed as candidates and a name may be selected among the candidates to be input.

(Calendar Screen)

FIG. 8 is a diagram illustrating an example of a calendar screen according to the embodiment of the present disclosure. FIG. 9 is a diagram for describing indications when the calendar screen illustrated in FIG. 8 is scrolled. Referring to FIG. 8, a calendar screen 2101 is displayed on the display of the analysis terminal 200, as in the foregoing timeline screen 2001. As in the illustrated example, the timeline screen 2001, the calendar screen 2101, and a ranking screen to be described below may be switched by a tab displayed on the upper side of the screen.

The calendar screen 2101 includes a monthly basis indication 2103. A monthly basis indication 2103a of December, a monthly basis indication 2103b of November, and a monthly basis indication 2103c of October are illustrated in FIG. 9. The user can sequentially display these monthly basis indications 2103 on the display, for example, by scrolling the calendar screen 2101.

In the illustrated example, the monthly basis indication 2103 includes a play day indication 2105, a special play day indication 2107, and a comment 2109.

The play day indication 2105 is displayed, for example, on a day on which the user plays tennis and which is detected based on the sensor data from the sensor device 100. Accordingly, in the above-described timeline indication 2001, the daily basis indication 2003 can be displayed on a day for which there is the play day indication 2105 (and the special play day indication 2107 to be described below).

The special play day indication 2107 is displayed, for example, on a day on which a predetermined condition is satisfied among play days detected based on the sensor data from the sensor device 100. The predetermined condition can be satisfied, for example, when the user achieves an individually set goal or a rank to be described below is highly placed.

The comment 2109 is a comment which is set on each play day. For example, the comment 2109 may be automatically set based on data of the statistics result calculated in the analysis terminal 200 or the server 300 or may be input by the user, as in the comment 2023 on the calendar screen 2101. In the illustrated example, a comment 2109a representing that the play time is the longest ever and a comment 2109b representing that the number of shots is the highest ever are illustrated. Also, in the case of the calendar screen 2101, it is difficult to view the screen when comments are displayed for all of the play days. Therefore, the comment 2109 displayed according to a predetermined criterion, e.g., the length, contents, or the like of the comment, may be filtered.

(Ranking Screen)

FIG. 10 is a diagram illustrating an example of a ranking screen according to the embodiment of the present disclosure. FIG. 11 is a diagram for describing indications when the ranking screen illustrated in FIG. 10 is scrolled. Referring to FIG. 10, a ranking screen 2201 is displayed on the display of the analysis terminal 200, as in the foregoing timeline screen 2001 and the foregoing calendar screen 2101. As in the illustrated example, the timeline screen 2001, the calendar screen 2101, and the ranking screen 2201 may be switched by a tab displayed on the upper side of the screen.

In the illustrated example, weekly ranking 2203 is displayed on the ranking screen 2201. For example, when a title field of the weekly ranking 2203 is selected, ranking indications for diverse periods such as daily ranking, monthly ranking, and yearly ranking can be displayed in addition to this example. Also, in the illustrated example, the ranking for the number of shots is displayed. However, for example, ranking for another item such as a hit ratio or a play time can, of course, be displayed on the ranking screen 2201.

The weekly ranking 2203 includes a graph 2205, self data 2207, and reference data 2209. The graph 2205 indicates a distribution of data of all the users using a service. As illustrated, characteristic data such as "Top" (highest data), "Ave" (average data), and "You" (user data) may be displayed in the graph 2205.

The self data 2207 is an indication of data of the user himself or herself in items in which the ranking is displayed. In the illustrated example, the number of shots of the user displayed as the self data 2207 is identical to a portion displayed as "You" in the graph 2205. On the other hand, the reference data 2209 is an indication of characteristic data in the items in which the ranking is displayed. In the illustrated example, the highest data regarding the number of shots displayed as the reference data 2209 is identical to a portion displayed as "Top" in the graph 2205.

Also, in the illustrated example, a total data indication 2211 of the user is displayed along with the weekly ranking 2203 on the ranking screen 2201. The total data indication 2211 includes, for example, a number-of-shots indication 2213, a hit ratio indication 2215, and a swing type selection indication 2217. When such a total data indication 2211 is displayed, the user can comprehend his or her position in all of the positions with reference to the ranking 2203 and can also review a history of his or her plays. Also, types of swings selected with reference to the swing type selection indication 2217 will be described below.

(2-2. Session)

FIG. 12 is a diagram for describing the session defined according to the embodiment of the present disclosure. As illustrated in FIG. 12, all of the data (Root) of the analysis information is first classified on the yearly basis. For example, when the analysis information corresponding to N years is accumulated, the analysis information is all classified into the corresponding N years. Likewise, analysis information on the yearly basis is classified into the corresponding twelve months, analysis information on the monthly basis is classified into the corresponding weeks in the month, analysis information on the weekly basis is classified into the corresponding days in the week, and analysis information on the daily basis is classified into one session or a plurality of sessions. Also, such classification is merely an example and other classification can be realized. For example, the analysis information on the monthly basis may be classified on the daily basis instead of being classified based on the weekly basis. Also, the analysis information on the weekly basis may be classified into one session or a plurality of sessions instead of being classified on the daily basis.

In the present embodiment, the session is set as the minimum basis used to classify the analysis information. In FIG. 12, shot data, metadata, and tag data are illustrated as examples of the analysis information, but such analysis information can be associated with all of the sessions. The session means an interval between a starting time and an ending time determined based on the characteristics of the data included in the sensor data indicating a motion of the user. Also, for example, the session can correspond to a collection of plays that have a given meaning, such as a swing, a rally, a set, and a game.

Also, the shot data is data set for a detected shot and can include, for example, an impact position on a racket, determination of a position of an impact on the front and back of the racket, energy of the impact, a speed of a hit ball, a spin amount, a type of swing, a speed of the swing, and a trajectory of the swing. For example, when a time at the time of occurrence of an impact is included in a given session, the shot data can be associated with the session.

The metadata is data which is complementarily set for the session and can include, for example, classification of a game and training, classification of singles and doubles, the name of a play partner, a score, a play location (a position, a district, or a court name), other users playing together, and a comment. For example, the metadata can be associated with the session using the above-described related information setting screen 2050 or the like.

The tag data indicates, for example, a given point which is set at any time through an operation input of the user who is playing and is designated by the user. For example, when a time at which a tag is set is included in a given session, the tag information can be associated with the session. Alternatively, as will be described below, the tag data can be used to define the session.

Further, for example, information regarding an application using the analysis information, link information to a moving image captured during the session, or count-up data (the number of shots, intensity, a hit ratio, or the like) during the session serving as the analysis information, as will be described below, can be associated with the session.

For example, when the analysis information can be visualized, as in the foregoing timeline screen 2001, by associating the analysis information with the session, it is easy for the user to refer to the analysis information. More specifically, the user can refer to statistics information calculated for each session, compare the analysis information between the sessions, assign a comment or metadata such as an image for each session, or easily remember plays when the user reviews the plays due to the classification of the plays for each session.

FIG. 13 is a flowchart illustrating an example of a session generation process according to the embodiment of the present disclosure. In the example illustrated in FIG. 13, the sensor device 100 operates in an off-line mode and the shot data accumulated in the removable memory 113 is transmitted en bloc to the analysis terminal 200.

In the illustrated example, synchronization of the shot data first starts (S101). When the data corresponding to one shot is synchronized (S105) during a repetition process of synchronizing all of the shot data (S103), the data is determined to be first shot data among the synchronized shot data (S107). Here, when the target data is the first shot data (YES), a new session is generated (S111).

Conversely, when the target data is not the first shot data (NO), a predetermined time is determined to pass from the previous (chronologically immediately previous) shot data (S109). Here, when the predetermined time passes from the previous shot data (YES), a new session is likewise generated (S111). Conversely, when the predetermined time does not pass from the previous shot data (NO), no new session is generated and the shot data is additionally registered in the already generated session.

When the new session is generated (S111) and the shot data is determined to be added to the already generated session (NO in step S109), the shot data is registered in the session (S113). All of the shot data is registered in the session by repeating the foregoing process on all of the shot data.

In the foregoing example, when a time interval between the shot data exceeds a threshold value, the session is generated so that the previous shot data and the subsequent shot data are included in mutually different sessions, that is, a starting time and an ending time of the session are determined. Accordingly, a plurality of pieces of shot data continuous at an interval equal to or less than the threshold value are classified to a common session. Also, in the foregoing example, the case in which the sensor device 100 operates in the off-line mode has been described. However, the same process can be performed even in a case in which the sensor device 100 operates in an on-line mode and the shot data is transmitted to the analysis terminal 200 in real time. In this case, for example, in the analysis terminal 200, the same processes as the foregoing steps S107 to S113 are performed when one piece of shot data is received.

Also, the criterion for generating the session is not limited to the foregoing example. For example, when an operation of recording a play is performed by the user, the session may be generated so that the shot data before and after this operation is included in mutually different sessions. More specifically, for example, when imaging of a moving image starts at an interval of the shot data, the shot data after the start of the imaging may be registered in a new session different from that of the shot data before the start of the imaging. In this case, for example, it can be determined whether photographing of a moving image starts or ends between the previous shot data and the current shot data, instead of the foregoing step S109. As another example of the operation of recording a play, start of a mini game, a drill, or the like, input of a tag, or the like can be used, as will be described below.

In the present embodiment, for example, the session automatically generated through the same process as the foregoing process can be edited afterward by the user via the application 205 of the analysis terminal 200 or the server application 303 of the server 300. For example, the user can join sessions or divide a session. When the sessions are joined, the shot data classified to a plurality of target sessions is integrated into the joined session. On the other hand, when the session is divided, the shot data classified to a target session is assigned to a plurality of divided sessions by comparing the time stamp of each piece of shot data to a division time of the session.

Also, for example, when the sensor device 100 is borrowed by another user, there is a probability of data other than that of the original user being registered in the session. In this case, when the session is edited afterward, the data of the original user (who may be called a "guest" for example) may be able to be registered. In this case, when an analysis result associated with the session is displayed, the analysis result of a guest may be displayed so as to be visually distinguished or the data of the guest may be excluded from the data of the number of shots or the like.

3. Shot Monitor Screen

In the embodiment of the present disclosure, the analysis result for a play of the user can be further displayed in real time on a shot monitor screen. For example, after a shot by the user is detected, analysis information regarding a position at which a ball is hit on a racket, a type of swing, or the like is displayed on the shot monitor screen. Thus, since the user can comprehend the state of his or her play in real time, the user can make use of the analysis information, for example, to improve his or her play.

FIG. 14 is a diagram illustrating an example of a state of the shot monitor screen immediately after the shot according to the embodiment of the present disclosure. Referring to FIG. 14, at this time, a vibration waveform 2302 is displayed on a shot monitor screen 2301a. The vibration waveform 2303 can be a waveform of vibration actually detected by the vibration sensor of the sensor device 100. Also, since information other than the vibration waveform 2303 is still being analyzed, the information is not displayed. In other words, the vibration waveform 2303 is first displayed on the shot monitor screen 2301a before information regarding the analysis result is displayed.

FIG. 15 is a diagram illustrating a state of the shot monitor screen after end of the analysis according to the embodiment of the present disclosure. Referring to FIG. 15, at this time, a racket indication 2305, a swing type indication 2307, a user icon 2309, and a message 2311 are displayed in addition to the vibration waveform 2303 on a shot monitor screen 2301b.

The racket indication 2305 indicates a ball hit on a racket and shows a position at which the ball is hit on the racket at a shot. The user icon 2309 shows a posture of the user at the time of the shot. For example, this posture may be set in advance for each type of swing or may be detected by another sensor mounted on the user. Also, the type of swing can be determined based on motion data provided by, for example, the 9-axis sensor and can be displayed as the separate swing type indication 2307. A rotational angle of the racket indication 2305 matches a direction in which the user icon 2309 holds the racket.

Here, the direction in which the user actually holds the racket is changed according to types of swings, e.g., a forehand, a backhand, and a volley. Accordingly, when a racket indication expressing a position at which a ball is hit on the racket is displayed typically at the same angle (for example, a grip is oriented downward, it is difficult to intuitively comprehend the position at which a ball is hit and this racket indication is not sufficient as information suggestion of real time. Accordingly, in the present embodiment, the user icon 2309 showing a posture similar to the posture of the user is displayed and the racket indication 2305 is rotated and displayed in the direction in which the user icon 2309 holds the racket. Accordingly, the user can intuitively comprehend the position at which the ball is hit.

Also, when the position at which a ball is hit is expressed, information regarding whether the racket is shown from the front side or the rear side is also important information. Accordingly, in the present embodiment, not only is the racket indication 2305 displayed together with the user icon 2309, but whether a ball is hit on the front of the racket or the back of the racket is also expressed by the racket indication 2305. More specifically, in the present embodiment, when a ball is hit on the front of the racket, the ball is displayed on the front side of the strings of the racket in the racket indication 2305 as in the illustrated example. On the other hand, when a ball is hit on the back of the racket, the ball is displayed on the opposite side of the racket in the racket indication 2305.

The message 2311 is displayed according to a shot state of the user, e.g., whether a ball is hit at a sweet spot. In the illustrated example, since a ball is hit near the sweet spot, "Nice Shot!" is displayed. The message 2311 may be display in other various ways. For example, when a ball is hit at the center of the sweet spot, "Perfect!" may be displayed. When a ball is hit at a position slightly deviated from the sweet spot compared to the mentioned example, "Good Shot!" may be displayed. When a ball is hit at a position completely deviated from the sweet spot, the message 2311 such as "Try Again!" may be displayed.

Accordingly, not only by simply expressing a position at which a ball is hit by an indication such as the racket indication 2305 but also by changing the indication such as the message 2311 according to a position at which the ball is hit from the position, a meaning of the position at which the ball is hit can be easily delivered to the user.

Also, examples of a process of determining whether or not a ball is hit at a sweet spot are diverse. For example, by analyzing vibration occurring in the racket, an area of a racket in which a ball is hit can be determined. Since the position of the sweet spot varies according to a type of racket, a type of swing, and a magnitude of a centrifugal force by a speed of a swing, definition of the area of the sweet spot may be changed based on such information.

On the shot monitor screen 2301 according to the embodiment of the present disclosure described above, appropriate information can be easily suggested in real time so that the user who is playing can understand the information and the user can be allowed to feel a sense of real time.

For example, in the foregoing example, because considerable information displayed on the shot monitor screen 2301*b* is generated based on a type of swing, the information is not displayed until the type of swing is specified. However, in many cases, since sensor data at the time of follow-through is necessary in the determination of the type of swing, the analysis starts after end of the follow-through. Also, even when sensor data acquired by the sensor device 100 is transmitted to the analysis terminal 200 and is analyzed, for example, it takes about 1 second. Accordingly, when the user waits for collection of all of the information to be displayed, it is difficult for the user to sufficiently feel the sense of real time.

Accordingly, in the present embodiment, by displaying the vibration waveform 2303 ahead on the shot monitor screen 2301*a*, the analysis process of displaying new information progresses concurrently while the sense of real time of the user is not impaired. Additionally, when feedback is output with a sound such as a ball hitting sound together with the display of the vibration waveform 2303, the user can be allowed to feel a new sense of real time.

(Modification Examples)

FIG. 16 is a diagram illustrating a modification example of the shot monitor screen according to the embodiment of the present disclosure. Referring to FIG. 16, shot monitor screens 2901 are displayed as animations in the present modification example. In the present modification, when a shot is detected, a vibration waveform 2903 and a background 2905 are first displayed as illustrated in a shot monitor screen 2901*a* of A. The background 2905 displayed as "Ready" may be displayed, for example, before the shot is detected. At this time point, the analysis process does not end either.

Next, when the analysis process ends, an analysis result indication 2907 is displayed in a wipe-in or wipe-out manner from the left to the right as shown in shot monitor screens 2901*b* to 2901*d* of B to D. The analysis result indication includes a type of swing, a position at which a ball is hit on a racket, and a message such as "NICE SHOT!" as illustrated. After the analysis result indication 2907 is wiped out, as shown in E, the vibration waveform 2903 and the background 2905 remain on the shot monitor screen 2901*e*. However, as characters "Forehand" of the background 2905 are shown, a part of the analysis result can continue to be referred to.

FIG. 17 is a diagram for describing a functional configuration for displaying an analysis result in real time according to the embodiment of the present disclosure. For example, the functional configuration illustrated in FIG. 17 can be provided as the analysis library 221 in the analysis terminal 200.

First, a sensor data reception unit 271 receives sensor data provided from the sensor device 100. Next, a sensor data analysis unit 273 analyzes the sensor data. The sensor data analysis unit 273 provides the sensor data to an impact detection unit 275. The impact detection unit 275 determines whether an impact by a shot occurs in vibration data included in the provided sensor data.

When the impact occurs, a waveform generation unit 289 generates vibration waveforms before and after the impact as images and provides the images to an image display unit 283. Accordingly, for example, the vibration waveform 2303 described above is displayed. Also, when the impact occurs, an impact sound selection unit 291 provides a sound indicating the impact to a sound reproduction unit 287. Accordingly, feedback by the sound can be provided together with the display of the vibration waveform 2303.

Further, when the impact occurs, an impact position analysis unit 277 specifies an impact position on a racket. Information regarding the impact position is provided to an analysis result display generation unit 281 and an analysis result sound selection unit 285, and thus the information itself is output information and is provided also to a shot type analysis unit 279. The shot type analysis unit 279 analyzes not only the information regarding the impact position but also the sensor data and determines a type of shot. Information regarding the determined type of shot is provided to the analysis result display generation unit 281 and the analysis result sound selection unit 285 so that the information is output as an image or a sound.

As a result, based on the information provided from the analysis result display generation unit 281 to the image display unit 283, information such as the racket indication 2305, the swing type indication 2307, the user icon 2309, and the message 2311 described above can be displayed on the display. Also, based on the information provided from the analysis result sound selection unit 285 to the sound reproduction unit 287, a sound corresponding to the foregoing information can be output from a speaker.

(4. Shot Cam Screen)

In the embodiment of the present disclosure, a play of the user can also be imaged as an image on a shot cam screen. For example, when the analysis terminal 200 has an imaging function and a user who is playing can be imaged, the shot cam screen can be displayed on the analysis terminal 200. Alternatively, when the analysis terminal 200 remotely operates an imaging function of an external device, the shot cam screen may be displayed on the analysis terminal 200.

FIG. 18 is a diagram illustrating an example of an initial screen of the shot cam screen according to the embodiment of the present disclosure. Referring to FIG. 18, a previous image thumbnail 2403 and an imaging start button 2405 are displayed on an initial screen 2401. The previous image thumbnail 2403 is a thumbnail of a play image captured previously by the imaging function. When the previous image thumbnail 2403 is selected, reproduction of such an image can start. The imaging start button 2405 is a button used to start capturing a play image newly. When the imaging start button 2405 is pressed down, the initial screen is transitioned to an imaging screen to be described below.

FIG. 19 is a diagram illustrating an example of an imaging screen of the shot cam screen according to the embodiment of the present embodiment. Referring to FIG. 19, a through image 2409 is displayed on the imaging screen 2407. As illustrated in A, a recording start button 2411, a time counter 2413, and analysis information 2415 can be further displayed on an imaging screen 2407a. The user can allow such an information indication not to be displayed, for example, by tapping a portion in which the through image 2409 is displayed (when the display of the analysis terminal 200 is a touch panel) such that the screen is switched to an imaging screen 2407b on which only the through image 2409 is displayed, as shown in B.

When the user presses down the recording start button 2411, an image displayed as the through image 2409 starts to be recorded. The time counter 2413 progresses when the recording of the image is performed. In the analysis information 2415, for example, information regarding the type of swing, the position at which the ball is hit on the racket, or the like displayed on the above-described shot monitor screen is displayed. In the present embodiment, the analysis information is generated by the analysis terminal 200 based on the sensor data acquired by the sensor device 100. Therefore, such analysis information can be referred to even when a play image is captured. Also, such analysis information can be associated with the session together with the play image. Therefore, the analysis information can easily be referred to even when the play image is reproduced, as will be described below.

(5. Shotlog Screen)

In the embodiment of the present disclosure, a play of the user can be reviewed using the data on the shotlog screen.

FIG. 20 is a diagram illustrating an example of an initial screen of the shotlog screen according to the embodiment of the present disclosure. Referring to FIG. 20, a shotlog screen 2501 is displayed on the display of the analysis terminal 200. A chronological graph 2503, a swing type selection indication 2505, a number-of-shots indication 2507, a hit ratio indication 2509, a play time indication 2511, and reproduction control 2513 are displayed on an initial shotlog screen 2501a.

The shotlog screen 2501 can be displayed, for example, on the session basis described above. In the illustrated example, a shotlog is displayed for a session of 15:20 to 15:40. On the shotlog screen 2501, the analysis information regarding each shot during the session can be sequentially displayed chronologically and, for example, the analysis information can be referred to chronologically while the analysis information is advanced or stopped as in a moving image.

The chronological graph 2503 is a graph that chronologically expresses a transition of the analysis information during the corresponding session. On the shotlog screen 2501a, the number of shots for each unit time (for about every 2 minutes in the illustrated example) is shown by a bar graph and a hit ratio (a ratio at which a ball is hit at a sweet spot) at each time in the bar graph is shown by a line graph.

The type of swing displayed by the chronological graph 2503 or the like can be selected by the swing type selection indication 2505. In the illustrated example, "All Type" is selected and data regarding a sum of all of the types of swings is displayed.

The number-of-shots indication 2507 and the hit ratio indication 2509 are the same indications as the number-of-shots indication 2019 and the hit ratio indication 2021 on the session basis on the above-described playlog screen and display the number of shots in the corresponding session and a ratio at which the ball is hit at the sweet spot, respectively. The play time indication 2511 displays a time from the start to the end of the session. However, since display of the shotlog to be described below is different from display of a moving image and data for each shot is displayed discontinuously, it does not take the same time as the play time indication 2511 in the display of the shotlog of all of the sessions. Of course, a display timing of the data of each shot can be set to be adjusted with an occurrence time of an actual shot and the shotlog can be displayed for almost the same time as the play time indication 2511.

The reproduction control 2513 is a control indication used to control advance, stop, fast-forward, and rewind of the shotlog screen. By pressing down a reproduction button displayed as the reproduction control 2513, the shotlog of each shot can start to be displayed.

FIG. 21 is a diagram illustrating an example in which display of the shotlog screen progresses according to the embodiment of the present disclosure. Referring to FIG. 21, on a shotlog screen 2501b, an indication position bar 2515 indicating a chronological position of a displayed shot is displayed in the chronological graph 2503. The indication position bar 2515 is moved with progress of the shotlog. In the case of the illustrated example, the indication position bar 2515 is moved from the left to the right with the progress of the shotlog screen. Also, a shot counter 2516 is also displayed on the shotlog screen 2501b. The shot counter 2516 displays how many times the displayed shot is performed among all of the shots (256 shots) during the session (in the illustrated example, the 123rd shot).

Also, a racket indication 2517, a user icon 2519, and a swing type indication 2521 are displayed on the shotlog screen 2501b. These indications are the same indications as the racket indication 2305, the user icon 2309, and the swing type indication 2307 on the above-described shot monitor screen and display a position at which a ball is hit on a racket at the target shot, a posture of the user at the time of the swing, and a type of swing specified based on the sensor data. Thus, when the display of the shotlog progresses, for example, the same information as the information displayed on the shot monitor screen can be displayed for each shot during the session.

Also, in another embodiment, only one of the shotlog screen and the shot monitor screen may be mounted. That is, even when the shot monitor screen is not displayed during a play, the shotlog screen can be displayed in some cases. The shot monitor screen can be displayed during a play, but the shotlog screen may not be displayed in some cases.

FIG. 22 is a diagram illustrating an example of a screen displayed when a type of swing is selected during progress of a shotlog screen according to the embodiment of the present disclosure. Referring to FIG. 22, on a shotlog screen 2501c, "Backhand" is selected by the swing type selection indication 2505. In this case, in the shot displayed as the chronological graph 2503, the type of swing is narrowed to "Backhand." Accordingly, as illustrated, the height of the bar graph indicating the number of shots displayed in the chronological graph 2503 is lowered compared to the cases in which all of the types of swings are displayed on the shotlog screens 2501a and 2501b.

FIG. 23 is a diagram illustrating an example of a related information setting screen which can be transitioned from the shotlog screen according to the embodiment of the present disclosure. Referring to FIG. 23, a related information setting screen 2530 includes a comment entry field 2531, an image selection button 2533, a court name entry field 2535, a play type entry field 2537, and a play partner name entry field 2539. The indication components are the same as the indication components on the above-described related information setting screen 2050, and information regarding a session in which a shotlog is displayed can be input.

FIG. 24 is a diagram illustrating an example of a racket information screen which can be transitioned from the shotlog screen according to the embodiment of the present disclosure. Referring to FIG. 24, a racket information screen 2550 includes a racket image 2551, a racket name 2553, and a cumulative shot number 2555. The racket image 2551 is an image which is acquired, for example, by downloading catalog data on a network or registering the racket image actually owned by the user. The racket name 2553 can include, for example, a product name and/or a model number of the racket. A nickname which the user arbitrarily gives may be registered. The cumulative shot number 2555 is a sum of the numbers of shots performed until now by the user using the displayed racket.

In the present embodiment, for example, information regarding the racket used by the user can be displayed as in the foregoing racket information screen 2550. Aside from this, for example, the analysis terminal 200 or the server 300 may store detailed data regarding the shape, material, or the like of the racket for the purpose of the analysis of the sensor data, e.g., use of vibration characteristics or characteristics of the sweet spot. For example, such data can be stored in association with information such as a model number or an ID used to uniquely identify each racket.

(6. Videolog Screen)

In the present embodiment, a play of the user can be reviewed along with a moving image on a videolog screen in addition to or instead of the shotlog screen.

FIG. 25 is a diagram illustrating an example of an initial screen of the videolog screen according to the embodiment of the present disclosure. Referring to FIG. 25, a videolog screen 2601 is displayed on the display of the analysis terminal 200. A reproduction image 2603, a number-of-shots indication 2605, a seeking bar 2607, a swing type selection indication 2609, a number-of-shots indication 2507, a hit ratio indication 2613, and reproduction control 2611 are displayed on a videolog screen 2601a.

The videolog screen 2601 can be displayed, for example, on the session basis described above. In the illustrated example, a videolog is displayed for a session of 16:50 to 17:20. A moving image of a time corresponding to the session is displayed together with the analysis information on the videolog screen 2601.

The reproduction image 2603 does not yet start on the videolog screen 2601a of an initial screen and a first frame or a representative image is displayed. The number-of-shots indication 2605 is the number of shots in a session corresponding to the reproduction image and a total number of shots is displayed before start of the reproduction image 2603. The seeking bar 2607 displays a reproduction position of the reproduction image 2603. Since reproduction of the reproduction image 2603 does not start on the videolog screen 2601a, the seeking bar 2607 does not yet progress either.

The swing type selection indication 2609, the number-of-shots indication 2507, and the hit ratio indication 2613 are the same indication components as the swing type selection indication 2505, the number-of-shots indication 2507, and the hit ratio indication 2509 of the shotlog screen 2501a described above, respectively. The reproduction control 2615 is a control indication used to control reproduction, stop, fast-forward, and rewind of the reproduction image 2603. By pressing down a reproduction button displayed as the reproduction control 2615, the reproduction of the reproduction image 2603 can start.

FIG. 26 is a diagram illustrating an example in which display of a videolog screen progresses according to the embodiment of the present disclosure. Referring to FIG. 26, reproduction of the reproduction image 2603 starts on a videolog screen 2601b. Accordingly, the number-of-shots indication 2605 is changed to the shot counter 2617 and displays how many times the shot being reproduced in the reproduction image 2603 is performed among all of the shots (534 shots) during the session (in the illustrated example, the 123rd shot). Also, the seeking bar 2607 also progresses up to a position corresponding to the reproduction position of the reproduction image 2603.

Also, a racket indication 2619, a user icon 2621, and a swing type indication 2623 are displayed on the shotlog screen 2501b. These indications are the same indications as the racket indication 2305, the user icon 2309, and the swing type indication 2307 on the above-described shot monitor screen and display a position at which a ball is hit on a racket at the target shot, a posture of the user at the time of the swing, and a type of swing specified based on the sensor data. Thus, when the videolog screen starts, for example, the same information as the information displayed on the shot monitor screen can be displayed for the shot being reproduced as the reproduction image 2603.

FIG. 27 is a diagram illustrating an example of expanded display of the videolog screen according to the embodiment of the present disclosure. Referring to FIG. 27, a reproduction image 2633 is displayed on an expanded display screen 2631. As shown in A, a shot counter 2635, a progress bar 2637, a reproduction control 2639, and analysis information 2641 can be further displayed on an expanded display screen 2631a. The user can allow such an information indication not to be displayed, for example, by tapping a portion in which the reproduction image 2633 is displayed (when the display of the analysis terminal 200 is a touch panel) such that the screen is switched to an expanded display screen 2631b on which only the reproduction image 2633 is displayed, as shown in B.

Also, transition from the videolog screen 2601 to the expanded display screen 2631 can be performed, for example, by tapping a portion in which the reproduction image 2603 is displayed on the videolog screen 2601. Also, transition from the expanded display screen 2631 to the videolog screen 2601 can be performed by pressing down a return button 2643 when the expanded display screen 2631 is displayed.

When such a videolog screen is displayed, not only can the user view an image at the time of play, but the user can also refer to various kinds of analysis information based on the sensor data. Also, by displaying the videolog screen on the session basis, reproduction of a moving image is divided into appropriate intervals and is performed, and thus the user can easily refer to the moving image.

(7. Another Screen Example 1)

FIG. 28 is a diagram illustrating an example of an application list screen according to the embodiment of the present disclosure. In the present embodiment, an application related to analysis information generated through the analysis of the sensor data can be provided. The application is, for example, a mini game or a drill using the analysis information. Contents of the application can be set on the session basis. For example, the application may be a mini game such as "in an order in which 5 types of swings are determined during a session" or a drill such as "a hit ratio of a sweet spot in each session is not allowed to be less than 70%."

An application list screen 2701 is displayed on the display of the analysis terminal 200 and includes an application button 2703. For example, the plurality of application buttons 2703 are arranged, and thus the user presses down the application button 2703 of an application (in the drawing, the application is shown as Program) of interest to acquire the application. Thereafter, for example, when a session is generated based on sensor data recording a play of the user, it can be determined whether the mini game or the drill is cleared for each session.

FIG. 29 is a diagram illustrating an example of another setting screen and profile screen according to the embodiment of the present disclosure. Referring to FIG. 29, another setting screen 2801 is displayed on the display of the analysis terminal 200 and includes setting item buttons 2803. A profile screen 2831 is displayed on the display of the analysis terminal 200 when one of the setting item buttons 2803 of the other setting screen 2801 is pressed down.

The profile screen 2831 includes a user information indication 2833, a main racket indication 2835, a sub-racket indication 2837, and a carrier indication 2839. The user information indication 2833 is information regarding the user using the analysis terminal 200. An analysis result based on the sensor data acquired from the sensor device 100 by the analysis terminal 200 is accumulated as the analysis information regarding the user or is shared in the server 300. The main racket indication 2835 displays information regarding a racket registered as a racket mainly used by the user. Information displayed by the main racket indication 2835 is the same as, for example, the information displayed on the foregoing racket information screen 2550 and can include a cumulative shot number. The sub-racket indication 2837 displays information regarding a racket registered as a racket used by the user other than the main racket. The carrier indication 2839 displays a carrier of the user of a target sport (tennis in the present embodiment). For example, information displayed on the profile screen 2831 may be shared with other users together with the analysis information via the server 300.

(8. Other Screen Example 2)

FIG. 30 is a diagram for describing screen transition in a second example of another screen according to the embodiment of the present disclosure. Referring to FIG. 30, a screen to be described in this example is displayed on a display of a tablet terminal 200t. In other examples, the same screen may be displayed on a display of another terminal device such as a smart phone, a personal computer, a game console, or the like.

Dominant-hand selection buttons 3101L and 3101R are displayed on a first screen 3100 displayed when an application related to this example is activated. In this example, information regarding the dominant hand of a user is used when a type of swing (shot) is specified by analysis of motion data or vibration data. When the user selects his or her dominant hand using the button 3101, a second screen 3200 is displayed. The second screen 3200 is displayed for the purpose of performance. On the second screen 3200, for example, an animation 3200 of a tennis racket or the like is displayed to show that the animation is in a standby state after the activation.

Thereafter, for example, when a shot of the user is detected, a third screen 3300 is automatically displayed on the display. The third screen 3300 displays information regarding the recent shot of the user. Also, the third screen 3300 will be described in detail below. When an analysis button 3301 is pressed down on the third screen 3300, an analysis process starts and a fourth screen 3400 is displayed. The fourth screen 3400 includes a countdown timer 3401. In the illustrated example, the countdown timer counts 5 seconds, but the analysis process may end before 5 seconds has passed. That is, the fourth screen 3400 may also be displayed for the purpose of performance.

A fifth screen 3500 is displayed after the foregoing fourth screen 3400. The fifth screen 3500 displays information based on an analysis result of a history of plays including shots or the like of the user. Also, the fifth screen 3500 will be described in detail below. When a return button 3501 is pressed down on the fifth screen 3500, the display of the analysis result ends and, for example, a second screen 3201 is displayed on the display.

FIG. 31 is a diagram for further describing the third screen illustrated in FIG. 30. Referring to FIG. 31, the screen 3300 includes an analysis button 3301, a timeline 3302, a shot history indication 3303, a shot generation effect 3304, a tag addition button 3305, a tag icon 3307, a shot count 3309, a shot type indication 3311, a player icon 3313, a latest shot position indication 3315, a shot position history indication 3317, a ball speed indication 3319, a swing speed indication 3321, and a ball spin indication 3323.

The analysis button 3301 is a button for starting analysis of a history of the previous plays of the user, as described above. The timeline 3302 corresponds to the history of the previous plays of the user. The shot history indication 3303 or the tag icon 3307 is displayed on the timeline 3302. The shot history indication 3303 is automatically displayed at a position at which a shot of the user is detected on the time line 3302. The shot history indication 3303 may be displayed with a different color or shape for each detected type of shot. In the illustrated example, two types of shot history indications 3303a and 3303b with different colors are shown, but the shot history indication 3303 may include icons with more different kinds of colors and/or shapes. When a shot is newly detected, an icon of a new shot history indication 3303 is added on the timeline 3302 along with the shot generation effect 3304 (a ripple-like effect in the illustrated example). Also, an embodiment of the present disclosure is not limited to the time of detection of a shot. Whenever the user presses down the tag addition button 3305, a new tag icon 3307 is added on the timeline 3302. The user can easily review a play at any input timing using the tag icon 3307.

The shot count 3309 is, for example, a count of the shots after the screen 3300 is displayed. In this example, as described above, when the analysis button 3301 is pressed down once, the analysis process may start. Then, a screen 3350 of the analysis result may be displayed, and then the screen 3300 may be displayed via the screen 3200 or the like again. In this case, the shot count 3309 may continue or may be reset.

The shot type indication 3311 displays the latest type of shot detected. The player icon 3313 is an icon that displays the figure of a player corresponding to the latest type of shot detected. That is, both of the shot type indication 3311 and the player icon 3313 display the latest type of shot detected. Also, the player icon 3313 may be displayed as an animation in synchronization with the latest shot position indication 3315. The latest shot position indication 3315 includes the picture of a racket and an impact position 3315b is displayed on the racket. The impact position 3315b displays an impact position of a ball on the racket estimated, for example, based on data regarding vibration or the like provided by a sensor device mounted on the racket.

Here, as described above, the latest shot position indication 3315 and the player icon 3313 can be displayed as synchronized animations. Examples of the animations will be further described below with reference to FIGS. 32A to 32C.

FIGS. 32A to 32C are diagrams for describing examples of the animations of the player icon and the shot position indication illustrated in FIG. 31. FIG. 32A illustrates an example of an animation when a type of shot (swing) is a forehand stroke or a forehand volley. FIG. 32B illustrates an example of an animation when the type of shot (swing) is a backhand stroke or a backhand volley. FIG. 32C illustrates an example of an animation when the type of shot (swing) is a smash or a serve. Also, in the illustrated example, it is specified that that the player (user) plays with the right hand, for example, by the dominant-hand selection button 3101 displayed on the screen 3100. For example, when it is specified that the player (user) plays with the left hand, an animation in which the illustrated example is reversed right and left may be displayed.

In each of the foregoing examples of FIGS. 32A to 32C, a position or an angle of the racket included in the shot position indication 3315 is changed as the player icon 3313 performs a specified type of swing. Due to this indication, not only can the user intuitively comprehend a type of shot (swing) but the user can easily identify whether the racket included in the shot position indication 3315 is viewed from the back or is viewed from the front.

Also, as the result of the above-described animation, the angle of the racket included in the shot position indication 3315 can be different according to a type of shot (swing) when the swing is completed and the impact position 3315b is displayed. For example, the racket of the shot position indication 3315 in the case of the forehand stroke/volley illustrated in FIG. 32A is rotated counterclockwise about 45 degrees compared to the racket in the case of the smash/serve illustrated in FIG. 32C. On the other hand, the racket of the shot position indication 3315 in the case of the backhand stroke/volley illustrated in FIG. 32B is rotated clockwise about 45 degrees compared to the racket in the case of the smash/serve illustrated in FIG. 32C. Due to the change in the shot position indication 3315, the user can intuitively comprehend a type of shot (swing).

Referring back to FIG. 31, the shot position history indications 3317 indicate that the foregoing shot position indications 3315 of the previous shots (swings) are displayed as a history. For example, when the latest shot position indication 3315 in the illustrated example corresponds to the 10$^{th}$ shot, three shot position history indications 3317 correspond to the 7$^{th}$ shot, the 8$^{th}$ shot, and the 9$^{th}$ shot. The shot position history indication 3317 may be, for example, the same indication as the latest shot position indication 3315. That is, the shot position history indication 3317 can also include the picture of the racket and the impact position 3317b indicating an impact position of a ball. Also, the angle of the racket displayed in the shot position history indication 3317 may also be different according to a type of shot (swing).

The ball speed indication 3319, the swing speed indication 3321, and the ball spin indication 3323 are, for example, information displayed based on a speed of the ball or the racket, rotation of the ball, or the like estimated based on data regarding vibration, a motion, or the like provided by the sensor device mounted on the racket. Such information can be displayed, for example, for the latest shot (swing). Also, for example, when the shot history indication 3303 on the timeline 3302 or the shot position history indication 3317 is selected through an operation of the user, the ball speed indication 3319, the swing speed indication 3321, the ball spin indication 3323, and the like may be displayed for the shot (swing) corresponding to the selected history. FIG. 33 is a diagram for further describing the fifth screen illustrated in FIG. 30. Referring to FIG. 33, the screen 3500 includes a return button (end button) 3501, a hit map 3503, a hit ratio 3505, a ranking 3507, a shot graph 3509, a maximum ball speed indication 3511, a maximum swing speed indication 3513, and a maximum ball spin indication 3515.

As described above, the return button (end button) 3501 is a button for ending the display of the analysis result and returning to a shot waiting state (for example, the second screen 3200). Alternatively, the return button (end button) 3501 may be a button for ending the display of the analysis result and ending the application itself The hit map 3503 is displayed, for example, based on a result obtained by estimating an impact position of the ball based on the data regarding vibration or motion provided from the sensor device mounted on the racket. For example, the hit map 3503 may express statistics of the impact positions of the ball by color. In this case, in the hit map 3503, an area in which the number of times the ball is hit on the racket is large can be displayed with a deep color (or red or the like) and an area in which the number of times the ball is hit on the racket is small can be displayed with pale color (or blue, green, or the like). Likewise, the hit ratio 3505 is also displayed based on a result obtained by estimating the impact positions of the ball. The hit ratio 3505 indicates a ratio at which the ball is hit in a predetermined area on the racket. In the illustrated example, a hit ratio in the center portion of the racket is displayed. Due to the indication, the user can intuitively comprehend where the ball is hit on the racket in a series of plays. The ranking 3507 is a ranking of the hit ratio 3505 among the total number of users. When the hit ratio 3505 can be displayed by several different types (the center of the racket, a sweet spot, and the like), the display contents of the ranking 3507 can be changed according to display targets of the hit ratio 3505.

The shot graph 3509 displays a shot (type) in an interval of the analysis target for each type of shot. In the illustrated example, the shot graph 3509 includes a shot type count 3509a and a circle graph 3509b. The shot type count 3509a displays the number of times each shot type is detected. In the illustrated example, 8 types of shots (a smash, a serve, a backhand volley, a forehand top spin, a forehand volley, a forehand slice, a backhand slice, and a backhand top spin) are identified and the shot type count 3509a is displayed for each of the types.

In the maximum ball speed indication 3511, the maximum swing speed indication 3513, and the maximum ball spin indication 3515, the maximum values are displayed for the ball speed, the swing speed, and the ball spin of each shot (swing) described above with reference to FIG. 31 in the interval of the analysis target. In the indications, for example, a type of shot (swing), the maximum value of each item among all of the users, or the like at the time of recording of the maximum value of each item may be displayed additionally.

(9. Other Screen Example 3)

Next, a third example of the other screen according to an embodiment of the present disclosure will be described with reference to FIGS. 34 to 36. FIGS. 34 to 36 are diagrams for describing examples of first to third screens in this example. Also, in this example, the same indications as those of the foregoing second example can be performed on a smart phone rather than the tablet terminal 200t. Accordingly, a different configuration from the second example will be mainly described below. Also, a configuration described only in this example can be adopted likewise in the foregoing second example.

FIG. 34 illustrates a first screen 4100. Referring to FIG. 34, the screen 4100 includes a timeline 4102, a shot history indication 4103, a shot generation effect 4104, a tag addition button 4105, a tag icon 4107, a shot count 4109, a shot type indication 4111, a player icon 4113, a shot position indication 4115, a ball speed indication 4119, a swing speed indication 4121, a ball spin indication 4123, a camera mode button 4125, and a serve speed button 4127.

The foregoing constituent elements can be, for example, corresponding indications among the timeline 3302, the shot history indication 3303, the shot generation effect 3304, the tag addition button 3305, the tag icon 3307, the shot count 3309, the shot type indication 3311, the player icon 3313, the shot position indication 3315, the ball speed indication 3319, the swing speed indication 3321, and the ball spin indication 3323 of the screen 3300 described with reference to FIG. 31. Also, the shot position history indication 3317 displayed on the screen 3300 may be omitted in the screen 4100 to reduce the size of the display.

The camera mode button 4125 is a button for transitioning to a screen that displays an analysis result based on sensor data and/or a captured image along with an image (which can be a through image), while a play of a user is imaged using a camera included in a smart phone. The serve speed button 4127 is a button for transitioning to a screen that displays information regarding estimation of a speed of a ball or a racket at the time of a serve based on sensor data and/or a captured image, diagnosis of the serve based on an estimation result, or the like. Also, this screen may be displayed by the tablet 200t in the foregoing second example.

FIG. 35 illustrates a second screen 4200. Referring to FIG. 35, the screen 4200 includes a shot graph 4209, a comment 4217, and a video button 4219.

The shot graph 4209 can be, for example, the same indication as the shot graph 3509 of the screen 3500 described with reference to FIG. 33. In the shot graph 4209, as a configuration not described in the shot graph 3509, a shot type count 4209a and a total count 4209c displayed in the circle graph 4209b can be selected via a touch panel or the like (the circle graph 4209b itself may be selectable) and transition to a screen 4300 to be described below can be performed by selecting the shot type count 4209a and the total count 4209c. Also, this configuration can be adopted likewise even in the foregoing screen 3500.

For example, text generated based on a statistical value of a play of the user shown in the shot graph 4209 is displayed in the comment 4217. The video button 4219 is, for example, a button for transitioning to a reproduction screen of an image of the play captured together with the acquisition of the sensor data. Also, although not illustrated, the same button of the screen 4100, e.g., the serve speed button (transition to a serve diagnosis screen), may be displayed on the screen 4200.

FIG. 36 illustrates a third screen 4300. Referring to FIG. 36, the screen 4300 includes a shot type indication 4301, a shot count 4303, a hit map 4305, a ball speed graph 4307, a swing speed graph 4309, and a timeline 4311.

The shot type indication 4301 displays a type of shot which is an indication target on the screen 4300. In the illustrated example, a forehand volley is set as an indication target, but different types of shots, e.g., a forehand stroke and a backhand volley, can also be set as indication targets. Also, all of the shots may be set as indication targets without limiting the types of shots. The shot type indication 4301 may be displayed as, for example, a drop-down list and an indication target may be changed using this list.

The shot count 4303 displays the number of shots which is set as an indication target in an interval of the analysis target. Likewise, the hit map 4305 displays, as a map, areas in which a ball is hit on the racket by the shot which is the indication target. The ball speed graph 4307 and the swing speed graph 4309 display analysis results of a ball speed and a swing speed of the shot which is the indication target by a time-series graph displaying the maximum point and the minimum point, an average value, or the like. Also, although not illustrated, a ball spin graph may be displayed below the swing speed graph 4309 by scrolling the screen 4300.

The timeline 4311 can include a shot history indication 4311a, a tag icon 4311b, a starting time 4311s, and an ending time 4311e. The shot history indication 4311a can be the same indication as the shot history indication 3303 of the screen 3300 described above with reference to FIG. 31.

Here, on the screen 4300, an indication range of the timeline 4311 can be freely set. For example, in the initial indication state, the timeline 4311 is set with a play time of the user, i.e., a length by which the entire time for the analysis target can be displayed, but the length can be changed through an operation of the user later. For example, when the user taps the timeline 4311 via the touch panel or the like, the time displayed by the entire length of the timeline 4311 can be changed step by step as in 30 minutes, 10 minutes, 5 minutes, and 1 minute. The displayed time may be returned to 30 minutes after 1 minute.

Also, the starting time 4311s and the ending time 4311e of the timeline 4311 can be changed on the screen 4300. For example, in the illustrated example, the timeline 4311 from 3:12 to 3:34 is displayed, but the starting time 4311s may be changed to a later time, e.g., 3:20, for example, by sliding the starting time 4311s via the touch panel or the like. The ending time 4311e can also be changed through the same operation.

A result of the above-described operation, i.e., the change in the length of the timeline 4311 itself and the change in the starting time 4311s and the ending time 4311e, can be reflected in other indication elements. For example, the shot count 4303 or the hit map 4305 may display an area of the racket hit by the ball or the number of shots in the range of the timeline 4311 changed through the operation. Also, for example, the ball speed graph 4307 and the swing speed graph 4309 may also be displayed within the range of the timeline 4311. Thus, the user can display the analysis result of a play in a desired interval during the play.

(10. Hardware Configuration)

Next, a hardware configuration of the information processing device according to an embodiment of the present disclosure will be described with reference to FIG. 37. FIG. 37 is a block diagram for describing the hardware configuration of the information processing device. An information processing device 900 illustrated in the drawing can realize, for example, the analysis terminal or the server in the above-described embodiments.

The information processing device 900 includes a central processing unit (CPU) 901, a read-only memory (ROM) 903, and a random access memory (RAM) 905. Also, the information processing device 900 may include a host bus 907, a bridge 909, an external bus 911, an interface 913, an input device 915, an output device 917, a storage device 919, a drive 921, a connection port 923, and a communication device 925. The information processing device 900 may further include an imaging device 933 and a sensor 935 as necessary. The information processing device 900 may include a processing circuit called a digital signal processor (DSP) or an application specific integrated circuit (ASIC), instead of or in addition to the CPU 901.

The CPU 901 functions as an arithmetic processing device and a control device and controls all or some of the operations in the information processing device 900 according to various programs recorded in the ROM 903, the RAM 905, the storage device 919, or a removable recording medium 927. The ROM 903 stores a program, an arithmetic parameter, and the like used by the CPU 901. The RAM 905 primarily stores a program used in execution of the CPU 901 and a parameter or the like appropriately changed in execution of the program. The CPU 901, the ROM 903, and the RAM 905 are connected to each other by the host bus 907 including an internal bus such as a CPU bus. Further, the host bus 907 is connected to the external bus 911 such as a Peripheral Component Interconnect/interface (PCI) bus via the bridge 909.

The input device 915 is, for example, an operation unit operated by a user, such as a mouse, a keyboard, a touch panel, a button, a switch, and a lever. Also, the input device 915 may be, for example, a remote control device using an infrared ray or other radio waves or may be, for example, an external connection device 929 such as a mobile phone corresponding to an operation of the information processing device 900. Also, the input device 915 includes, for example, an input control circuit that generates an input signal based on information input by a user and outputs the signal to the CPU 901. The user inputs various kinds of data to the information processing device 900 or instructs the information processing device 900 to perform a processing operation by operating the input device 915.

The output device 917 includes a device capable of visually or audibly notifying a user of the acquired information. Examples of the output device 917 include display devices such as a liquid crystal display (LCD), a plasma display panel (PDP), and an organic electro-luminescence (EL) display, audio output devices such as a speaker and a headphone, and printer devices. The output device 917 outputs a result obtained through the process of the information processing device 900 as a picture such as text or an image or outputs the result as an audio such as a voice or an acoustic sound.

The storage device 919 is a data storage device configured as an example of the storage unit of the information processing device 900. The storage device 919 includes, for example, a magnetic storage device such as a hard disk device (HDD), a semiconductor storage device, an optical storage device, or a magneto-optical storage device. The storage device 919 stores a program or various kinds of data executed by the CPU 901 and various kinds of data acquired from the outside.

The drive 921 is a reader/writer for the removable recording medium 927 such as a magnetic disk, an optical disc, a magneto-optical disc, or a semiconductor memory, and is built in the information processing device 900 or is attached on the outside thereof. The drive 921 reads information recorded on the mounted removable recording medium 927 and outputs the information to the RAM 905. Also, the drive 921 writes a record on the mounted removable recording medium 927.

The connection port 923 is a port configured to directly connect a device to the information processing device 900. Examples of the connection port 923 include a Universal Serial Bus (USB) port, an IEEE1394 port, and a Small Computer System Interface (SCSI) port. Other examples of the connection port 923 include an RS-232C port, an optical audio terminal, and a High-Definition Multimedia Interface (HDMI) port. When the external connection device 929 is connected to the connection port 923, various kinds of data can be exchanged between the information processing device 900 and the external connection device 929.

The communication device 925 is, for example, a communication interface including a communication device connected to a communication network 931. Examples of the communication device 925 include communication cards for a wired or wireless Local Area Network (LAN), Bluetooth (registered trademark), and a Wireless USB (WUSB). Also, the communication device 925 may be a router for optical communication, a router for an Asymmetric Digital Subscriber Line (ADSL), or modems for various kinds of communication. For example, the communication device 925 transmits and receives a signal or the like to and from the Internet or another communication device in conformity with a predetermined protocol such as TCP/IP. Also, the communication network 931 connected to the communication device 925 includes networks connected in a wired or wireless manner and includes, for example, the Internet, a household LAN, infrared ray communication, radio-wave communication, or satellite communication.

Examples of the imaging device 933 include an image sensor such as a charge coupled device (CCD) or a complementary metal oxide semiconductor (CMOS) and a device that images an actual space using various members such as lenses controlling formation of an image of a subject in the image sensor and generates a captured image. The imaging device 933 may be a device that captures a still image or may be a device that captures a moving image.

Examples of the sensor 935 include various sensors such as an acceleration sensor, a gyro sensor, a geomagnetic sensor, an optical sensor, or an audio sensor. The sensor 935 acquires, for example, information regarding a posture state of the information processing device 900, such as a posture of the casing of the information processing device 900 or information regarding a surrounding environment of the information processing device 900, such as brightness or noise of the surroundings of the information processing device 900. Also, the sensor 935 may include a Global Positioning System (GPS) sensor that receives GPS signals and measures the latitude, longitude, and altitude of the device.

In the above-described embodiments of the present disclosure, when the sensor device 100 is mounted directly on a user, the sensor 935 may include a sensor configured to acquire biological data such as a pulse or body temperature of the user. In this case, sensor data provided from such a sensor can be used, for example, by generating a new session according to relaxation of the pulse or displaying the degree of tension of a user for each session based on his or her pulse, body temperature, or the like.

The example of the hardware configuration of the information processing device 900 has been described above. Each of the foregoing constituent elements may be configured using a general-purpose member or may be configured by hardware specialized for the function of each constituent element. The configuration can be modified appropriately according to a technical level at the time of realizing the embodiments.

(11. Supplement)

The embodiments of the present technology can include, for example, the above-described information processing device (the analysis terminal, the server, or the like), a system, an information processing device, an information processing method performed by the information processing device or the system, a program causing the information processing device to function, and a non-transitory type medium having the program stored therein.

The preferred embodiments of the present disclosure have been described above in detail with reference to the appended drawings, but the technical scope of the present disclosure is not limited to the examples. It should be apparent to those skilled in the art of the present disclosure that various modification examples and correction examples can be made within the scope of the technical spirit and essence described in the claims, and the modification examples and the correction examples are, of course, construed to pertain to the technical scope of the present disclosure.

Additionally, the present technology may also be configured as below.

An information processing apparatus comprising circuitry configured to analyze a motion of a user by determining a start time and an end time of a motion session from characteristics of motion data regarding the motion of the user, wherein the motion data is indicative of a type of sports-related motion performed by the user.

Optionally, the circuitry is configured to receive the motion data from a sensor device that is mounted directly or indirectly to the user.

Optionally, the circuitry is configured to analyze the motion data between the start time and the end time.

Optionally, the circuitry is configured to determine the type of sports-related motion performed by the user based on analysis information of the motion data between the start time and the end time.

Optionally, the circuitry is configured to perform an analysis and produce the analysis information within the information processing apparatus.

Optionally, the circuitry is configured to receive the analysis information from another device that is external to the information processing apparatus.

Optionally, the circuitry is configured to control a recording of the analysis information in association with the motion session.

Optionally, the apparatus includes a display, wherein
  the display and the circuitry are contained in a smartphone.

Optionally, the circuitry is configured by software downloaded as an App to the smartphone.

Optionally, the apparatus includes a display, wherein
  the display and the circuitry are contained in a wearable computer.

Optionally, the apparatus includes a sensor device that produces the motion data, wherein
  the sensor device is contained in the wearable computer.

Optionally, the apparatus includes a communications interface, wherein
  the circuitry is configured to record analysis information generated by analyzing the motion of the user, and
  the interface is configured to send the analysis information to an external display device for later viewing.

Optionally, the type of sports-related motion includes a striking of a ball.

Optionally, the type of sports-related motion includes swinging an object that is one of a tennis racket, a golf club, and a bat.

Optionally, the type of sports-related motion includes propelling an object with a hand or a foot and includes a throwing of the object, a rolling of the object, a striking of the object, and a kicking of the object.

Optionally, the analysis information contains a comparison result of a performance of the sports-related motion performed by the user and a performance threshold, and the comparison result is provided to a display for viewing the by the user.

Optionally, the apparatus includes a display configured to show a photo or a video of the sports-related motion performed by the user during the motion session.

Optionally, the circuitry is configured to count a number of motion sessions during an event and store a count number for a particular motion session in association with the motion data for that particular motion session.

Likewise, in a method embodiment, the method includes
  analyzing with circuitry a motion of a user by determining a start time and an end time of a motion session from characteristics of motion data regarding the motion of the user, wherein the motion data is indicative of a type of sports-related motion performed by the user.

Likewise in a computer readable medium embodiment, a non-transitory computer readable storage device has instructions stored therein that when executed by circuitry cause the circuitry to perform a method, the method comprising:
  analyzing with the circuitry a motion of a user by determining a start time and an end time of a motion session from characteristics of motion data regarding the motion of the user, wherein the motion data is indicative of a type of sports-related motion performed by the user.

(1)
  An information processing device including:
  a processing unit configured to realize
  a reception function of receiving motion data indicating a motion of a user who is playing a sport from a sensor device mounted directly or indirectly on the user who is playing the sport,
  an analysis function of acquiring analysis information regarding the motion of the user by determining a starting time and an ending time of a session based on characteristics of the motion data and analyzing the motion data between the starting time and the ending time, and
  a recording control function of recording the analysis information in association with the session.

(2)
  The information processing device according to (1), wherein the processing unit further realizes an output control function of outputting the analysis information on a session basis.

(3)
  The information processing device according to (1) or (2), wherein the analysis information includes a number of predetermined operations in the session.

(4)

The information processing device according to any one of (3), wherein the play includes a shot operation of hitting a ball using a hitting tool, and wherein the analysis information includes a number of shot operations in the session.

(5)

The information processing device according to any one of (1) to (4), wherein the analysis information includes a ratio of operations satisfying a condition to predetermined operations in the session.

(6)

The information processing device according to (5), wherein the play includes shot operations of hitting a ball using a hitting tool, and wherein the analysis information includes a ratio of the shot operations of hitting a ball in a predetermined area on the hitting tool to the shot operations in the session.

(7)

The information processing device according to any one of (1) to (6), wherein the reception function receives the temporally discrete motion data, and wherein the analysis function determines the starting time and the ending time based on a time interval between the mutual motion data.

(8)

The information processing device according to (7), wherein, when the time interval exceeds a threshold value, the analysis function determines the starting time and the ending time such that the motion data before the time interval and the motion data after the time interval are included in the mutually different sessions.

(9)

The information processing device according to any one of (1) to (8), wherein the reception function receives information regarding an operation of recording the play performed by the user during the play, and wherein the analysis function determines the starting time and the ending time based on the operation of recording the play.

(10)

The information processing device according to (9), wherein, when the operation of recording the play is performed, the analysis function determines the starting time and the ending time such that the motion data before the operation and the motion data after the operation are included in the mutually different sessions.

(11)

The information processing device according to any one of (1) to (10), wherein the processing unit further realizes an image acquisition function of acquiring a captured image of the play, and wherein the recording control function records the captured image in association with the session.

(12)

The information processing device according to any one of (1) to (11), wherein the reception function receives the motion data in real time, and wherein the processing unit further realizes an output control function of outputting a waveform generated based on the motion data during the acquisition of the analysis information.

(13)

The information processing device according to (12), wherein the play includes a shot operation of hitting a ball using a hitting tool, wherein the analysis information includes a position at which the ball is hit on the hitting tool in the shot operation, and wherein the output control function outputs the position at which the ball is hit on the hitting tool based on images of the hitting tool each having a different direction according to a type of the shot operation.

(14)

An information processing device including:
a processing unit configured to realize
an analysis information acquisition function of acquiring analysis information obtained by analyzing motion data, which is received from a sensor device mounted directly or indirectly on a user who is playing a sport and indicates a motion of the user who is playing the sport, between a starting time and an ending time of a session determined based on characteristics of the motion data, and
an output control function of outputting the analysis information.

(15)

The information processing device according to (14), wherein the output control function outputs the analysis information on a session basis.

(16)

The information processing device according to (14) or (15), wherein the analysis information includes a number of predetermined operations in the session.

(17)

The information processing device according to any one of (14) to (16), wherein the analysis information includes a ratio of the operations satisfying a condition to the predetermined operations in the session.

(18)

A non-transitory computer-readable storage medium having a program stored therein, the program causing a computer to perform:
a reception function of receiving motion data indicating a motion of a user who is playing a sport from a sensor device mounted directly or indirectly on the user who is playing the sport;
an analysis function of acquiring analysis information regarding the motion of the user by determining a starting time and an ending time of a session based on characteristics of the motion data and analyzing the motion data between the starting time and the ending time; and
a recording control function of recording the analysis information in association with the session.

(19)

A non-transitory computer-readable storage medium having a program stored therein, the program causing a computer to perform:
an analysis information acquisition function of acquiring analysis information obtained by analyzing motion data, which is received from a sensor device mounted directly or indirectly on a user who is playing a sport and indicates a motion of the user who is playing the sport, between a starting time and an ending time of a session determined based on characteristics of the motion data; and
an output control function of outputting the analysis information in association with the session.

(20)
An information processing method including:
receiving motion data indicating a motion of a user who is playing a sport from a sensor device mounted directly or indirectly on the user who is playing the sport;
acquiring analysis information regarding the motion of the user by determining a starting time and an ending time of a session based on characteristics of the motion data and analyzing the motion data between the starting time and the ending time; and
outputting the analysis information in association with the session.

REFERENCE SIGNS LIST 100 sensor device
101 vibration sensor
105 9-axis sensor
200 analysis terminal
205 application
221 analysis library
300 server
303 server application

The invention claimed is:

1. An information processing apparatus, comprising:
a display screen; and
circuitry configured to:
determine a start time and an end time of a motion session from characteristics of motion data associated with a detected motion of a user, wherein the motion data is indicative of a type of the detected motion of the user;
generate vibration waveform information that indicates an impact of the type of the detected motion on an object;
control the display screen to display the vibration waveform information;
generate analysis information of the motion data based on the vibration waveform information and based on an analysis of the motion data between the start time and the end time of the motion session; and
determine the type of the detected motion based on the analysis information of the motion data of the user between the start time and the end time.

2. The information processing apparatus of claim 1, wherein the circuitry is further configured to receive the motion data from a sensor device.

3. The information processing apparatus of claim 1, wherein the circuitry is further configured to receive the analysis information from a device that is external to the information processing apparatus.

4. The information processing apparatus of claim 1, wherein the circuitry is further configured to control recordation of the analysis information in association with the motion session.

5. The information processing apparatus of claim 1, wherein the information processing apparatus is a smartphone.

6. The information processing apparatus of claim 5, wherein the circuitry is further configured to execute a software application of the smartphone.

7. The information processing apparatus of claim 1, wherein the information processing apparatus is a wearable device.

8. The information processing apparatus of claim 7, further comprising a sensor device configured to produce the motion data.

9. The information processing apparatus of claim 1, further comprising a communication interface, wherein the circuitry is further configured to control recordation of the analysis information, and
the communication interface is configured to transmit the analysis information to an external display device.

10. The information processing apparatus of claim 1, wherein the type of the detected motion includes a strike to a ball.

11. The information processing apparatus of claim 10, wherein the type of the detected motion includes a swing of the object, wherein the object is one of a tennis racket, a golf club, or a bat.

12. The information processing apparatus of claim 1, wherein the type of the detected motion includes at least one of movement of the object with one of a hand or a foot, a throw of the object, a rolling of the object, a strike to the object, or a kick to the object.

13. The information processing apparatus of claim 1, wherein the analysis information comprises a comparison result of a performance of the detected motion of the user and a performance threshold, and wherein the display screen is further configured to display the comparison result.

14. The information processing apparatus of claim 1, wherein the display screen is further configured to display at least one of a photo or a video of the detected motion of the user in between the start time and the end time of the motion session.

15. The information processing apparatus of claim 1, wherein the circuitry is further configured to count a number of motion sessions during an event and store a count number for a particular motion session in association with the motion data for the particular motion session.

16. An information processing method, comprising:
determining a start time and an end time of a motion session from characteristics of motion data associated with a detected motion of a user, wherein the motion data is indicative of a type of the detected motion of the user;
generating vibration waveform information indicating an impact of the type of the detected motion on an object;
displaying the vibration waveform information on a display screen;
generating analysis information of the motion data based on the vibration waveform information and based on an analysis of the motion data between the start time and the end time of the motion session; and
determining the type of the detected motion based on the analysis information of the motion data of the user between the start time and the end time.

17. A non-transitory computer-readable medium having stored thereon, computer-executable instructions for causing a computer to execute operations, the operations comprising:
determining a start time and an end time of a motion session from characteristics of motion data associated with a detected motion of a user, wherein the motion data is indicative of a type of the detected motion of the user;
generating vibration waveform information indicating an impact of the type of the detected motion on an object;
displaying the vibration waveform information on a display screen;
generating analysis information of the motion data based on the vibration waveform information and based on an analysis of the motion data between the start time and the end time of the motion session; and determining the type of the detected motion based on the analysis information of the motion data of the user between the start time and the end time.

* * * * *